United States Patent [19]
Kikinis et al.

[11] Patent Number: 5,689,654
[45] Date of Patent: *Nov. 18, 1997

[54] DIGITAL ASSISTANT SYSTEM INCLUDING A HOST COMPUTER WITH A DOCKING BAY FOR THE DIGITAL ASSISTANT WHEREIN A HEAT SINK IS MOVED INTO CONTACT WITH A DOCKED DIGITAL ASSISTANT FOR COOLING THE DIGITAL ASSISTANT

[75] Inventors: Dan Kikinis, Saratoga; Pascal Dornier, Sunnyvale; William J. Seiler, Scotts Valley, all of Calif.

[73] Assignee: Elonex F.P. Holdings, Ltd., London, England

[*] Notice: The term of this patent shall not extend beyond the expiration date of Pat. No. 5,473,506.

[21] Appl. No.: 335,487

[22] Filed: Nov. 7, 1994

Related U.S. Application Data

[63] Continuation-in-part of Ser. No. 144,231, Oct. 28, 1993, and a continuation-in-part of Ser. No. 159,078, Nov. 29, 1993, Pat. No. 5,539,616, which is a continuation-in-part of Ser. No. 97,946, Feb. 26, 1993, Pat. No. 5,278,730, which is a continuation of Ser. No. 905,480, Jun. 29, 1992, abandoned, and a continuation-in-part of Ser. No. 152,431, Nov. 12, 1993, Pat. No. 5,473,506.

[51] Int. Cl.$^6$ ............................. G06F 3/00; G06F 13/00
[52] U.S. Cl. .................. 395/281; 395/308; 395/893; 395/200.01; 364/708.1; 361/686; 345/173; 455/89
[58] Field of Search ............................ 395/325, 800, 395/275, 425, 725, 155, 281, 308, 893, 200.01; 345/160, 169, 173; 379/93, 96; 364/709.09, 708.1; 320/21; 361/686; 455/89

[56] References Cited

U.S. PATENT DOCUMENTS

| | | | |
|---|---|---|---|
| 4,534,012 | 8/1985 | Yokozawa | 395/275 |
| 4,545,023 | 10/1985 | Mizzi | 364/709.13 |
| 4,821,215 | 4/1989 | Woodward | 364/550 |
| 5,029,183 | 7/1991 | Tymes | 375/1 |
| 5,227,957 | 7/1993 | Deters | 361/395 |
| 5,432,913 | 7/1995 | Smits et al. | 395/275 |

*Primary Examiner*—Gopal C. Ray
*Attorney, Agent, or Firm*—Donald R. Boys

[57] ABSTRACT

A personal digital assistant module with a local CPU, memory, and I/O interface has a host interface comprising a bus connected to the local CPU and a connector at a surface of the personal digital assistant for interfacing to a bus connector of a host general-purpose computer, providing direct bus communication between the personal digital assistant and the host general-purpose computer. In an embodiment, the personal digital assistant also stores a security code. The personal digital assistant according to the invention forms a host/satellite combination with a host computer having a docking bay, wherein upon docking a docking protocol controls access by the host to memory of the personal digital assistant based on one or more passwords provided by a user to the host. In another embodiment the personal digital assistant also has an expansion port connected to the local CPU, and expansion peripheral devices may be connected and operated through the expansion port. Docking structures and cooling apparatus and methods are disclosed.

12 Claims, 41 Drawing Sheets

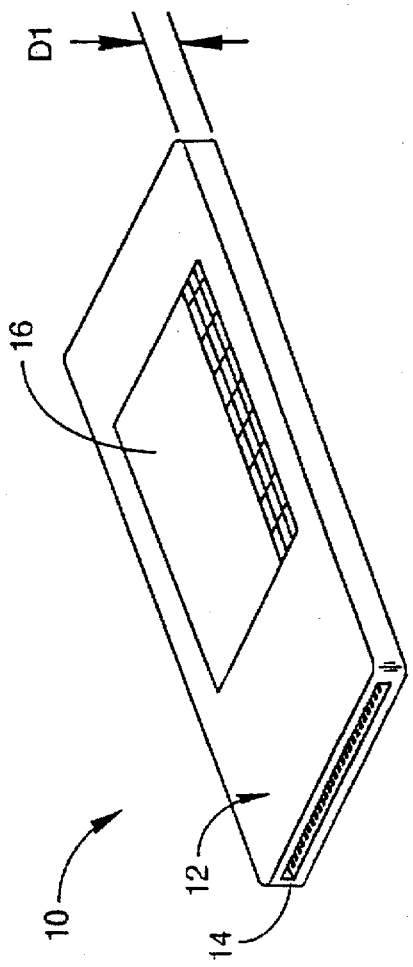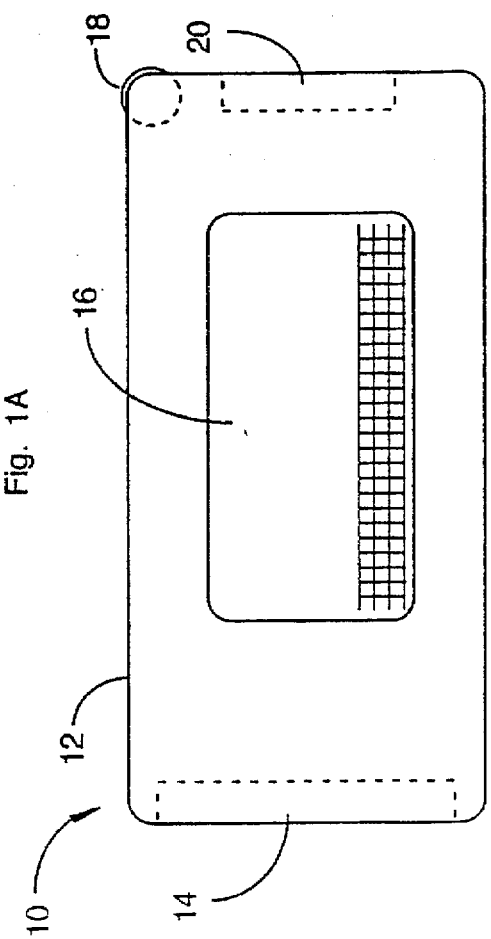
Fig. 1A
Fig. 1B

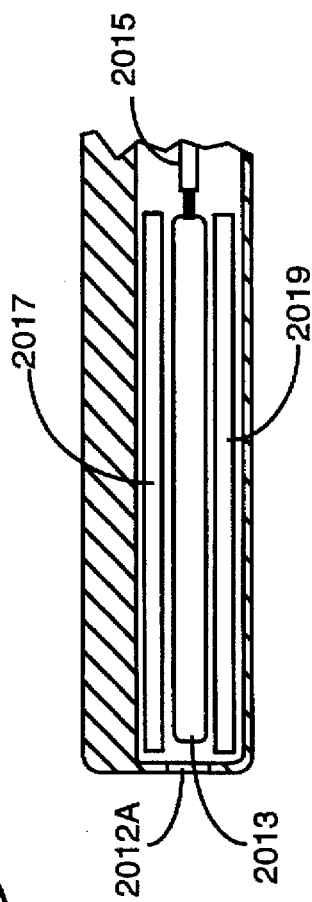
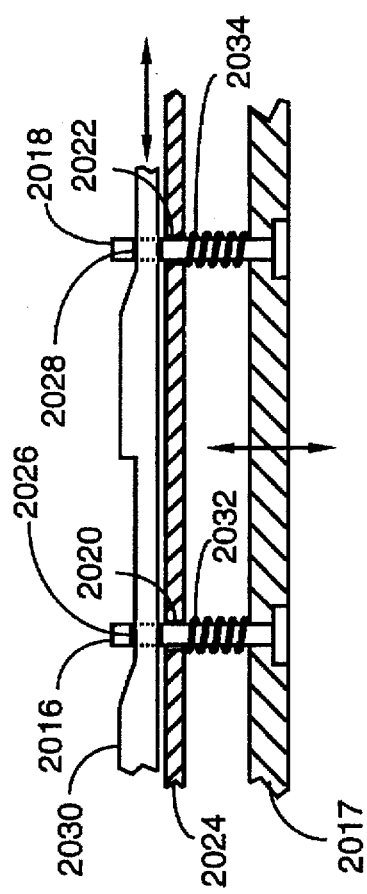
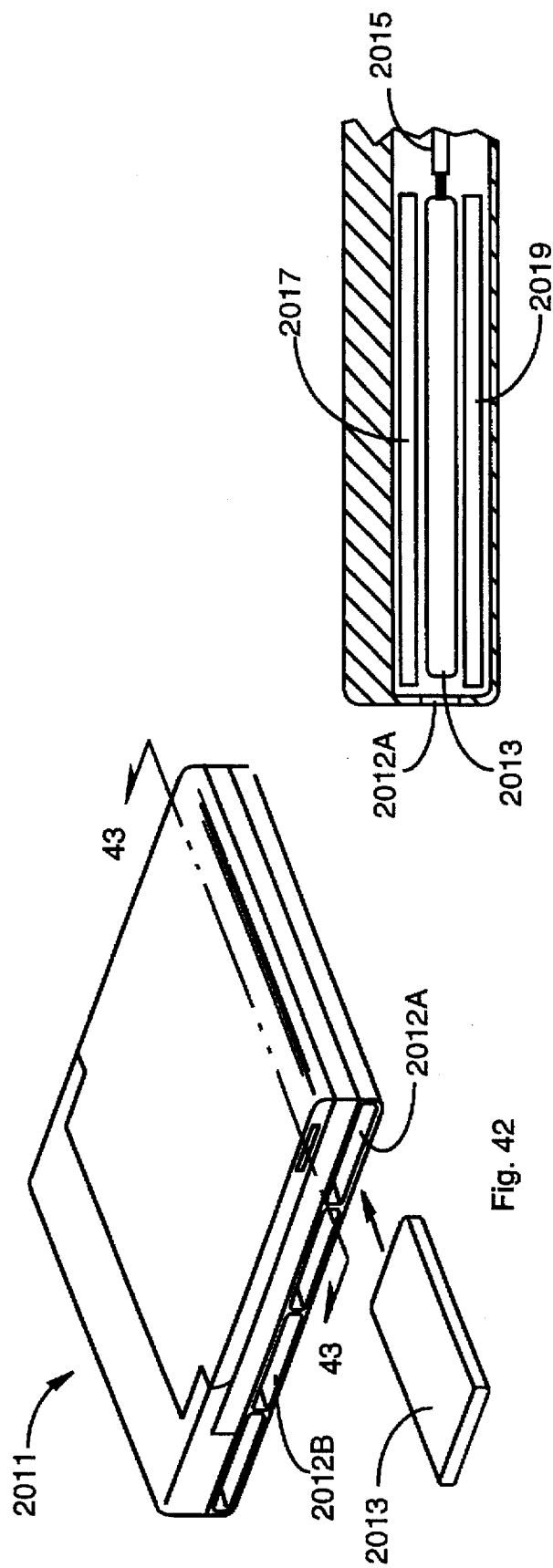

DIGITAL ASSISTANT SYSTEM INCLUDING A HOST COMPUTER WITH A DOCKING BAY FOR THE DIGITAL ASSISTANT WHEREIN A HEAT SINK IS MOVED INTO CONTACT WITH A DOCKED DIGITAL ASSISTANT FOR COOLING THE DIGITAL ASSISTANT

CROSS-REFERENCE TO RELATED DOCUMENTS

The present application is a continuation-in-part of copending application Ser. No. 08/144,231, filed Oct. 28, 1993, and also a continuation-in-part of application Ser. No. 08/159,078, filed Nov. 29, 1993, now U.S. Pat. No. 5,539,616, which is a continuation-in-part of application Ser. No. 08/097,946, filed Jul. 26, 1993, now U.S. Pat. No. 5,278,730, which is a continuation of application Ser. No. 07/905,480, filed Jun. 29, 1992, abandoned. This application is also a continuation-in-part of application Ser. No. 08/152,431, filed Nov. 12, 1993, now U.S. Pat. No. 5,473,506.

FIELD OF THE INVENTION

This invention is in the area of computer systems and pertains more specifically to small portable computing devices known in the art as personal digital assistants, to docking systems for such devices, and to cooling of such devices while docked.

BACKGROUND OF THE INVENTION

Personal Digital Assistant (PDA) units, as of the date of this disclosure, enjoy a position of hope in the computer marketplace. Some believe this approach, a small, relatively inexpensive, and eminently portable computer unit, having software specifically written for tasks a user might expect to perform while travelling, will provide eminently useful and therefore salable computer products. Apple Computer, Hewlett Packard, and several other well-known computer manufacturers have made a considerable investment at no small risk in such systems.

Given the new systems now introduced, and those coming, for what is now known about them, there are still a number of drawbacks and problems. For example:

1. The PDA systems introduced are relatively costly, with starting prices ranging from several hundred dollars to two thousand dollars and more. At such prices, rivalling current pricing for desktop systems, the buying public may react negatively. It is true that prices will fall with increased manufacturing volume and competition, but the high end start may well be rejected by potential users.

2. The systems being offered are still relatively bulky, considering the limited range of tasks that may be accomplished. Most are certainly too big to be conveniently carried in a breast pocket. The Newton, manufactured by Apple Corporation, weighs about a pound and is approximately the size of a VHS video cassette.

3. A big drawback of the PDA systems being offered is the way they transfer data between a user's desktop unit, or other host, and the PDA. Known communication is by modem, by infrared communication, and by serial connection. These all require manipulation by a user, modulation on one or both ends of the communication path, and the like, which can be time-consuming, error-prone, and hardware extensive (expensive). Presently the Newton offers a modem and/or LED communication as an option, adding to the overall cost.

4. In known PDAs, software is typically recorded in ROM, so updating applications can be difficult, and sometimes impossible. This will be a problem because PDA users will not want the PDA to have the same capabilities at all times. Typical users will be people who travel and work while they travel. These users require different functions for a trip to Taiwan than for a trip to France, for example. What is needed is a quick and convenient means to update and substitute software.

5. Another difficulty is in the fact that the data files a user manipulates while travelling are typically data files also resident in a home unit, herein called a host unit, such as the user's office desktop machine or notebook or other portable computer. It is very troublesome to have two or more sets of critical data, with differences that one must remember to correct at an appropriate time. This can cause unending grief if files are not correctly updated. At best, current PDAs must use a relatively slow compressed bus to download and upgrade files. Typically this is done through a serial port, using a linking application like Laplink™.

What is needed is a small and inexpensive PDA that has a range of features that eliminate the above-described risks and problems. This new unit needs to be smaller than those presently being introduced, such as about credit-card size, or perhaps modeled on the PCMCIA type II or type III standard form factors. It should be inexpensive enough to produce that at least a minimum version could be sold in the roughly $100–$200 range, so it will be a unit seen to be a relatively inexpensive necessity. A PDA unit of this sort is the subject of the present invention, and is termed by the inventors a micro-PDA, or μPDA.

A very important feature of the μPDA in an aspect of the present invention is a direct parallel bus interface with a connector allowing the unit to be docked by plugging it into a docking bay in a host unit. Moreover, when the μPDA is docked in the host, there needs to be a means to effectively disable the CPU in the μPDA and to provide direct access to both the μPDA software and data storage by the host CPU. This direct access would provide immediate ability to communicate in the fastest available fashion between the μPDA and the host, and would also facilitate additional important features to be described below.

The inventors anticipate a μPDA unit with considerable computing power, and that the relatively small package, in concert with a powerful CPU, could lead to potential problems in dissipating heat generated by the CPU, particularly when the μPDA is docked in a docking bay in a desktop or portable computer. Accordingly, the μPDA system, including a computer having a docking bay, in embodiments of the present invention, has cooling elements positioned in the docking bay and movable to contact a docked μPDA to absorb excess heat dissipated.

The μPDA also needs to have an optional compressed bus interface, including a connector separate from the host interface, so add-on devices may be utilized, such as a FAX modem, cellular communication, printer, and so on.

It is also anticipated by the present inventors that security is required, not only for accessing a docked μPDA, but also to retain a docked μPDA against unauthorized removal. Accordingly, the cooling element features in some embodiments also are configured to retain a docked unit until removal is authorized.

An additional feature that could be optionally provided in another aspect of the invention is an interface at the host to allow a user to select pre-arranged software mixes for loading to the μPDA. This feature comprises a set of control routines operating in conjunction with the host's display and input means, to allow the user to quickly select applications and perhaps data as well to be loaded to the μPDA satellite, to configure the smaller, more portable unit for specific itineraries and purposes.

Another desirable feature is an ability to automatically update data files. In this aspect of the invention, with the μPDA docked, data on the host, if carrying a later date and/or time stamp than the data on the μPDA, would be automatically updated on the μPDA and vice-versa. When one returns from an excursion using the μPDA and docks the satellite at the host, the host gains access, determines the location of the latest files, and accomplishes the update. This feature needs to have some built-in user prompting to be most effective. It makes the μPDA a true satellite system.

SUMMARY OF THE INVENTION

In a preferred embodiment of the invention a personal digital assistant system is provided comprising a personal digital assistant module having a microcontroller, a memory connected to the microcontroller by a bus structure, a power supply, a display implemented on a surface of the enclosure, and input apparatus connected to the microcontroller. The system includes a host computer having a docking bay for the personal digital assistant, and the docking bay comprises at least one movable heat sink structure for contacting a docked personal digital assistant module. The personal digital assistant has a host interface comprising a host interface bus structure, which may be configured as a PCMCIA bus interface, is connected to the microcontroller and to a first portion of a host interface connector at a surface of the enclosure, and the host interface means is configured to directly connect the microcontroller to an internal bus of the host through the docking bay.

In an embodiment of the invention, the movable heat sink structure is shaped to protect a docked personal digital assistant module against unauthorized removal.

In one embodiment the personal digital assistant module has an expansion bus interface comprising an expansion bus structure connected to the microcontroller and to a first portion of an expansion bus connector for connecting the microcontroller to a peripheral device. A wide variety of peripheral devices are provided for use with the personal digital assistant of the invention.

In another aspect, the personal digital assistant module also has a nonvolatile storage device, such as an EEPROM connected to the microcontroller and containing one or more codes unique to the personal digital assistant, for uniquely identifying the personal digital assistant to digital devices connected on the host interface.

In a preferred embodiment, the display and input means for the personal digital assistant are configured as an overlaid touch screen and LCD display on a surface of the outer case of the personal digital assistant. A pointer device implemented as a thumbwheel in one embodiment and as a pressure sensitive pad in another is provided as part of the input capability.

The personal digital assistant module forms a unique combination with a general-purpose computer host having the personal digital assistant as a satellite unit. The host in this instance has a docking bay especially configured to dock the personal digital assistant, making a direct bus connection between the local CPU of the personal digital assistant and the CPU of the host. The host may be a desktop unit, a notebook computer, or a smaller portable like a palmtop computer. This combination provides power and convenience not before available.

Many other digital devices are also provided according to various aspects of the invention, such as modems, scanners, data acquisition peripherals, cellular phones, and a software vending machine, and all of these devices may be appended to the personal digital assistant by the expansion bus interface or, in many cases, by the host interface.

The personal digital assistant provided according to embodiments of the present invention is a unit more compact than conventional PDAs. It represents a new dimension in computer application and applicability, in a form promising to be eminently usable by and useful to almost everyone; and at a price easily affordable. It solves the communication problem intrinsic to personal digital assistants relative to larger and more powerful computers, with a unit that fits into a user's breast pocket, and at a very low price.

BRIEF DESCRIPTION OF THE DRAWINGS

FIG. 1A is an isometric view of a μPDA according to an embodiment of the present invention.

FIG. 1B is a plan view of the μPDA of FIG. 1A.

FIG. 42 is an isometric view of a modular, portable general-purpose computer, showing a function module in position for docking.

FIG. 43A is a cross-sectional view along line 43A—43A of FIG. 42 showing one module docking bay in a modular computer having disengaged cooling elements according to an embodiment of the invention.

FIG. 43B is side elevation view of a portion of one cooling structure in an embodiment of the invention, wherein the cooling structure is translated by a cam bar mechanism.

DESCRIPTION OF THE PREFERRED EMBODIMENTS

FIG. 1A is an isometric view of a μPDA 10 according to an embodiment of the present invention. In this embodiment the unit is modeled on the PCMCIA standard Type II form factor, having a height D1 of about 5 mm. Body 12 is described in further detail below, and has a female portion 14 of a connector recessed at one end for engaging a mating male portion of the connector in a host computer, connecting the μPDA internal circuitry directly with a host internal bus. The host unit may be a notebook computer having a docking bay for the μPDA. Docking bays may be provided in desktop and other types of computers, and even in other kinds of digital equipment, several examples of which are described below.

Still referring to FIG. 1A, in this embodiment there is a combination I/O interface 16 implemented on one side of the μPDA, comprising a display overlaid with a touch-sensitive planar structure providing softkey operation in conjunction with interactive control routines operable on the p. PDA in a stand-alone mode.

Although not shown in FIG. 1A, there may also be guides implemented along the sides of the case of the device for guiding the module in and out of a docking bay in a host computer unit. There may also be one or more mechanical features facilitating engagement and disengagement of the module in a docking bay.

FIG. 1B is a top plan view of the μPDA of FIG. 1A, showing a thumbwheel 18 implemented in one corner of the μPDA. The thumbwheel in this embodiment is an input device capable of providing input with both amplitude and directional characteristics, and in some cases rate characteristics as well. The thumbwheel has many uses in combination with the μPDA and I/O interface 16. One such use is controlled scrolling of icons, characters, menus, and the like on the display of the device. The thumbwheel provides many of the functions of a pointer device.

In this embodiment of the μPDA a second external connector portion 20 is provided. This connector portion is for engaging peripheral devices as part of an expansion bus interface.

Figure 2:
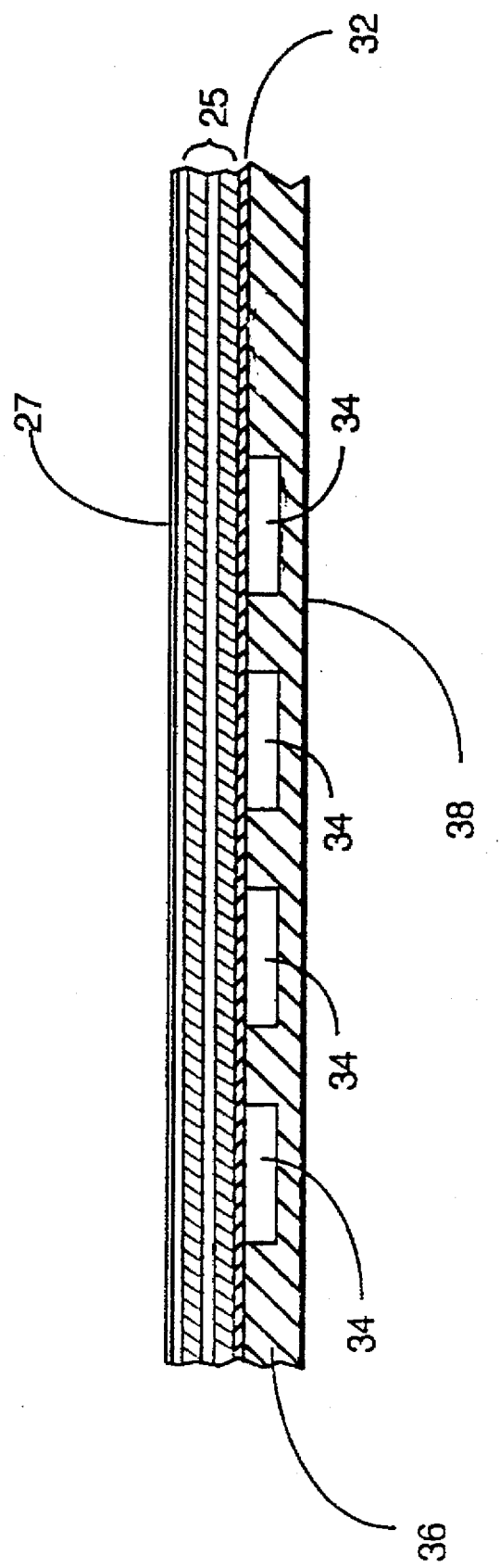
FIG. 2 is a cross-sectional view of the μPDA of FIGS. 1A and 1B.

FIG. 2 is a simplified cross-sectional view of a means for constructing a μPDA according to the present invention in a Type II PCMCIA, or other relatively small package. ICs 34 are encapsulated in a conformal material 36, and interconnection is accomplished by traces on a flexible polymer film 32 shown as overlaying the encapsulated structure. In this structure the ICs are not packaged in the conventional manner having solder leads for assembly to a printed circuit board. Rather, connections are made directly between the solder pads on the chip and the traces on the Kapton film. Also there is no intention to relate ICs indicated by element No. 34 with specific functional ICs in a μPDA. This cross-section is illustrative of a method of construction only.

In this compact construction there may also be traces on the side of film 32 away from the interconnections for the CPU and memory for connection to other elements, such as display 25 and much-sensitive screen 27.

LCD display 25 is implemented on one side of the μPDA, and touch-sensitive interface 27 is provided overlaying at least a portion of the LCD display. A metal casing 38, or other suitable material or combinations of material, surrounds the internal components and conforms to Type II PCMCIA form factors. This simplified cross-section illustrates some of the principles of construction that can allow the needed components to be inexpensively fitted into the small form factor needed. In another embodiment the μPDA is implemented in the form factor of a type III (10 mm thick) PCMCIA unit, using relatively conventional technology, such as PCB technology, rather than the encapsulated construction described immediately above. Various other constructions, form factors, and combinations are possible, as well.

Figure 3:
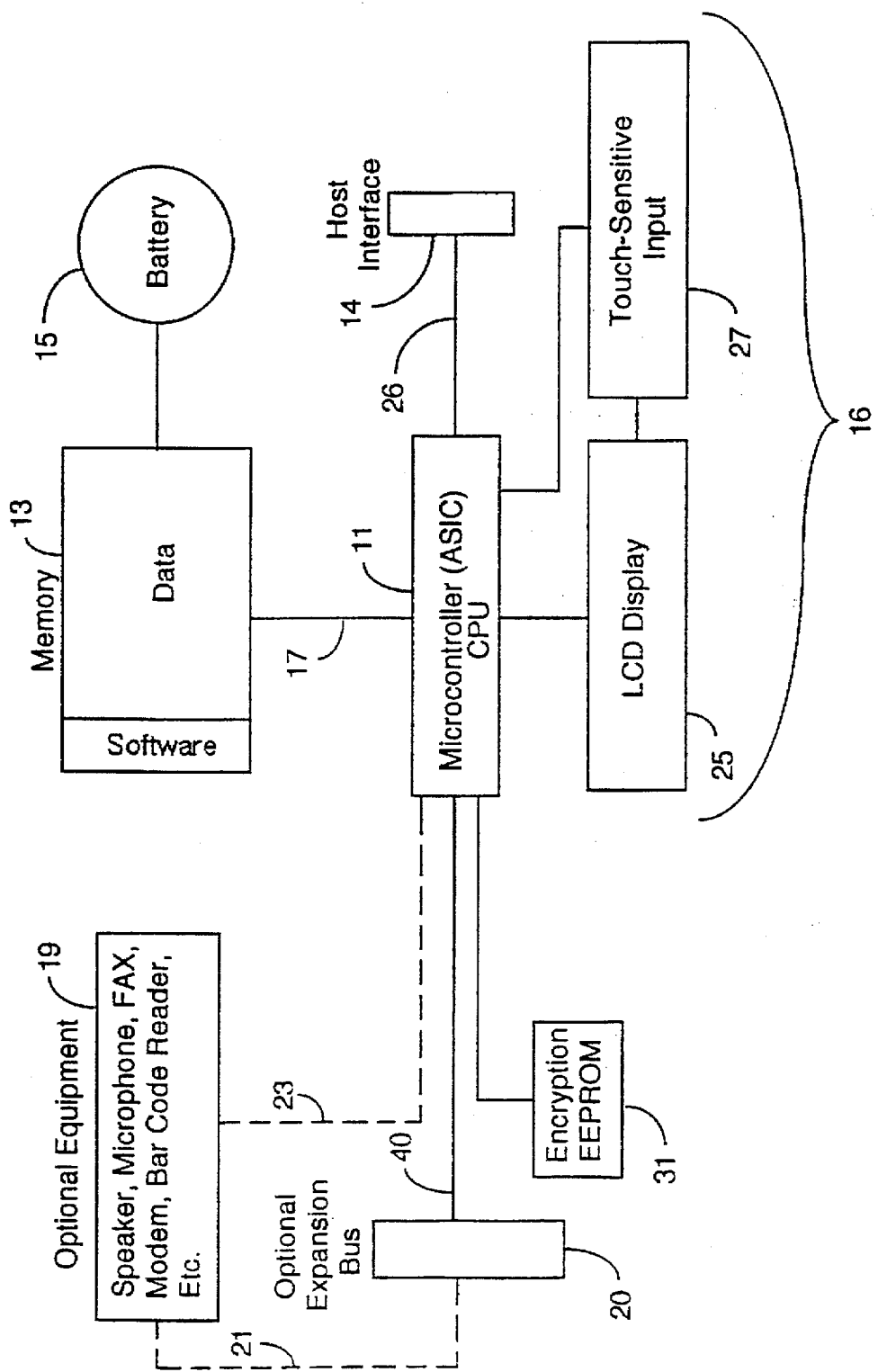
FIG. 3 is a block diagram of the μPDA of FIG. 1A and some peripheral elements.

FIG. 3 is a simplified electrical block diagram of the μPDA of FIGS. 1A, 1B and 2. A unique microcontroller 11 acts as the CPU of the μPDA in the stand-alone mode, that is, when the μPDA is not docked in a host unit. When the μPDA is docked in a host computer, microcontroller 11 acts as a slave unit, granting bus control to the CPU of the host. In docked mode, the CPU of the host thus gains control of the memory contents of the μPDA, subject in most cases to security procedures which are described below. Thus the host computer can transfer data and software into and out of a docked μPDA memory. In other embodiments many other cooperative operating modes may be accomplished between the two CPUs and accessible memory devices.

Memory 13 is preferably a nonvolatile device from 1 to 2 megabytes in this embodiment, and both control routines for applications and data files are stored in this memory. Memory 13 may be flash memory, CMOS ROM, CMOS RAM with battery, or a combination, with the software stored in ROM and the data in the flash memory. The memory device is interfaced to microcontroller 11 via a dedicated bus structure 17, and microprocessor 11 is configured to drive memory bus 17.

A battery 15 is the power source in the stand-alone mode, and may be recharged in one or more of several ways. The power traces are not shown in FIG. 3, but extend to all of the powered devices in the μPDA module. When the unit is docked in the host, the host power source may be connected to pins through the host interface to recharge the battery. Alternatively, an attached means such as a solar panel may be configured to charge the battery and/or provide power to the μPDA. A solar panel for power is described elsewhere in this disclosure. Also the battery may be easily removed for periodic replacement.

Host bus connector 14 is a part of a host interface which comprises a bus structure 26 for providing connection to the host in docked mode, as described above. In a preferred embodiment, the host interface is according to PCMCIA Type II, Rev. 3 standard, which is capable of communication either in PCMCIA mode or in a mode similar to PCI mode. PCI mode refers to a high-speed intermediate bus protocol being developed by Intel corporation, expected to become a standard bus architecture and protocol in the industry. The physical interface at the host in this embodiment is a slot-like docking bay, as is typical of know docking bays for PCMCIA devices. This docking bay may be implemented as a docking box, a built-in unit like a floppy-drive unit, or it may take some other form.

Connector portion 20 is a part of the expansion bus interface described above, comprising a dedicated bus structure 40 connected to microcontroller 11. This interface can be implemented in a number of different ways. The purpose of the optional expansion bus interface is to connect to optional peripheral devices, such as a printer, a FAX modem, a host cellular phone, and others. The expansion bus interface is not an essential feature in a minimum embodiment of the present invention, but provides vastly enhanced functionality in many embodiments.

The expansion interface can take any one of several forms. A preferred form is an extended enhanced parallel port and protocol based on an invention by the present inventors disclosed in a copending patent application. Another form is an indexed I/O port having 8-bit address and 8-bit data capability. The requirement of the expansion port is that the connection and communication protocol be compatible with expansion devices, such as telephone modems, fax modems, scanners, and the like. Many other configurations are possible.

Optional equipment such as devices listed in box 19 may be connected for use with the μPDA through the expansion bus. Selected ones of such devices may also be built in to the μPDA in various embodiments, providing variations of applicability. In the former case, connection is through path 21 and the expansion bus interface via connector portion 20. In the built-in case, connection is in the interconnection traces of the μPDA as indicated by path 23.

I/O interface 16 (also FIG. 1B) is for viewing μPDA application-related data and for touch-sensitive input via softkeys. By softkeys is meant assignment by software of various functions to specific touch sensitive screen areas, which act as input keys. Labels in I/O interface 16 identify functionality of the touch-sensitive areas in various operating modes according to installed machine control routines. LCD display 25 and the touch-sensitive area 27 together form the combination I/O interface 16 described also above.

In some embodiments of the present invention, data and program security is provided comprising an Electrically Erasable Programmable Read Only Memory (EEPROM) 31, which is connected by dedicated communication lines to microcontroller 11. EEPROM 31 holds one or more codes installed at the point of manufacturing to provide security for information transfer between a host and a μPDA. The purpose is to control access by a host to the memory contents of a μPDA, so each μPDA may be configured to an individual. To accomplish this, docking and bus mastering machine control routines are initiated at the point of docking, and this security process is described in more detail below. In other embodiments, security codes may be provided by a Read Only Memory (ROM) chip or other permanent or semi-permanent memory source.

Figure 4:
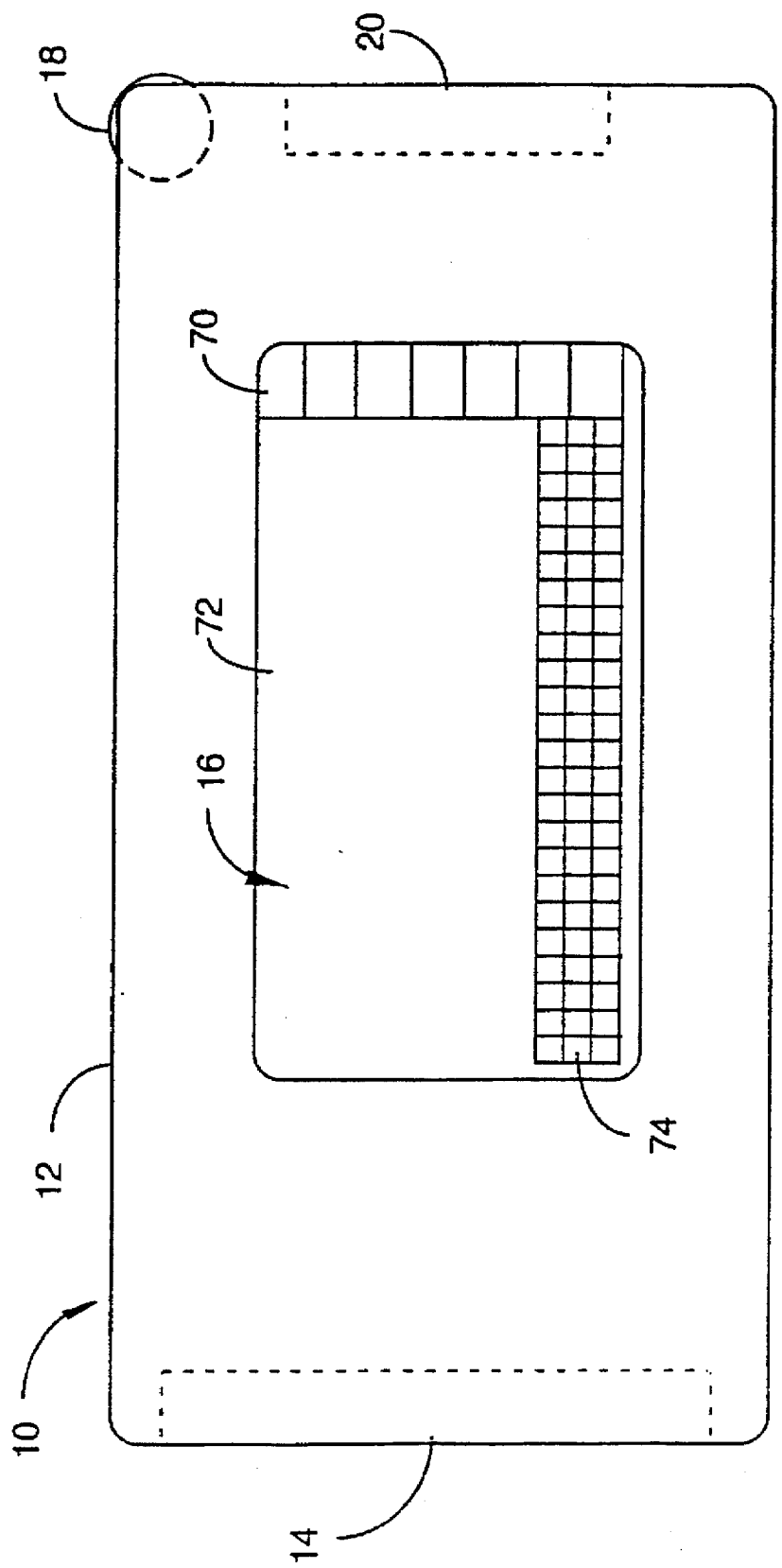
FIG. 4 is a more detailed plan view of the μPDA of FIG. 1A showing in particular an LCD display and touch screen user interface in an aspect of the present invention.

FIG. 4 is a plan view similar to FIG. 1B, of a µPDA, showing in particular I/O interface 16. The size and location of I/O interface 16 may vary, but in general occupies a major portion of one of the sides of the module. In one embodiment I/O interface 16 comprises an LCD display with a resolution of 256 by 144 pixels in a screen size that displays 32 by 12 characters. Each character in this embodiment is displayed in an area eight pixels wide and twelve pixels high. In another embodiment, the pixel resolution is 320 by 200, which corresponds to 40 by 16 characters.

The touch-sensitive areas of the touch-sensitive screen correspond to the character areas of the display. By touching an area with a finger or stylus, data can be entered quite quickly and with minimal CPU demand.

At one corner, thumbwheel 18 provides a two-directional means of controlling the configuration of the display according to installed control routines. A menu 70 is configured at one side to represent the current status of any application in progress and to provide appropriate user menu selections. In a preferred embodiment input from thumbwheel 18 is used for scrolling through menu 70, and active areas may be indicated by a cursor. A user makes a menu selection by pressing the appropriate touch-sensitive area. A specific input may be provided to cause the menu area to be displayed on either side of the display according to a user's preference.

Specific characters are displayed in this embodiment in a region 74, with each character area associated with a touch-sensitive input area. As region 70 dedicated to selectable characters is much too small to display all characters of a standard keyboard, input from thumbwheel 18 allows a user to pan region 74 displaying an entire virtual standard keyboard. Movement of thumbwheel 18 in one direction pans the character region horizontally, and movement in the other direction pans the character region vertically. When an end is reached the window pans onto the virtual keyboard from the other end. In this manner, a user may quickly pan the character window to display an entire standard keyboard, and make selections with a finger or a stylus. Of course, it is not required that a virtual keyboard be laid out for access in the format of a standard keyboard. Characters and punctuation, etc., could just as simply be displayed in a single strip along a region of the display, and scrolled by input from the thumbwheel or other pointer-type input device.

In this embodiment, to avoid delays caused by pang, if the thumbwheel is rotated quickly the character window jumps rather than scrolling to speed up the interface. In addition, menu 70 may optionally provide for a character display in different fonts and sizes, although a single font is preferred to minimize memory demand. It will be apparent to those with skill in the art that there are many alternatives for character selection and display, and many ways thumbwheel 18 may be configured to allow for scrolling and panning.

A document window 72 is provided in this embodiment at the top or bottom of I/O interface 16. A cursor locates the active position within the document for editing purposes. Menu 70 provides selection of available fonts, and input by thumbwheel 18 controls cursor movement over the document. As a document will in almost all cases be much larger than the display capability of region 72, it is necessary to pan the document window in essentially the same manner as the keyboard window is panned. For example, rotating thumbwheel 18 in one direction may display horizontal strips of a document, while rotating the thumbwheel in the opposite direction moves the window vertically strips of the same document.

A soft key or optional hard key may be configured to switch between the document and keyboard window, and the same or another key may be configured to switch between scrolling left or right, up or down, document or keyboard. A switch key may be used to change the thumbwheel mode of operation. A switch key may also be used in combination with a floating pointer to select characters and menu items. In this embodiment, the user can keep his or her hands relatively stationary on just the thumbwheel and the switch key, making all possible selections. Use of a switch key in combination with a floating pointer facilitates the use of small fonts. A switch key may also be incorporated as an additional hard key in a convenient location on the case 12.

It will be obvious to a person skilled in the art than there are numerous ways to combine menu selections, switching keys and I/O configurations to provide a user-friendly user interface. A further embodiment of the present invention provides an I/O set-up application wherein a user may completely customize features of I/O area displays.

There are other sorts of mechanical interfaces which may be used to provide pointer-style input in different embodiments of the invention as alternatives to the thumbwheel disclosed. One is a four-way force-sensitive mouse button and a selector button, which may be located at opposite ends of case 12 below I/O interface 16. Each button is designed to be operated by one finger. The four-way force-sensitive mouse button can provide menu scrolling of a cursor and panning and/or indexing of keyboard and document windows, while the selector button is used to select and edit according to position of a cursor. This configuration minimizes hand movement and keeps the I/O area clear for viewing.

Implementation of thumbwheels, pressure-sensitive switches and buttons, and the like, are known in the art, including the translation of mechanical motion and pressure to electrical signals and provision of such signals to a microcontroller. For this reason, details of such interfaces are not provided in this disclosure. Combinations of such inputs with displays and input areas may, however, be considered as inventive.

Figure 5:
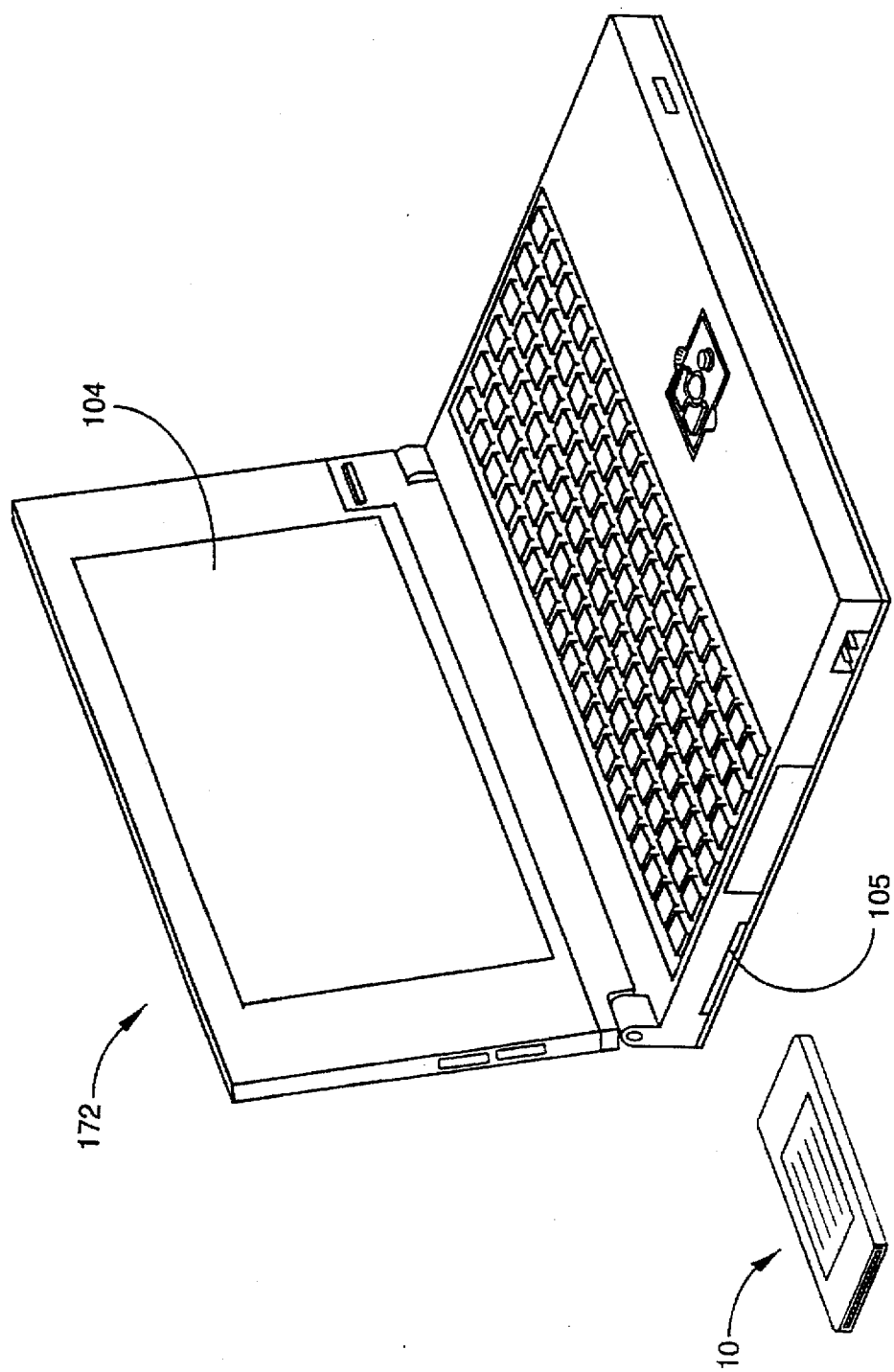
FIG. 5 is an isometric view of a μPDA and a host notebook computer in an aspect of the present invention, with the μPDA about to be docked in a docking bay of the notebook computer.

FIG. 5 is an isometric drawing of a µPDA 10 in position to be docked in a notebook computer 172 via a Type II PCMCIA docking port 105 according to an embodiment of the present invention. As further described below, once the µPDA is docked, it is activated and a procedure is initiated with the host computer to manage communication and verify memory access rights (security).

Access rights are considered important by the inventors for a number of reasons. Firstly, through the expedient of one or more specific codes, unique to each µPDA, a user may protect files stored in his module from access by unauthorized persons. The code can be used both to control access to data and files via I/O interface 16, and also through the host bus interface, so data and files may be secure from access by an unauthorized host system.

In the former case, when a µPDA is powered up, an application routine can query the user for an access code to be entered at I/O interface 16 FIG. 4). If the code is not entered properly, access is denied, and power goes off.

Codes for the purpose are stored in EEPROM 31 (FIG. 3), or in whatever ROM device may be devoted to the purpose. In some embodiments, the code may by mask-programmed at manufacture, so it is not alterable. In others, the code may be accessible and changeable by special procedures in the field.

In the case of host communication, it is possible that a portable or desktop computer, or some other device, may have a docking port physically configured to receive a μPDA, yet not be configured to communicate with the μPDA. This certainly might be the case where the μPDA is in the PCMCIA form. For purposes of disclosure and description, this specification terms such a unit a generic host. If the unit is configured to communicate with a μPDA it is an enabled host. If a host is configured for full access to a particular μPDA, it is a dedicated host.

If a docking unit is a generic host, there will be no communication unless the person presenting the μPDA provides the control routines to the host. This may be done for a generic host such as by transfer from a floppy disk, from a separate memory card through the docking port, or, in some embodiments, the communication software may be resident in memory 13 (FIG. 3) of a docked μPDA, transferrable to the host to facilitate further communication.

If the docking unit is in fact an enabled host, or is configured after docking to be an enabled host, the stored code or codes in EEPROM 31 (or other storage unit) may be used to verify authorization for data and program transfer between the host and a μPDA. In one embodiment this procedure is in the following order: First, when one docks a μPDA in a compatible docking port, certain pin connections convey to both the μPDA microcontroller and to the host CPU that the module is docked. Assuming an enabled host, the fact of docking commences an initialization protocol on both systems.

In most embodiments, if the docking unit is a non-host, that is, it is not capable of communication with the docked module, nothing happens, and the user may simply eject the docked module. If the computer is an enabled host, an application is started to configure host access to the μPDA's data files through the μPDA microcontroller. A user interface, described more fully below for a particular embodiment, is displayed on the host monitor 104 (FIG. 5). The host interface menu, as well as other application menus, may be formatted in part as a display of the μPDA I/O interface 16 as seen in FIG. 4 and described in accompanying text. In some embodiments, the docked μPDA can be operated in situ by manipulating the input areas of the μPDA displayed on the host's screen.

If the host is not a home unit for the docked module, that is, the host does not have matching embedded ID codes to those stored in the docked module, a visitor protocol is initiated. In this event, a visitor menu is displayed on host display 104 for further input, such as password queries for selections of limited data access areas in the docked module. In this case, too, a user may gain full access to the docked module's memory registers by entering the proper password (s).

If the host is a fully compatible host home unit, full access may be immediately granted to the host to access memory contents of the docked module, including program areas; and both data and programs may be exchanged.

In any case, when the μPDA is ejected or otherwise removed from the docking port, the on-board module microcontroller again gains full control of the internal μPDA bus structures.

Figure 6:
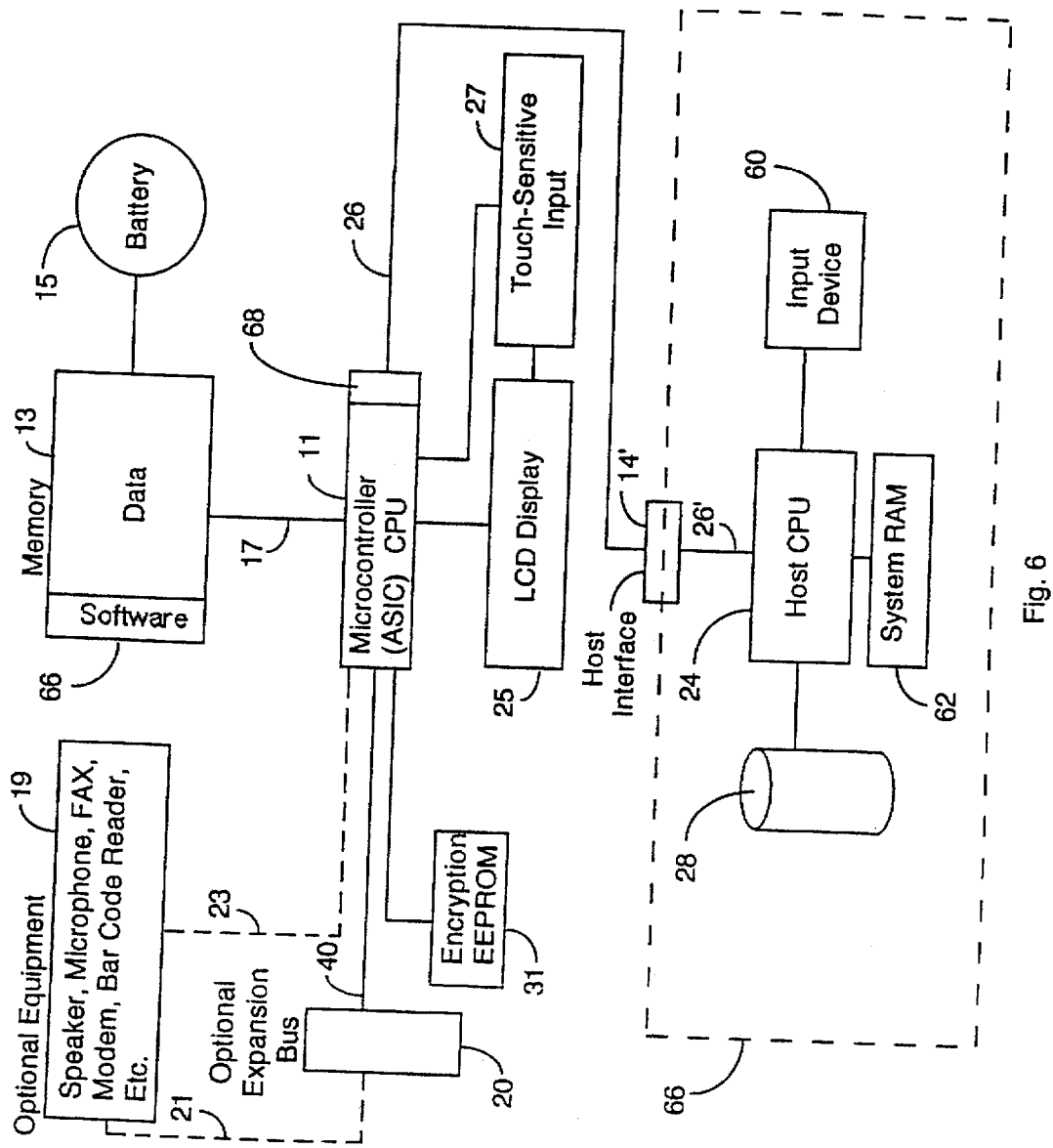
FIG. 6 is a block diagram of a μPDA docked in a docking bay of a host computer according to an embodiment of the present invention.
Figure 7:
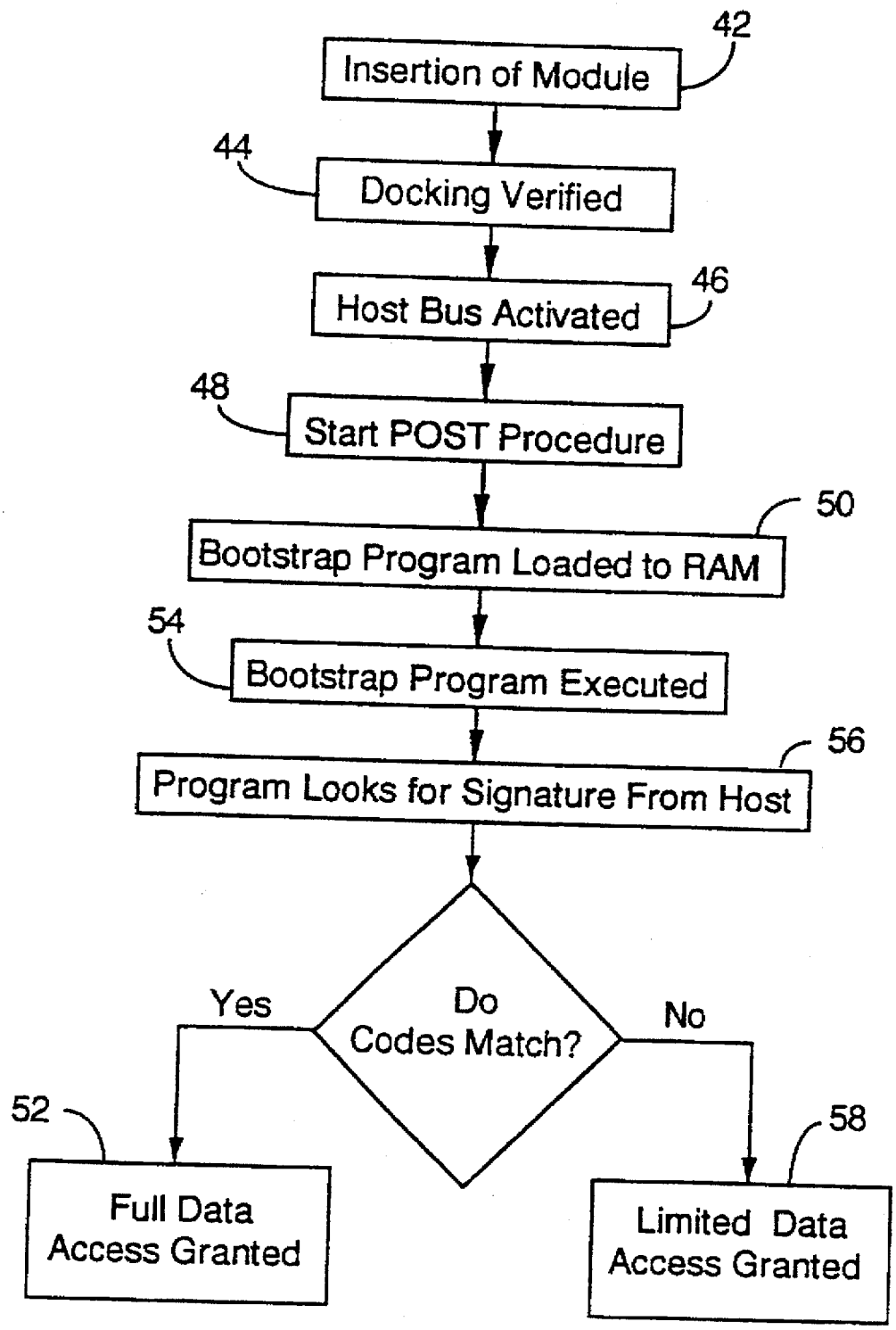
FIG. 7 is a logic flow diagram of the steps in docking a μPDA in a host computer according to an embodiment of the present invention.

FIG. 6 is a simplified block diagram of a μPDA docked in a host computer, and FIG. 7 is a basic logic flow diagram of the steps involved in docking a μPDA in a host computer 66 according to an embodiment of the present invention. Host computer 66 is represented in a mostly generic form, having a host CPU 24, and input device 60, such as a keyboard, a mass storage device 28, such as a hard disk drive, and system RAM 62. It will be apparent to those with skill in the art that many hosts may have a much more sophisticated architecture, and the architecture shown is meant to be illustrative.

When a μPDA unit is docked, connector 14' in FIG. 6 comprises portion 14 shown in FIGS. 1B and 3 and a mating connector portion for engaging portion 14 in port 105 (FIG. 5). The engagement of the separate portions of the connector cause bus 26 in the μPDA and bus 26' in the host to become directly connected. There is then a direct bus path between microcontroller 11 and host CPU 24 (FIG. 6).

As previously described there is a pin configuration (not shown) in connector 14 dedicated to signalling that a module is docked. In FIG. 7, step 42 represents insertion of a μPDA module into the docking port. At step 44 the signalling pin configuration signifies physical docking is accomplished. At step 46 host interface bus 26 is activated, including the mated host bus 26' in the host.

At step 48 (FIG. 7) microcontroller 11 in the μPDA starts a preprogrammed POST procedure. Microcontroller 11 in this embodiment has a page of RAM 68 implemented on the microcontroller chip. In other embodiments RAM may be used at other locations. At step 50, the POST routine loads a bootstrap program to RAM 68, which includes a code or codes for security matching. This code or codes comprise, for example, a serial number.

At step 54 the bootstrap program begins to execute in microcontroller 11, and at step 56 the microcontroller looks for a password from the host on host interface bus 26 (FIG. 6).

The fact of docking, assuming an enabled or dedicated host, also causes a communication routine, which may be accessed from, for example, mass storage device 28 at the host, to display a user interface on monitor screen 104 of the host unit, as partly described above. It is this communication program that makes a generic host an enabled host.

Assuming an enabled, but not dedicated, host, the user interface will query a user for input of one or more passwords, after successful entry of which the host will pass the input to microcontroller 11 for comparison with the serial number and perhaps other codes accessed from EEPROM 31 in the bootstrap of the μPDA.

According to the codes passed from the host to the docked module, microcontroller 11 will allow full access to memory 31 at function 52, FIG. 7, for the host CPU, or limited access at some level at function 58, defined by received codes (or no matching code at all).

The access protocols and procedures allowing partial or direct access to μPDA memory 13 are relatively well known procedures in the art, such as bus mastering techniques, and need not be reproduced in detail here. In addition to simple comparison of codes, there are other techniques that may be incorporated to improve the integrity of security in the communication between a μPDA and a host. For example, within the limitation of storage capacity of the EEPROM or other nonvolatile source, executable code might also be uploaded to onboard RAM 68, or code keys to be used with executable code from other sources, or relatively simple maps re-allocating memory positions and the like, so each μPDA may be a truly unique device.

There are additional unique features provided in one aspect of the invention as part of the communication routines introduced above. One such feature is automatic updating and cross-referencing of existing files and new files in both computers, under control of the host system, with the host having direct bus access to all memory systems. Auto-updating has various options, such as auto-updating by clock signature only, flagging new files before transfer, and an editing means that allows the user to review both older and newer versions of files before discarding the older in favor of the newer. This automatic or semiautomatic updating of files between the satellite and the host addresses a long-standing problem. The updating routines may also incorporate a backup option to save older files.

Another useful feature in host/μPDA communication is a means for a user to select and compose a mix of executable program files for downloading to a μPDA, either replacing or supplementing those executable routines already resident. A user can have several different program lists for downloading as a batch, conveniently configuring the applicability of a μPDA among a wide variety of expected work environments.

Such applications as databases, spreadsheets, documents, travel files such as currency converters, faxing and other communications programs, time clocks, address and telephone records, and the like, may comprise customized lists of user-preferred applications.

In another embodiment, an undocked μPDA can transfer data via the optional expansion bus 40 (FIG. 3) directly to a host. In the special case of a μPDA user without access to a PCMCIA interface on his host (notebook or desk-top) computer, he or she can connect to a host via an auxiliary port on the host, such as a serial port, via the expansion bus interface. In this case, the μPDA still requests password(s) from the host, and controls access to its on-board memory according to the password(s) received.

The optional expansion interface may also be used in some embodiments while a μPDA is mastered by a host, wherein the host may effectively send data through the bus structures of the μPDA.

Additional Aspects and Features

Software Vending Machine

In a further embodiment of the invention, a Software Vending Machine with a very large electronic storage capacity is provided, wherein a μPDA user may dock a module and purchase and download software routines compatible with the μPDA environment.

Figure 8:
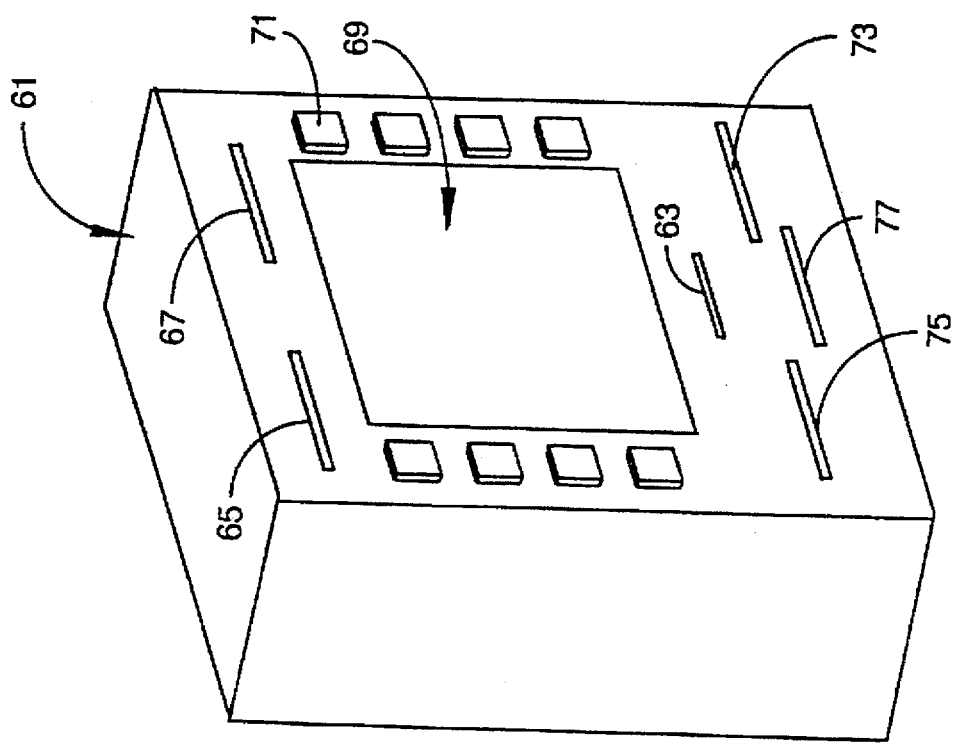
FIG. 8 is an isometric illustration of a μPDA software vending machine in an aspect of the present invention.

FIG. 8 is an isometric view of such a vending machine 61 having a docking bay 63 for a μPDA, a credit card slot 65, and a paper money slot 67. A display 69 provides a user interface for reviewing and purchasing software from the vending machine, along with selector buttons such as button 71 along the sides of the display. In an alternative embodiment the display may also have a touch screen, and may, in some embodiments, emulate the μPDA I/O area on a larger scale.

In operation, a user may, in this embodiment, review software for sale simply by docking his μPDA unit in the vending machine and selecting from a menu on display 69. The menu may allow the user to browse all available applications, or list new applications since entered dates. The user can select certain applications, try them out, at least in simulation, and then select applications to purchase.

The vending machine, once all the requirements are met, such as proper identification and payment, copies the selected application(s) to the memory of the μPDA, or, alternatively, to a floppy disk provided by either the user or the vending machine. In this case there is also a floppy disk drive 73 in the vending machine and a port 75 for dispensing formatted floppies for a customer to use in the disk drive. This mode is useful for the instances where a user's μPDA is loaded beyond capacity to receive the desired software, or the user simply wishes to configure the software mix himself from his or her own host computer.

There may also be provided a backup option so a user may instruct the vending machine to read and copy all or a selection of his files to one or more floppy disks before installing new files or data.

As described above, each user's μPDA includes an EEPROM or other storage uniquely identifying the μPDA by a serial number or other code(s), so the vending machine may be configured in this embodiment to provide the software in one of several modes.

A user may buy for a very nominal price a demo copy of an application, which does not provide full capability of the application, but will give the user an opportunity to test and become familiar with an application before purchase. Also, the user may buy a version of the same application, configured to the ID key of the μPDA to which it is loaded, and operable only on that μPDA. In another embodiment, the software is transferable between a family of keyed μPDAs, or has the ability to "unlock" only a limited number of times. In these cases, the applications would be sold at a lesser price than an unlocked version. The unlocked version works on any μ-PDA and/or host/μPDA system. The higher price for the unlocked version compensates for the likelihood of unauthorized sharing of the vended applications.

The vending machine could also offer a keyed version, customized to operate only on the μPDA docked in the software vending machine, or upon a family of μPDAs. This keyed version is possible because of the individual and unique nature of each μPDA, which has, at a minimum, a unique serial number, and may also have other security programming, as described above, which allows a vending machine to prepare and download a customized copy of an application that will operate only on the particular module for which it is purchased.

There are a number of different means by which unique correspondence might be accomplished, as will be apparent to those with skill in the art. A standard version stored in the memory facility of a vending machine might be recompiled, for example, on downloading, using a unique code from the docked or identified μPDA as a key in the compilation, so only the specific μPDA may run the program by using the same unique key to sequence the instructions while running. The key for scrambling or otherwise customizing an application might also comprise other codes and/or executable code sequences stored uniquely in a μPDA.

In yet another aspect related to the vending machine, there is a printer outlet 77 which prints a hardcopy manual for the user. It is, of course, not necessary that the software vended be specific to the M-PDA. Applications may also be vended for other kinds of machines, and transported in the memory of the μPDA, or by floppy disk, etc. In this embodiment a non-μPDA user can acquire a wide assortment of software.

The software vending machine may also serve as an optional informational display center in such locations as airports, train stations, convention centers, and hotels. Upon inserting a μPDA a user may interface directly and upload current information including, but not limited to, local, national, and world news; stock quotes and financial reports; weather; transportation schedules; road maps; language translators; currency exchange applications; E-mail and other direct on-line services.

A customized vending machine could be tailored to business travelers and allow fast access to pertinent information, allowing the user to download files to send via E-mail. In another aspect of the invention, the vending machines are linked to each other allowing users to send messages to associates travelling through locations of associated vending machines. Such dedicated µPDA E-mail is immediately downloaded to a specific µPDA as it is docked. The sender may have the associate's µPDA unique encoded key as identification, or some other dedicated identifying means for E-mail.

In another embodiment, as each business associate arrives at an airport, he or she may prompt the custom vending machine in that location via an optional installed infrared interface (not shown) in their µPDA. The custom vending machine, also equipped for infrared communication, receives the signal and sends/or receives any messages that are waiting.

Enhanced Display

Figure 9:
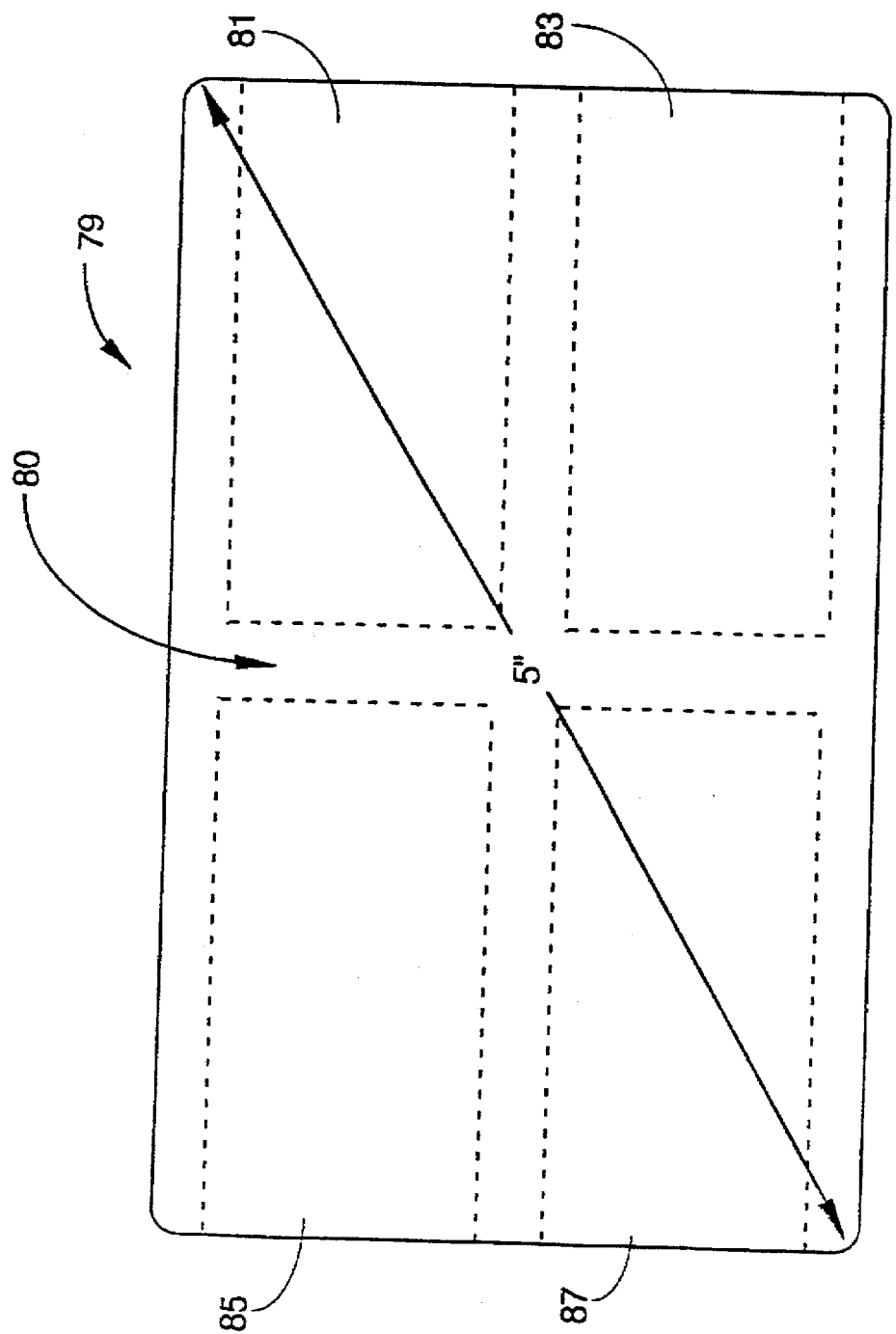
FIG. 9 is a top plan view of a μPDA enhanced user interface according to an embodiment of the present invention.

FIG. 9 is a plan view of an enhanced I/O interface unit 79 according to an aspect of the present invention. Interface unit 79, with about a 5-inch diagonal measurement, comprises a combination LCD display at least partially overlaid by a touch-sensitive input screen, providing an I/O area 80 in much the same manner as in a µPDA. Four docking bays 81, 83, 85, and 87 are provided in the left and right edges of interface unit 79 in this embodiment, and are configured for PCMCIA type II modules. One of these bays may be used for docking a µPDA according to the present invention, and the other three to provide a larger CPU, additional memory, battery power, peripheral devices such as modems, and the like by docking functional PCMCIA modules.

Interface unit 79 is a framework for assembling a specialty computer through docking PCMCIA units, including a µPDA according to the present invention. In other embodiments where the µPDA assumes other form factors, the docking bays may be configured accordingly.

A docked µPDA in this embodiment is configured to produce its I/O display on I/O area 80. The thumbwheel on the M-PDA is accessible while docked and acts as described above in the stand-alone mode in this case. In another aspect, the enhanced display has a re-configured output that enables the user to manipulate the data from the touch-screen alone and/or additional hardware selector buttons and/or a standard keyboard attached to the enhanced display via a dedicated bus port, or even through the expansion port of a docked µPDA. In a farther embodiment the enhanced display has a dedicated mouse port and/or a dedicated thumbwheel.

In yet another embodiment, interface unit 79 has an inexpensive, conventional, replaceable battery and/or a rechargeable battery. Also, in another aspect, interface unit 79 may dock two or more individual µPDAs and cross-reference data files between them according to control routines that can manipulate mutually unlocked files. Further still, interface unit 79 may be placed and structurally supported for easy viewing on a dedicated standard or smaller-sized keyboard, connecting to the keyboard as an input device. The keyboard would then automatically serve as the input device.

Interface unit 79 for a µPDA is small and compact enough to slip into a pocket book or briefcase, providing a very portable, yet very powerful, computer.

Microphone/Voicenotes

Figure 10:
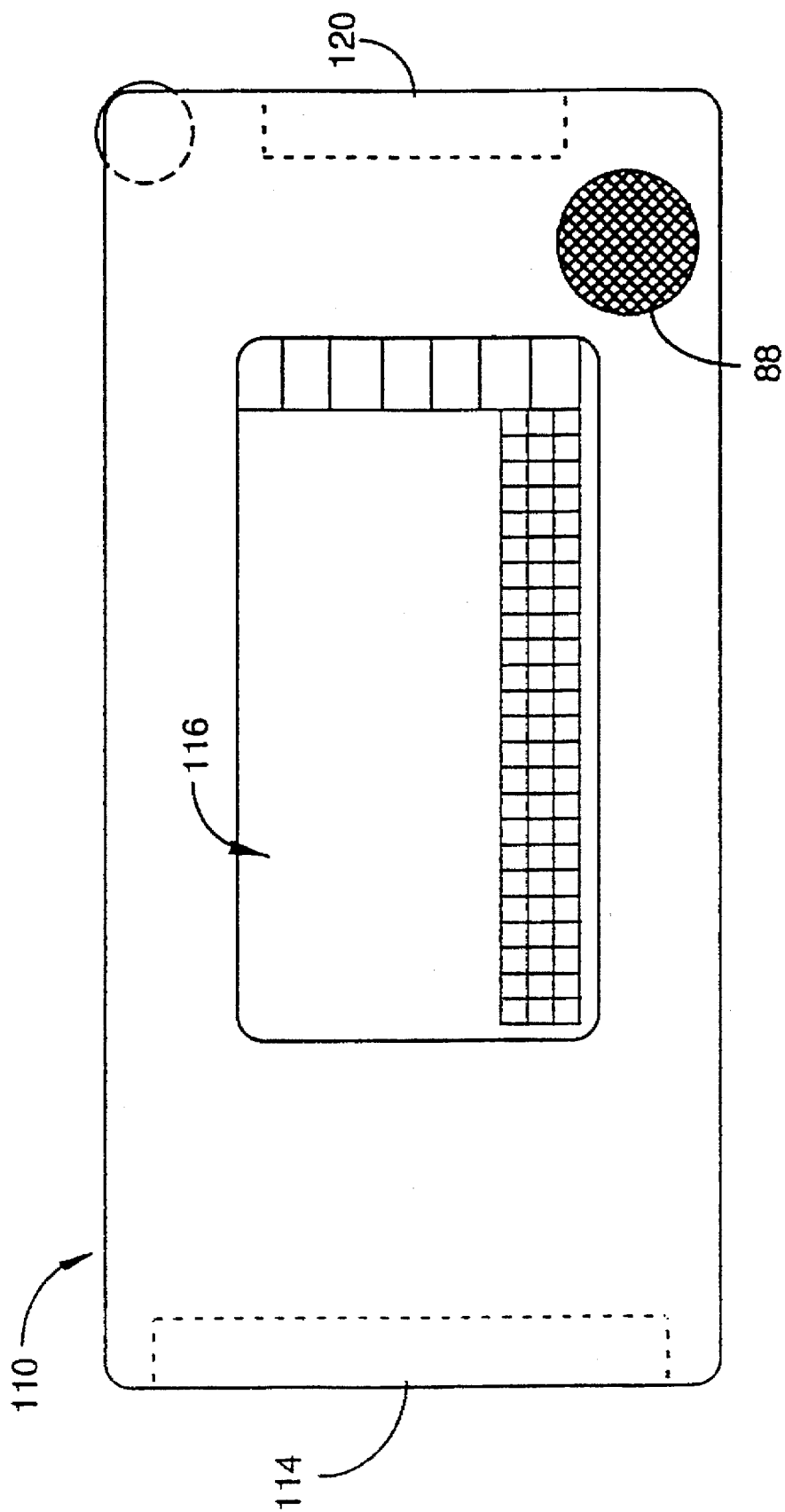
FIG. 10 is a top plan view of a μPDA with a microphone in an embodiment of the present invention.

FIG. 10 is a plan view of a µPDA 110 with an I/O interface 116, an expansion port 120, and a host interface connector 114. µPDA 110 has all the features previously described and additionally a microphone 88. In this embodiment, control routines in the µPDA use a linear predictive coding (LPC) approach to convert analog input from the microphone to a digital voice recording. This approach uses a minimum of memory, but still is capable of reproducing audio input like the human voice within recognizable limits.

In an alternative embodiment, for better quality voice recording, a two-step integrator may be used in order to separate the analog signal and synthesize a closer digital representation.

With a µPDA so configured, a user's voice notes can be recorded and later uploaded to a host for processing. In future embodiments the digital signals may be converted to text or sent as voicemail on a network. In yet another embodiment, the microphone is integrated with a speaker for editing purposes.

Cellular Telephone Interface

Figure 11:
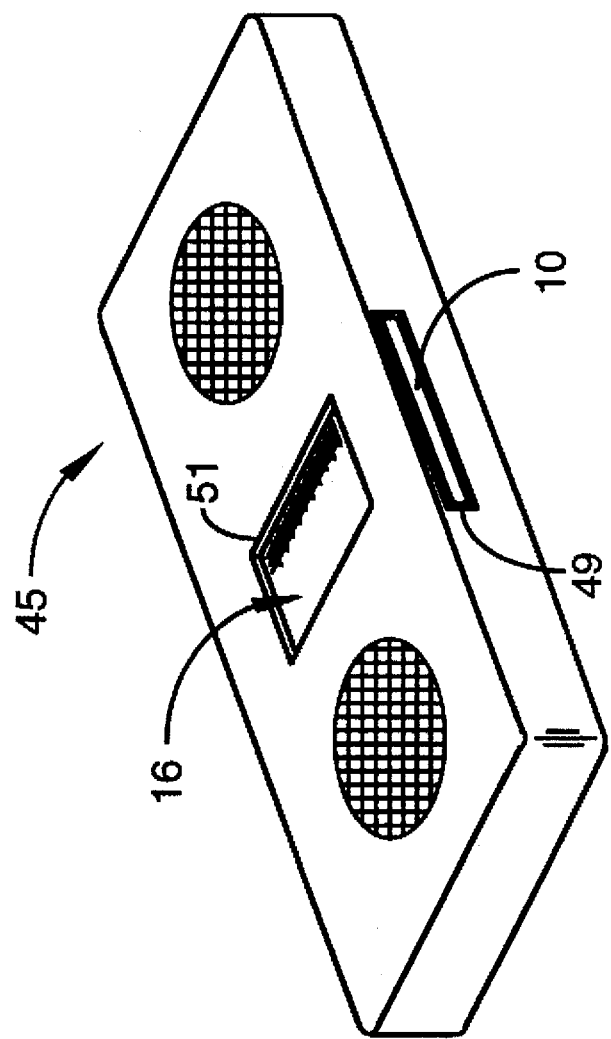
FIG. 11 is an isometric drawing of a μPDA docked in a dedicated cellular or cordless telephone according to an embodiment of the present invention.

FIG. 11 is an isometric view of a µPDA 10 docked in a dedicated cellular telephone 45 according to an embodiment of the present invention. Telephone 45 has a docking port 49 for a µPDA according to invention. In this embodiment, port 49 is on one side of telephone 45, and there is a window 51 to provide access to I/O interface 16 of the µPDA after it is docked. With the µPDA docked, all of the software and memory of the µPDA is available to the telephone and a user may operate the phone by I/O interface 16.

In this aspect of the invention, unique control routines and display configurations are provided to enhance use of the cellular phone. For example, all of the user's collection of phone numbers, associated credit card numbers, access codes, etc. are readily available and may be quickly and conveniently accessed and used. In one aspect, a simple input displays alphabet letters to select, and once a letter is selected, a partial list of parties that might be called is displayed. One may scroll through the list by touch input or by use of the thumbwheel of the µPDA and select a highlighted entry. It is not required that the telephone numbers be displayed.

Once a party to be called is selected, the µPDA dials the call, including necessary credit card information stored in the memory of the µPDA for this purpose.

In a further embodiment, the calls are timed and time-stamped and a comprehensive log, with areas for notes during and after, is recorded.

In another embodiment, conversations are digitally recorded and filed for processing later. A future embodiment may include a voice compression program at a host or within cellular phone 45. Compressed voice files, such as, for example, messages to be distributed in a voicemail system, may be downloaded into the µPDA or carried in a larger memory format inside the cellular telephone. The µPDA can then send the files via a host or dedicated modem attached at connector portion 20 to the optional expansion bus 40 (FIG. 6).

The cellular telephone may, in this particular embodiment, have a bus port for digital transmission. In this case, the compression algorithm along with voice system control routines are also established at the receiving end of the transmission to uncompress the signal and distribute individual messages.

In a further embodiment, voice messages may be sent in a wireless format from the cellular telephone in uncompressed digital synthesized form, distributing them automatically to dedicated receiving hosts, or semi-automatically by manually prompting individual voicemail systems before each individual message. In a further aspect of wireless transmission, a microphone/voicenote μPDA as in FIG. 10 may send previously stored voicenotes after docking in a cellular telephone interface.

In Europe and Asia a phone system is in use known as CT2, operating on a digital standard and comprising local substations where a party with a compatible cellular phone may access the station simply by being within the active area of the substation. In one aspect of the present invention, a CT2 telephone is provided with a docking bay for a μPDA, and configured to work with the μPDA. In yet another aspect of the invention, in the CT2 telephone system, and applicable to other digital telephone systems, a compression utility as disclosed above is provided to digitally compress messages before transmission on the CT2 telephone system.

It is roughly estimated that a dedicated compression algorithm may compress ten minutes of voice messages into one minute using the existing CT2 technology. This would save on telephone use charges significantly. In this aspect, there needs be a compatible decompression facility at the receiving station, preferably incorporated into a standard μPDA voicemail system for CT2 or other digital transmissions.

In a further embodiment, control routines are provided to enable the microphone/voicenote μPDA as illustrated in FIG. 10 to carry digital voicenotes, either compressed or uncompressed. When docked in a CT2-compatible μPDA cellular telephone, the μPDA in this embodiment can transmit the digital voicenotes in compressed form.

Speaker/Pager

Figure 12:
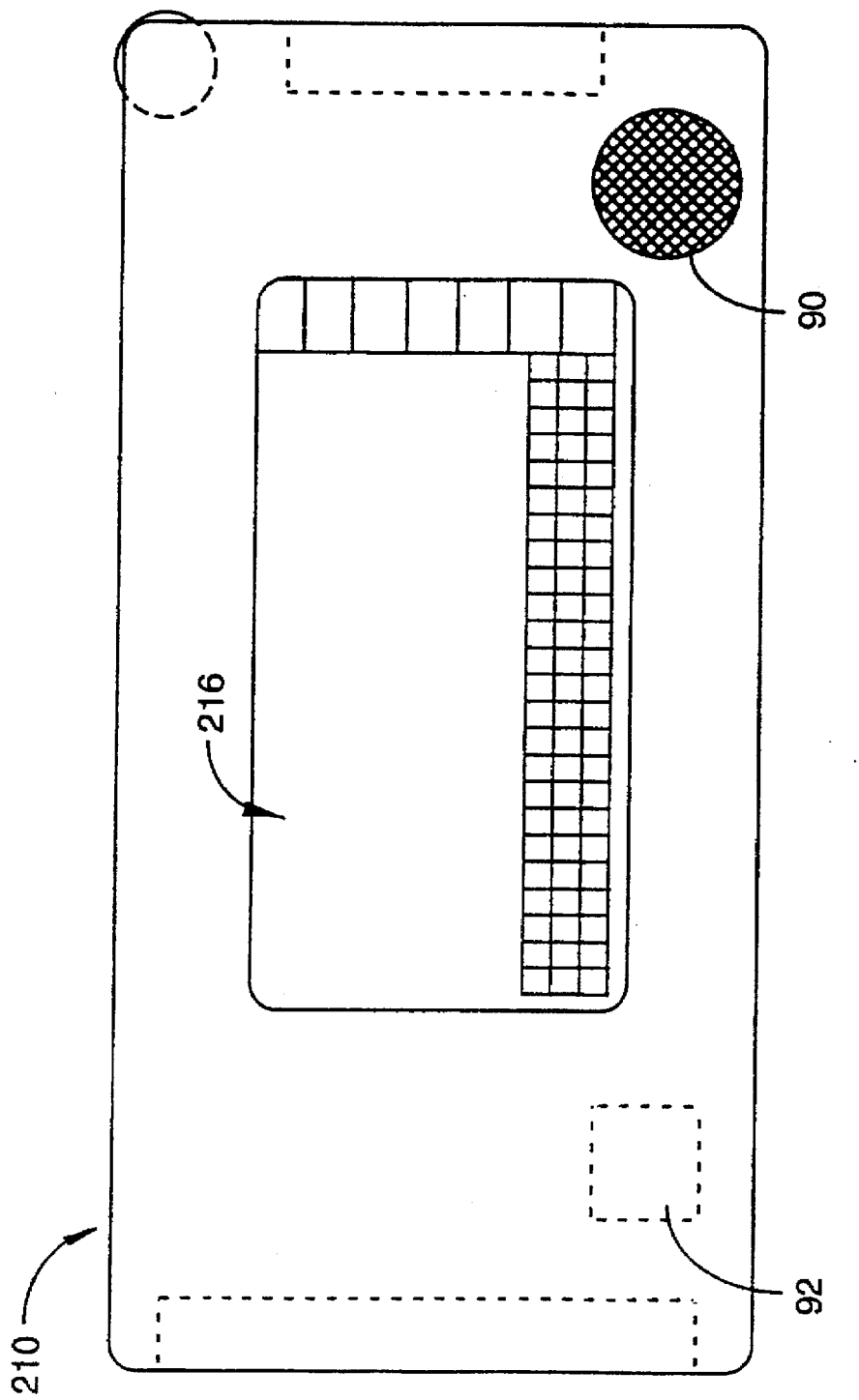
FIG. 12 is a plan view of a μPDA with a speaker and pager interface according to an embodiment of the present invention.

FIG. 12 is a plan view of a μPDA 210 with a microphone/speaker area 90 and a pager interface 92 according to an embodiment of the present invention. This μPDA has the ability to act as a standard pager, picking up pager signals with installed pager interface 92 and alerting a user through microphone/speaker 90. Once the signals are received, μPDA 210 can be docked in a compatible cellular telephone as illustrated in FIG. 11 and the μPDA will automatically dial the caller's telephone number. All other aspects are as described in the docked mode in the cellular telephone.

In another embodiment, the speaker/pager μPDA can be prompted to generate DTMF tones. The DTMF tones are generated from a caller's telephone number.

The speaker/pager μPDA can store pager requests in its onboard memory. It can also display all pager requests including time and date stamps, identification of the caller, if known, and other related information, on I/O interface 216. In this particular embodiment, a user can receive a page, respond immediately in digital voicenotes on the μPDA via speaker/microphone 90, and then send the response from a dedicated μPDA-compatible cellular telephone or conventional telephone.

Wireless Infrared Interface

Figure 13:
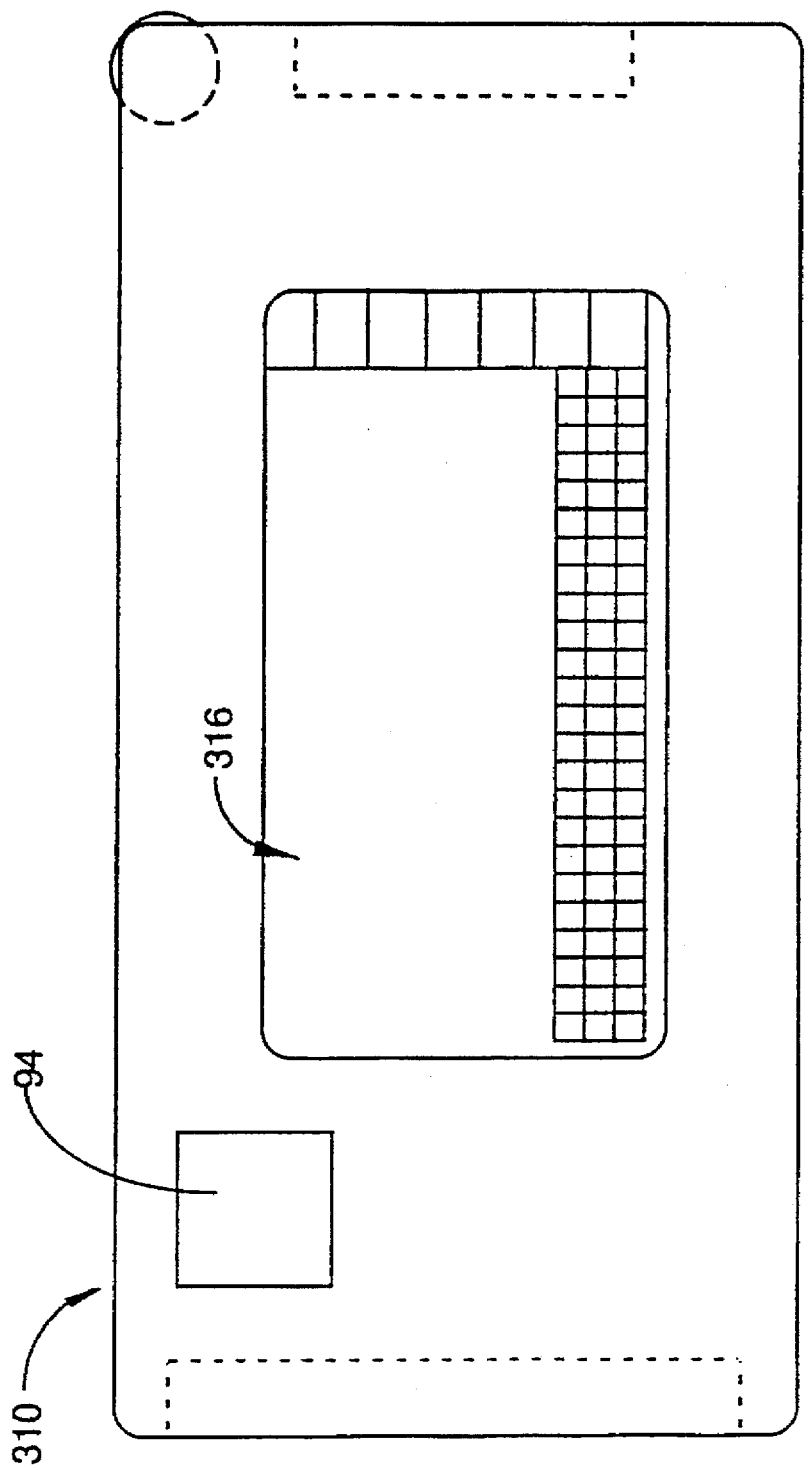
FIG. 13 is a plan view of a μPDA with an infrared communication interface according to an embodiment of the present invention.

FIG. 13 is a plan view of a μPDA 310 with an IR interface 94 according to an embodiment of the present invention. In this embodiment the μPDA may communicate with an array of conventional appliances in the home or office for providing remote control. Unique signals for the appliances are programmed into the μPDA in a learning/receive mode, and filed with user password protection. Once a correct password in entered, an icon-based menu is displayed on I/O area 316 in a user-friendly format. A master routine first queries a user for which device to access. For example, in a residential application, icons are displayed for such things as overhead garage doors, security systems, automatic gates, VCRs, television, and stereos.

In another aspect of the invention, a receiving station such as a host computer or peripheral interface has IR capabilities to communicate data directly from a nearby μPDA with an infrared interface. In a further embodiment the μPDA may interface in a cellular network and act as a wireless modem.

PERIPHERALS

A μPDA may serve as the platform for various peripheral attachments via expansion port 20 (FIG. 1B and others). Upon attachment to a peripheral, a dedicated pin or pins within expansion port 20 signal microcontroller 11, and a peripheral boot-strap application is executed. Interfacing control routines, which may reside in the peripheral or in the memory of the μPDA, are then executed, and the μPDA I/O interface displays the related menu-driven options after the linking is complete.

Scanner

Figure 14:
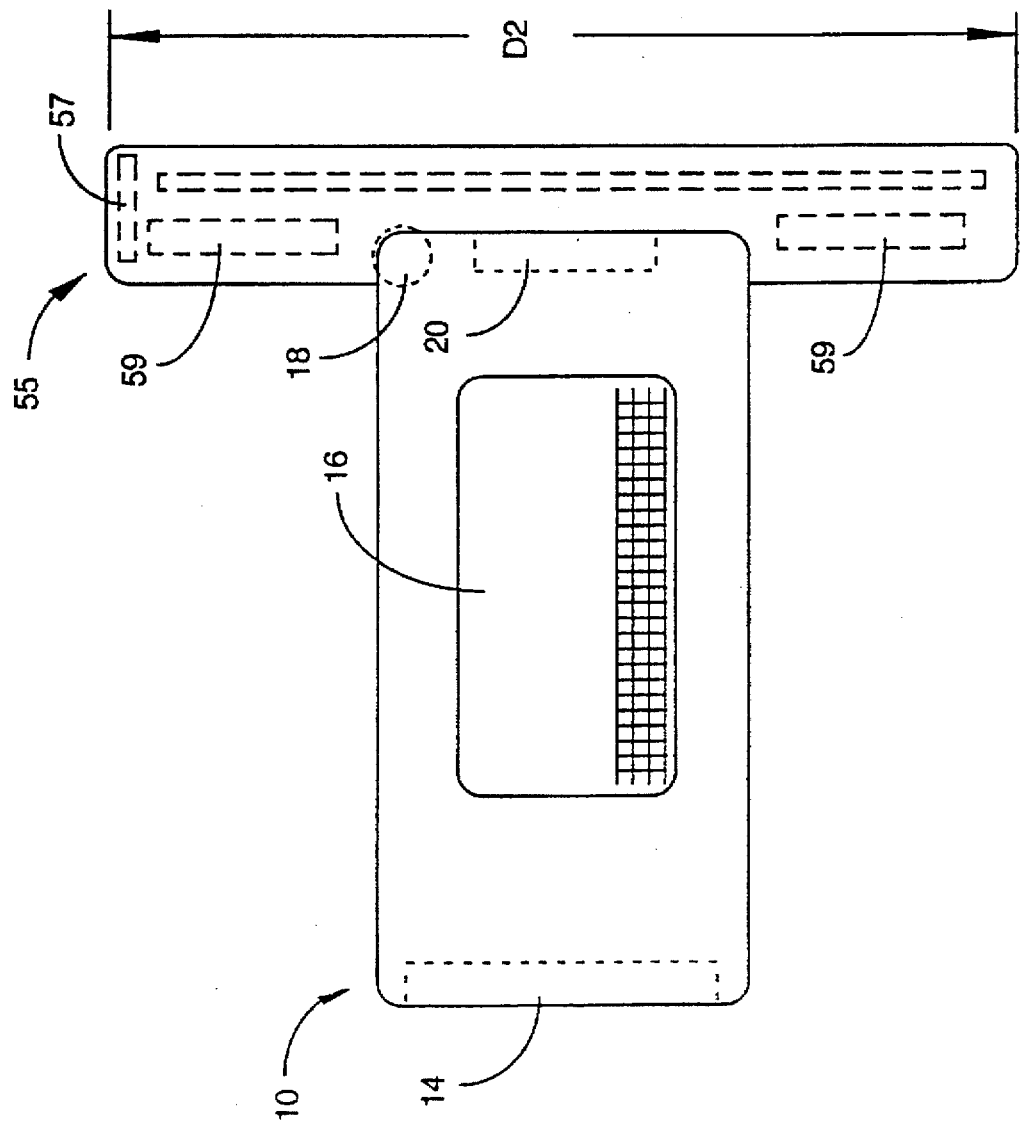
FIG. 14 is a plan view of a μPDA with a scanner attachment according to an embodiment of the present invention.

FIG. 14 is a plan view of a μPDA 10 with a scanner attachment 55 according to an embodiment of the present invention. The scanner attachment is assembled to the μPDA, making electrical connection via expansion port 20. In this embodiment the physical interface of the scanner is shaped to securely attach to the μPDA. Scanner attachment 55 has a roller wheel 57 or other translation sensor, which interfaces with wheel 18 of the ρPDA, providing translation sensing in operation for the resulting hand-held scanner. In another aspect, scanner attachment 55 has a translation device which transmits the proper signal through expansion port 20. The scanner bar is on the underside, and one or more batteries 59 are provided within the scanner attachment to provide the extra power needed for light generation.

In the scanner aspect of the invention, scanner attachments 55 of different width D2 may be provided for different purposes. The bar may be no wider than the μPDA, or may be eight inches or more in width to scan the full width of U.S. letter size documents, or documents on international A4 paper. Unique control routines display operating information on the μPDA's I/O area 16 for scanning, providing a user interface for setup of various options, such as the width of the scanner bar, and providing identification for files created in the μPDA memory as a result of scan passes. Scanned data stored in the μPDA memory may be quickly transferred to the host via host interface 14 when the μPDA is docked. Unique routines may be provided to automate the process, so the user does not have to search for files and initiate all of the transfer processes.

Facsimile Option

Figure 15:
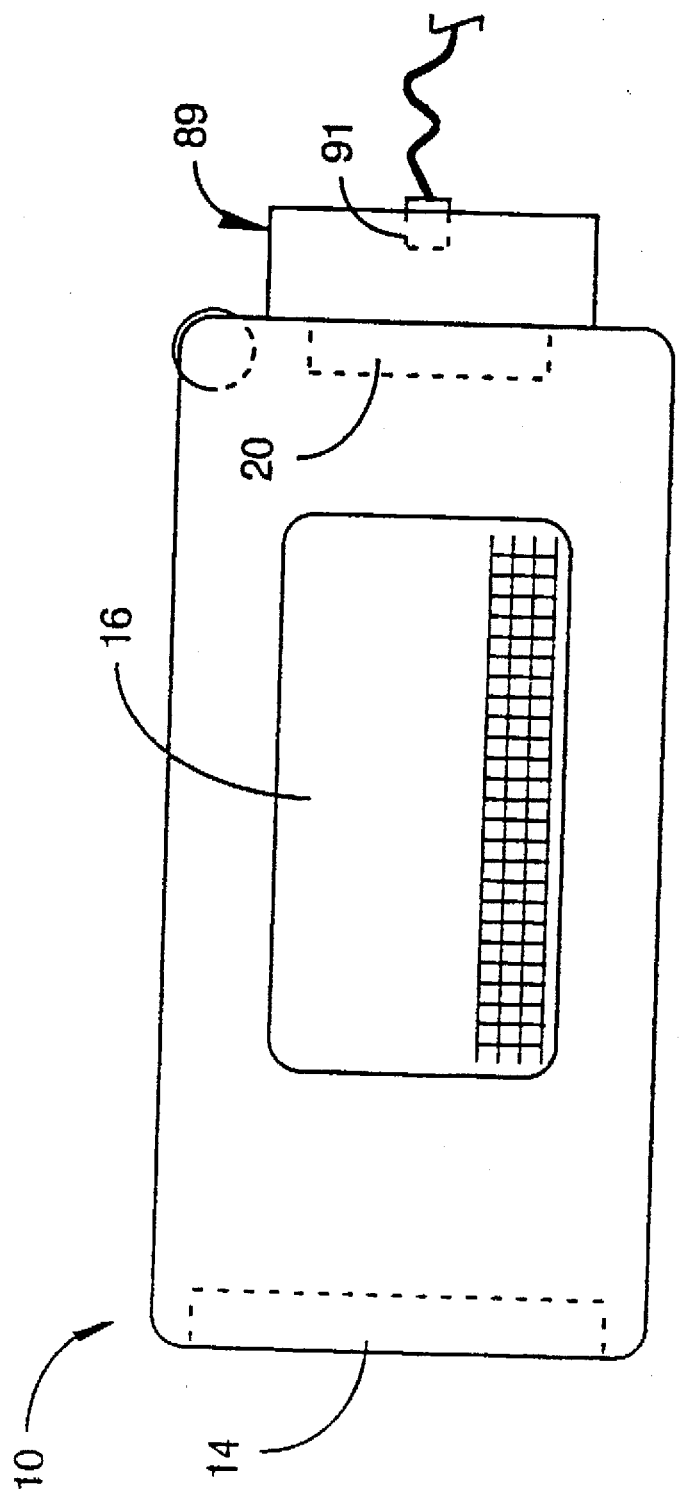
FIG. 15 is a plan view of a μPDA with a fax-modem attached according to an embodiment of the present invention.

FIG. 15 is a plan view of a μPDA with a fax-modem module 89 attached according to an embodiment of the present invention. A fax and telecommunication capability is provided via conventional telephone lines to the μPDA by fax-modem 89 interfacing to expansion bus interface 20. The fax-modem has internal circuitry for translating from the bus states of the expansion bus to the fax protocol, and a phone plug interface 91. In another aspect, the μPDA can be docked in a host and be used in combination with fax-modem 89 to provide faxing and file transfers of both host and μPDA data files. In this case, the fax-modem routines are displayed on the host monitor.

Printer

Figure 16:
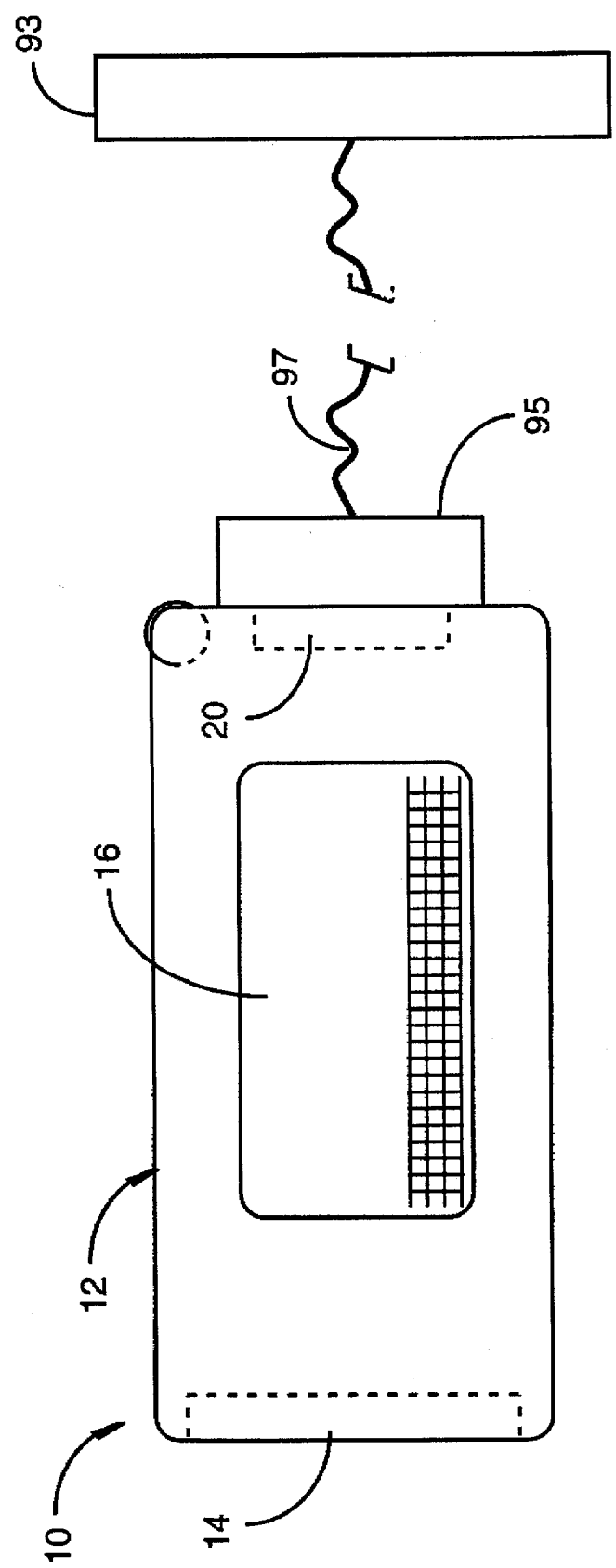
FIG. 16 is a plan view of a μPDA with a printer adapter interface according to an embodiment of the present invention.

FIG. 16 is a plan view of a μPDA with a Centronics adapter interface according to an embodiment of the present invention. A printer connector 93 engages expansion interface 20 by a connector 95 through a cable 97. Translation capability resides in circuitry in connector 93, which is configured physically as a Centronics connector to engage a standard port on a printer.

Barcode Reader and Data Acquisition Peripheral

Figure 17:
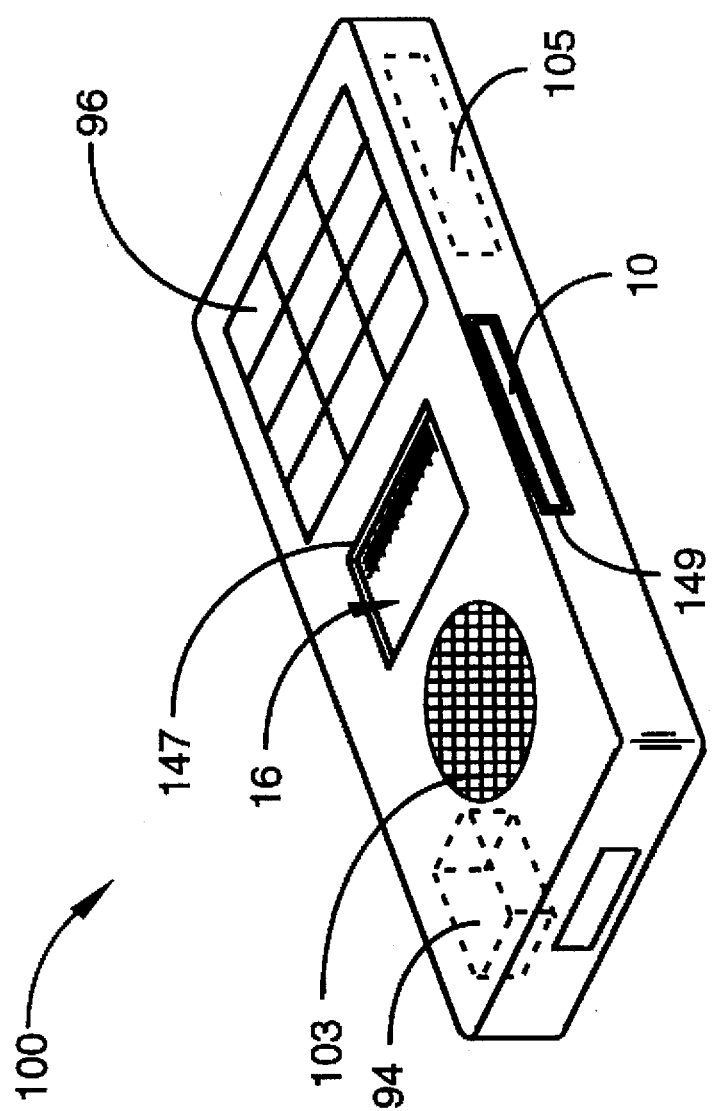
FIG. 17 is an isometric drawing of a μPDA docked in a barcode reader providing a data acquisition peripheral according to an embodiment of the present invention.

FIG. 17 is an isometric view of a μPDA 10 docked in a barcode reader and acquisition peripheral 100 according to an embodiment of the present invention. μPDA 10 is docked in docking bay 149. I/O interface 16 displays information through opening 147 according to specialized data acquisition applications. In this particular embodiment peripheral 100 has an IR interface 94, a microphone 103, a scanner port 101 (not shown), battery pack 105, and a numeric keypad pad 96 implemented as a much-sensitive array.

Application routines enable the data acquisition peripheral to operate as, for example, a mobile inventory management device. The user may scan barcode labels with scanner 101 and enter information, such as counts, on keypad 96 or by voice input via microphone 103. Since applications of peripheral 100 are very specialized, only a limited voice recognition system is needed. The voice recognition system may prompt other command routines within the master applications as well.

As inventories are collected, the database may be displayed and also manipulated directly via I/O area 16 in open bay 147, or information may be downloaded at a prompt to a nearby host via IR interface 94.

Alternatively to frequent data transmission, data may be stored or an auxiliary option memory location in peripheral 100.

In another aspect, the data acquisition peripheral may be interfaced to the analog output of a monitoring device, such as a strip chart recorder, and may digitize and store the incoming analog signals.

Solar Charge

Figure 18:
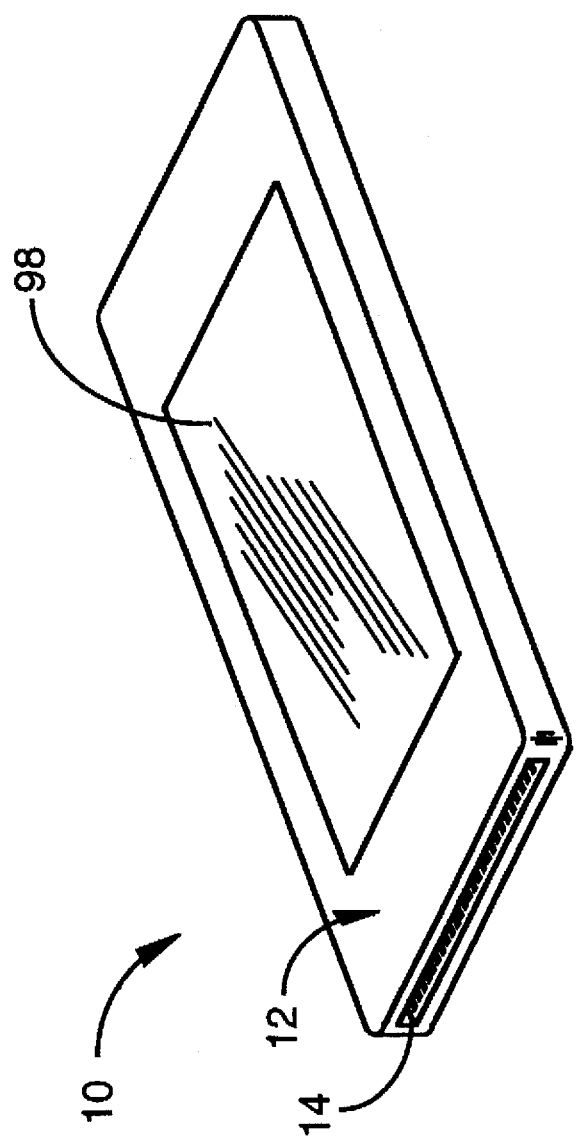
FIG. 18 is an isometric view of a μPDA with a solar charger according to an embodiment of the present invention.

FIG. 18 is an isometric view of the side of a μPDA 10 opposite the I/O interface with a solar charger panel 98 according to an embodiment of the present invention. Panel 98 is positioned so that when μPDA 10 is in strong light, such as sunlight, the solar charger absorbs the solar energy and converts it to electricity to recharger battery 15 inside the μPDA. Solar charger 98 may be permanently wired to the circuitry of the μPDA or attached by other means and connected to a dedicated electrical port or the expansion port. The solar charger is placed so that the μPDA can be fully docked in a docking port with the panel in place. In another aspect, a detachable solar charger may be unplugged before docking the μPDA, and the detachable charger may then be of a larger surface area.

Games/Conference Center

Figure 19:
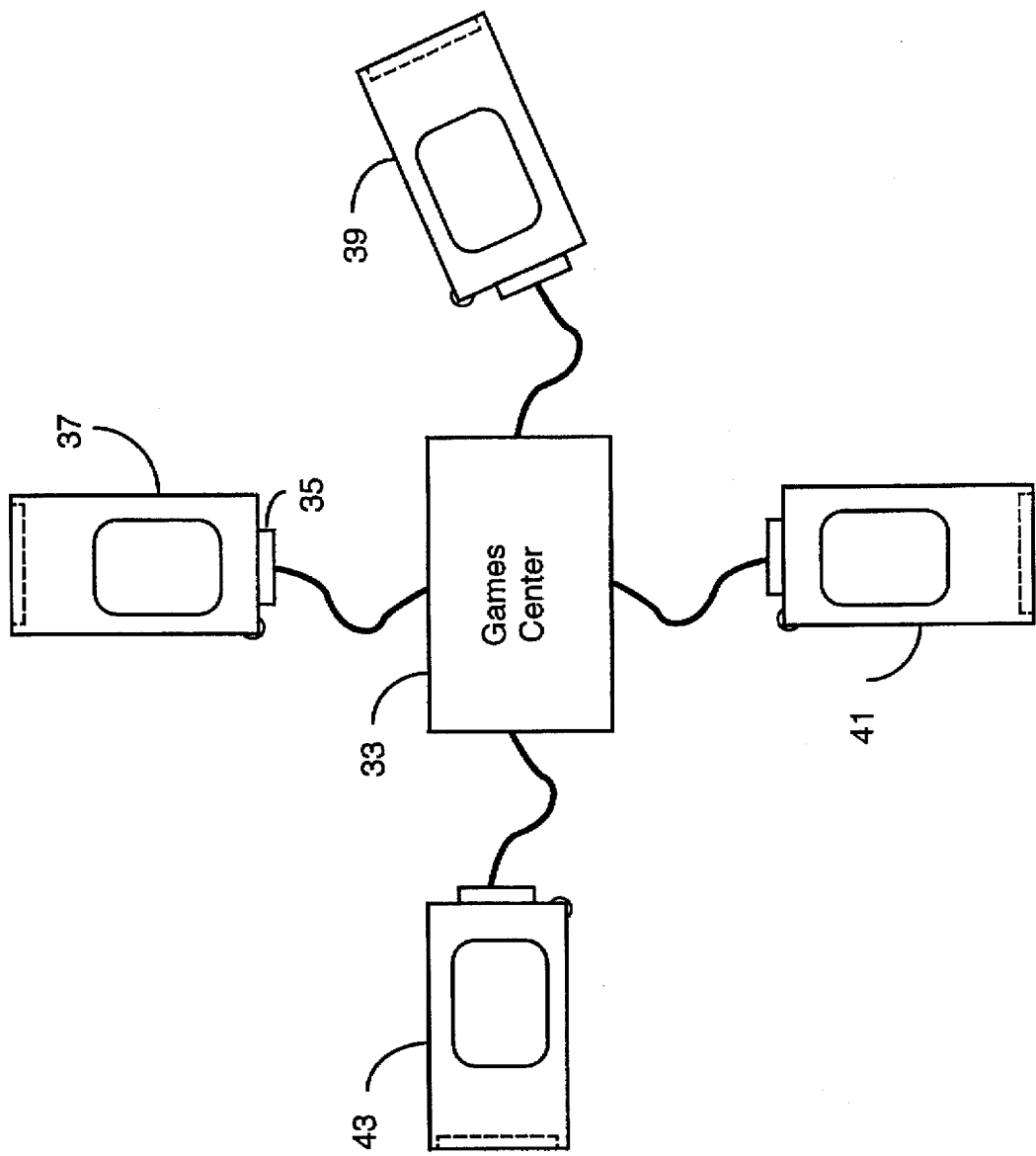
FIG. 19 is a plan view of four μPDAs interfaced to a dedicated network console providing inter-PDA communication according to an embodiment of the present invention.

FIG. 19 is a largely diagrammatic representation of a Games Center unit 33 according to an aspect of the invention for connecting several μPDA units (37, 39, 41, and 43) together to allow competitive and interactive games by more than one p, PDA user. Games Center unit 33 is controlled by an 80486 CPU in this particular embodiment. μPDAs may be connected to the central unit by cable connection via the expansion bus or the host interface of each μPDA, through a connector such as connector 35. The drawing shows four connectors, but there could be as few as two, and any convenient number greater than two.

As a further aspect of the present invention, the gaming center may serve as a conference center where a number of μPDAs may exchange information. In this way, for example through custom routines stored and executable in central unit 33, a manager may update a number of salespeoples' μPDAs, including but not limited to merchandise databases, spreadsheets, price sheets, work assignments, customer profiles, address books, telephone books, travel itineraries, and other related business information while in conference.

Standard Keyboard

Figure 20:
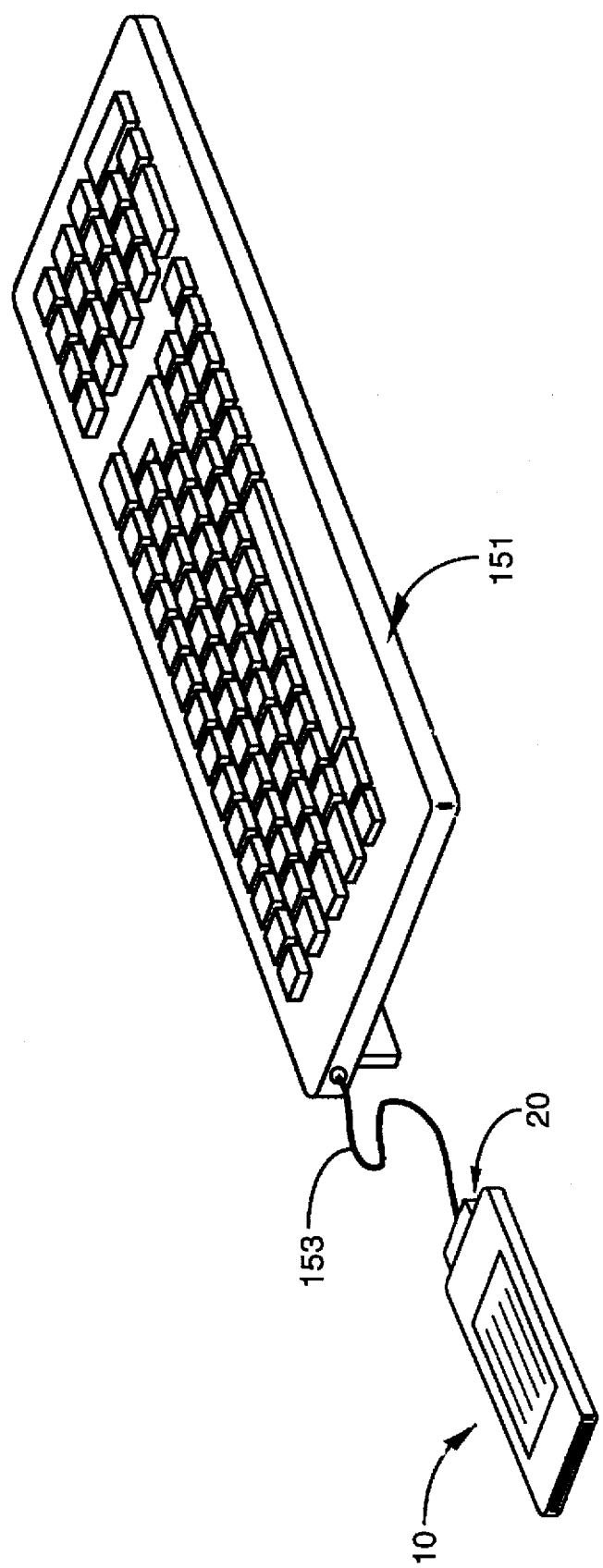
FIG. 20 is an isometric view of a μPDA according to the invention connected by the expansion port to a standard-sized keyboard.

FIG. 20 is an isometric view of a keyboard 151 connected by a cord and connector 153 to a μPDA 10 via the expansion port 20. In this example, the keyboard is a mechanical keyboard having a full-size standard key array and an on-board controller and interface for communicating with the μPDA. In other embodiments the keyboard may take many other forms, including a two-layer, flexible, roll-up keyboard as taught in U.S. Pat. No. 5,220,521.

In addition to keyboards, other input devices, such as writing tablets and the like may also be interfaced to a μPDA via expansion port 20.

There are numerous additional ways to combine different embodiments of the μPDA for useful functions. For example, an IR-equipped μPDA attached to scanner 55 may transfer large graphic files in near real time to a host computer. If the files were of text, the host may further process the files automatically through an optical character recognition (OCR) application and send the greatly reduced ASCI files back to the μPDA. As discussed above, the μPDA family of devices establishes a protocol of software security and distribution as well as having the ability to be bus mastered by a host computer system for numerous applications.

Host Computer Structure and Examples

The features of a μPDA according to the invention that allow docking in a host, with connection to a communication bus in the host have been disclosed in detail above. Such a host may be a desktop computer, a portable computer such a notebook or a laptop computer, or a specialty computerized apparatus such as the software vending machine disclosed. In any such case, the docking bay will be compatible with the connection structure and host interface bus structure of the μPDA. For example, in the case of a μPDA configured according to the size and connection standards of PCMCIA, the docking bay and connecting bus structure in the host will be to the same PCMCIA standards.

Following disclosure relates to modular portable computers suitable for use as host units for a μPDA according to the present invention. Although the specific examples given are portable, personal computers, the disclosure is not meant to limit hosts to such devices. Hosts may also be, as mentioned above, desktop units, specialty computerized apparatus, and other devices. The limitation is not related to overall architecture, but to the presence of a compatible docking bay and a host CPU configured for communicating with the μPDA.

The disclosure below relative to host systems also describes a number of different kinds of modules that may be inserted and operated through a docking bay, but is not meant to suggest that only those modules disclosed may be so operated. Operation of a μPDA according to an embodiment of the present invention may be affected through host software configured to establish communication with a μPDA.

Figure 21A:
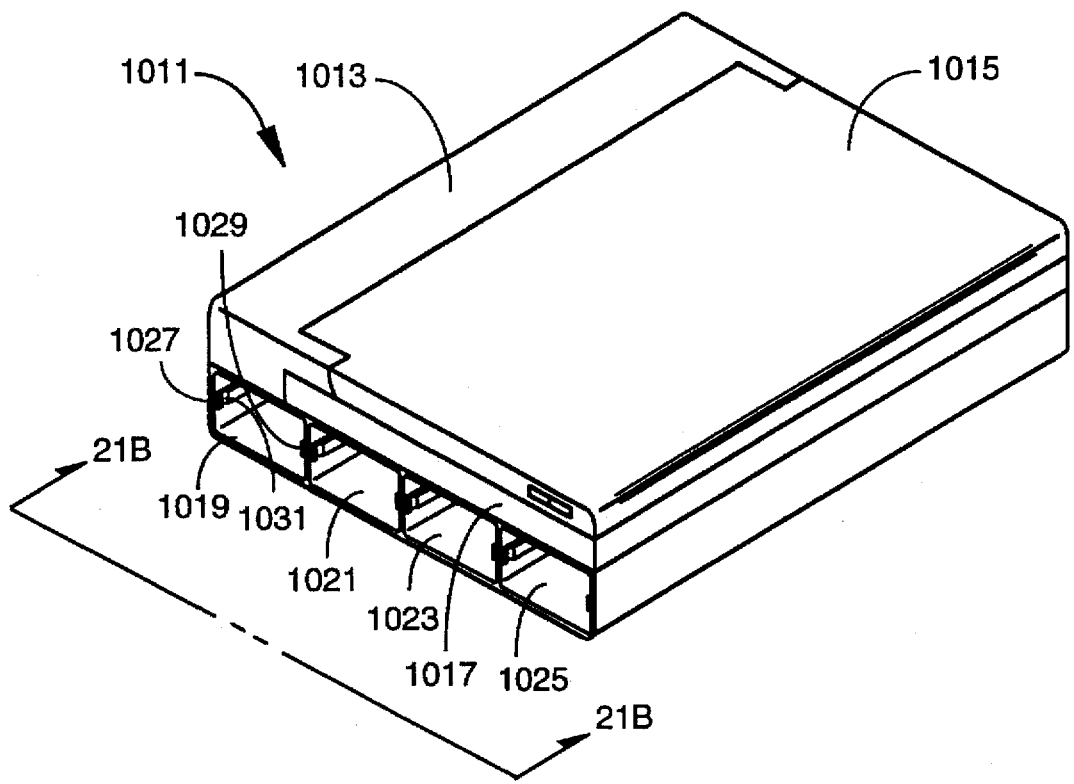
FIG. 21A is an isometric view of a modular notebook computer framework according to an embodiment of the present invention.

FIG. 21A is an isometric drawing of a notebook computer framework 1011 according to an embodiment of the invention. Framework 1011 comprises a back housing 1013, a tilt-up flat panel display 1015, shown closed, a keyboard 1017, and a plurality of module bays for plugging in function modules. Back housing 1013 includes a power unit for converting electrical input on a wide variety of standards to the form required by the computer. For example, there is a port (not shown) for connecting to a standard household outlet, rated at 120 V., 60 Hz, alternating current. The power unit will convert the input to outputs as needed by the computer bus and functional modules. There are also input ports for 6 V. DC, 12 V. DC, 9 V. DC, and others, and the power unit in one embodiment of the present invention is capable of recognizing the input characteristics by sampling, and switching to proper on-board circuitry to utilize the input.

In the embodiment shown by FIG. 21A four module bays 1019, 1021, 1023, and 1025 are shown along one side of the framework. There are four more module bays along the other side of the framework opposite the module bays shown. There could be more or fewer module bays, but eight is convenient and a good balance between the need to stay small and simple, and to also have adequate versatility.

Figure 21B:
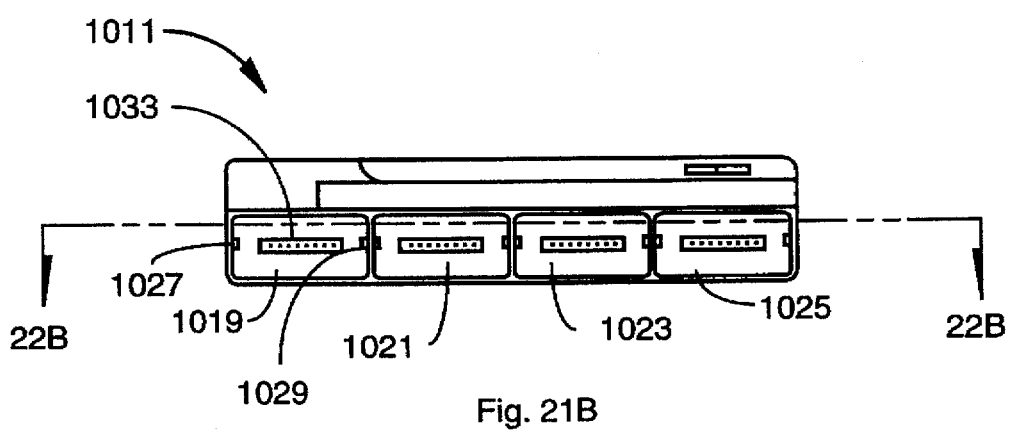
FIG. 21B is a view of the computer framework of FIG. 21A from one side from the vantage of line 21B—21B on FIG. 21A.

FIG. 21B is an end view of the notebook computer framework of FIG. 21A in the direction of arrows 21B—21B of FIG. 21A. Each of the module bays has a set of guide and positioning rails such as rails 1027 and 1029 in bay 1019. The rails are to position and guide a function module inserted into the module bay. Each rail in a set has a detent such as detent 1031 for latching a module when the module is fully inserted in the bay. Each bay also has a connector such as connector 1033 in bay 1019. The connectors are for coupling to a mating connector on a function module inserted in a bay. It will be apparent to a person with skill in the art that there are a number of equivalent ways guide rails, detents, and coupling may be accomplished.

Figure 22:
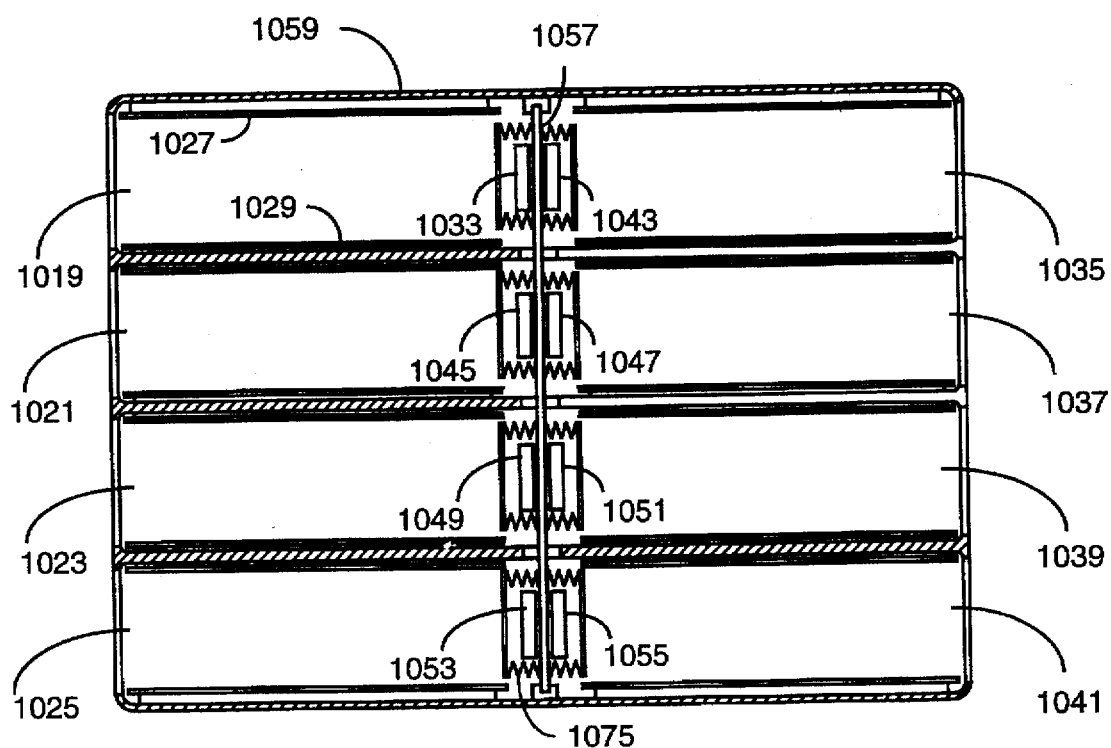
FIG. 22 is a sectioned plan view of the computer framework of FIG. 21A taken according to section line 22—22 of FIG. 21B.

FIG. 22 is a plan section view just above the module bays taken along section line 22—22 of FIG. 21B. Bays 1019, 1021, 1023, and 1025 are shown on one side of the section view, and bays 1035, 1037, 1039, and 1041 along the opposite side. A printed circuit board structure 1057 is fastened in a substantially vertical position down the center of frame 1059, and connectors 1033, 1043, 1045, 1047, 1049, 1051, 1053, and 1055 are connected to the printed circuit board structure and present their pin structure outward toward the respective bay areas. In the presently described embodiment the internal connectors are male connectors, but this is not a requirement of the invention.

As also shown in FIG. 21A, each module bay has a pair of opposed rails located vertically at about the midpoint of the height of the module bay. Rails 1027 and 1029 serve module bay 1019, and similar rails are located in each of the other module bays.

Figure 23:
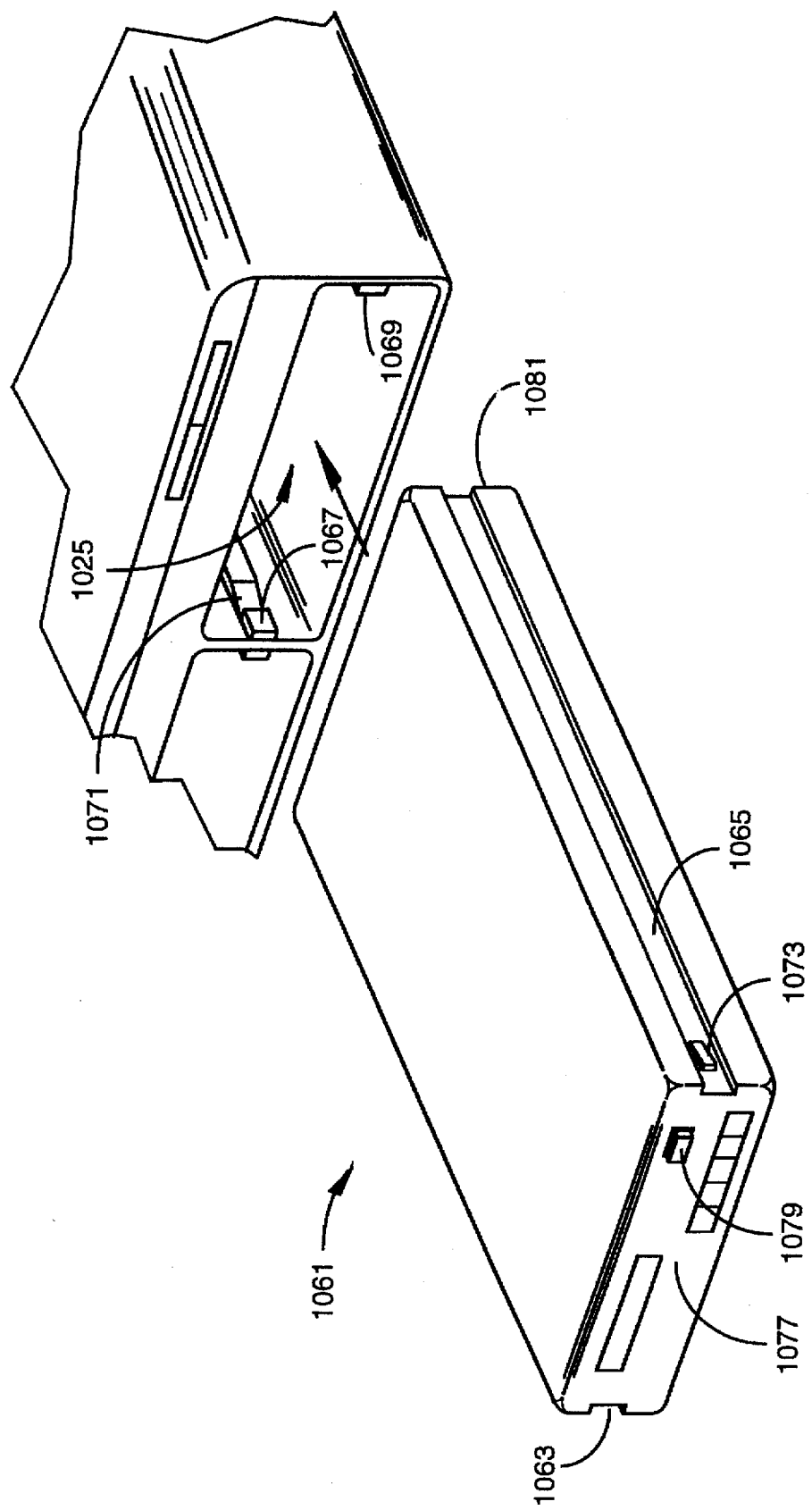
FIG. 23 is an isometric illustration showing a function module according to the present invention associated with a docking bay of the framework of FIG. 21A.

FIG. 23 is an isometric view of a function module 1061 according to the invention aligned with module bay 1025 of framework 1011. Module 1061 includes guides 1063 and 1065 on opposite sides for engaging rails 1067 and 1069 when module 1061 is inserted into bay 1025. The module has two spring-loaded detent levers (lever 1073 is shown) for engaging detents in guide rails 1067 and 1069 when the module is fully inserted. Detent 1071 is shown in rail 1067 in FIG. 23.

Each module bay has a compression spring mechanism engaged by a function module as the module nears full insertion, so there is an outward force on the module when the detent levers engage the detents. Mechanism 1075 (FIG. 22) is exemplary. To insert a module one aligns the guides in the module with the guide rails and pushes the module into the module bay until the detents engage. Button 1079 on front face 1077 of the module is for retracting the detent levers of the module, in which case the spring mechanism ejects the module, much as is the case with some floppy disk drives.

Figure 24:
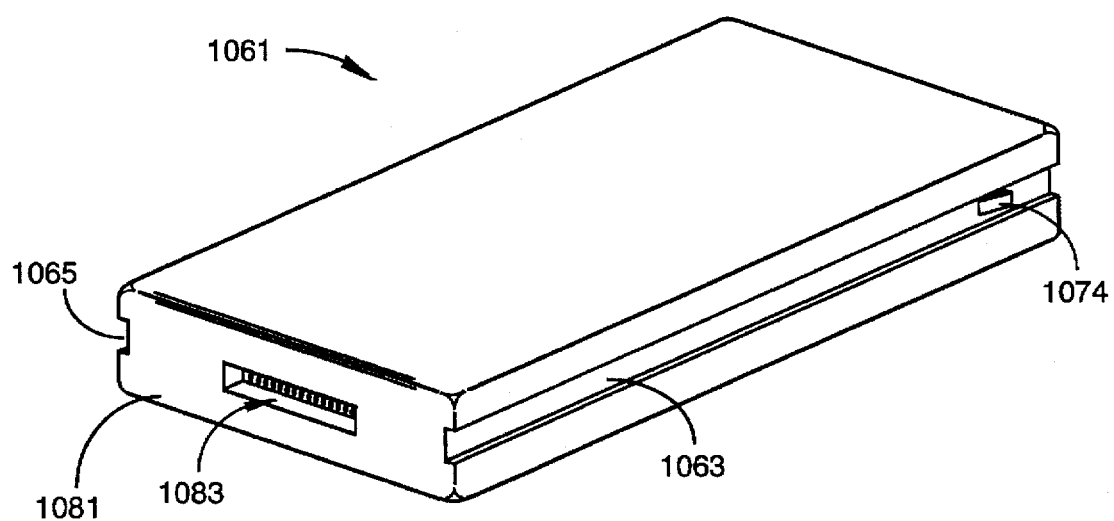
FIG. 24 is another view of a function module according to the present invention.

FIG. 24 is an isometric view of function module 1061, showing back face 1081 opposite front face 1077. The back face includes a recessed female connector receptacle 1083 in the preferred embodiment, for mating with male connectors positioned in each pod bay, such as connector 1033 in FIG. 21B and FIG. 22. A second detent lever 1074 is opposite lever 1073 of FIG. 23.

In the embodiment described above, and in many other embodiments, the notebook computer framework of the present invention comprises a frame with module bays and connectors as described above for "plugging in" function modules, power supply units, and other peripheral devices. The framework also comprises display 1015, keyboard 1017, and an internal bus structure hereinafter termed the Notebus, which is described in additional detail below, in the section titled "Notebus Bus Structure".

Figure 34:
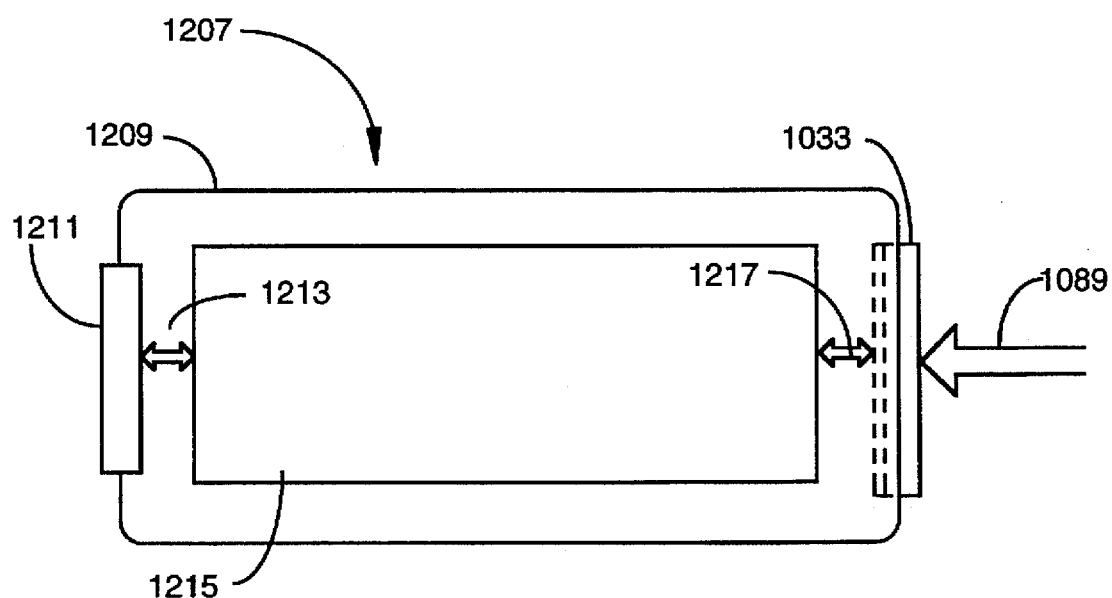
FIG. 34 is a block diagram of a data acquisition module according to an embodiment of the present invention.

The function modules, as represented by module 1061 in FIG. 23 and FIG. 34, are provided in a wide variety of different models capable of a wide variety of different functions. For example, framework 1011 has no "on-board" CPU, battery power, or system memory. These functions and all other functions are provided by different models of function modules which may be inserted in any one or a combination of the available module bays. Other kinds of function modules that may be inserted include floppy-disk drives, hard-disk drives, "flashcard" memory modules, LAN and modem adapters, Fax modules, specialty modules such as data acquisition modules adapted to specific equipment, and more. The function modules are also described in more detail in the section below titled "Function Modules".

Figure 25:
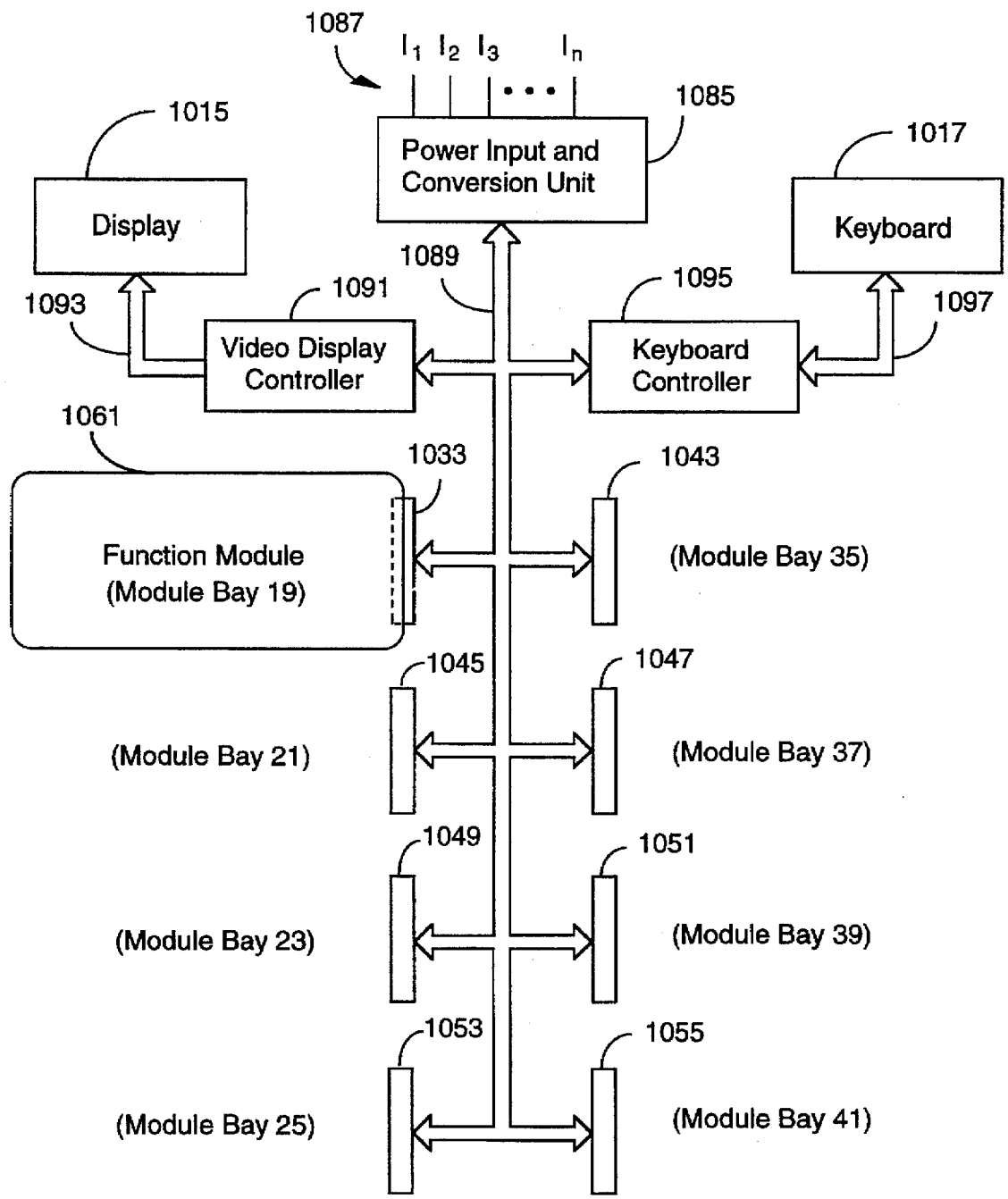
FIG. 25 is a block diagram of a compressed bus and connection to docking bays in a computer framework according to an embodiment of the present invention.

FIG. 25 is a block diagram showing internal elements of Notebook computer framework 1011, connected to show the electronic architecture of the notebook computer according to the invention. Power input and conversion unit 1085 is housed in back housing 1013 (FIG. 21A) and has ports 1087 for power inputs. Unit 1085 senses the input conditions and selects appropriate circuitry to convert the input to the voltages needed to power the other elements of the system. Output from the conversion unit is to Notebus 1089, which comprises paths for power as well as for digital information such as data and addresses.

Because there are a wide variety of function modules, as indicated above and described in more detail below, there needs typically to be more than one power line in the Notebus. For example, the notebook computer of the invention comprises hard disk drive modules, and these modules are preferably provided without their own "on board" power source. The motor drive for the hard disk requires a different power (voltage and current) than does a CPU, for example, so there are parallel power lines of differing size and voltage level in the notebus. A typical Notebus will have, for example, a line for 24 V DC, another for 12 V DC, and yet another for 5 V DC, as well as multiple ground lines.

Notebus 1089 connects to a video display controller 1091 including Video Random Access Memory (VRAM) which both powers and controls display 1015, which in the preferred embodiment is a flat panel display driven by analog driver lines on analog bus 1093. Notebus 1089 also connects to a keyboard controller 1095 which powers and controls keyboard 1017 over link 1097, accepting keystroke input and converting the input to digital data for transmission on Notebus 1089. The keyboard controller may be physically mounted in the keyboard or in framework 1011.

Notebus 1089 also connects as illustrated in FIG. 25 to each of the module bays, such as bay 1019, through connectors, such as connector 1033. When a function module, such as module 1061, is inserted into a module bay, the mating connector in the back of the function module mates with the connector from the Notebus, and circuitry inside the function module is then connected to the Notebus.

The Notebus comprises, as stated above, both power and data paths. The digital lines are capable of carrying 32 addresses and conveying data in 32 bit word length. To minimize pin count and routing complexity, addresses and data are multiplexed on a single set of 32 traces in the overall bus structure. One with skill in the art will recognize that this type of bus is what is known in the art as a low-pin-count or compressed bus. In this kind of bus different types of signals, such as address and data signals, share signal paths through multiplexing. For example, the same set of data lines are used to carry both 32-bit addresses and data words of 32-bit length.

In the Notebus of the present invention, some control signals, such as interrupt arbitration signals, may also share the data lines. Typical examples of buses that are exemplary as usable for the Notebus (with the exception of power supply analog lines in the Notebus) are the "S-Bus" implemented by Sun Microsystems, the "Turbochannel" Bus from Digital Equipment Corporation, and buses compatible with the IEEE-488 standard.

The Notebus is a high-speed backplane bus for interconnecting processor, memory and peripheral device modules. The Notebus also supplies standard operating and standby power supply voltages and electrical ground to all module bays.

FIG. 23 and FIG. 24 show, as described above, two different views of a function module according to the present invention. Also as stated above, function modules may have many different functions. There are as many different functions, in fact, as there are possibilities for discrete peripheral devices, plus power and CPU modules. An individual function module is provided for each function, and in each case the function module has a physical size and form compatible with the bays, guide rails, and connectors for "plugging in" to framework 1011.

The "face" of a function module, being the exposed face when the module is "plugged in" (see face 1077 in FIG. 23) may have elements specific to the type of module. For example, a CPU module may have no indicators or other elements on the front face, while a floppy disc module will typically have an opening for inserting a floppy disk and a "key" or button for releasing and ejecting the floppy disk.

A unique feature of the present invention is that the CPU for the notebook computer is provided as a CPU function module. This provides an ability for a user to tailor the CPU power to the other modules and application for the notebook computer, and an easy upgrade to more powerful CPUs.

Figure 26:
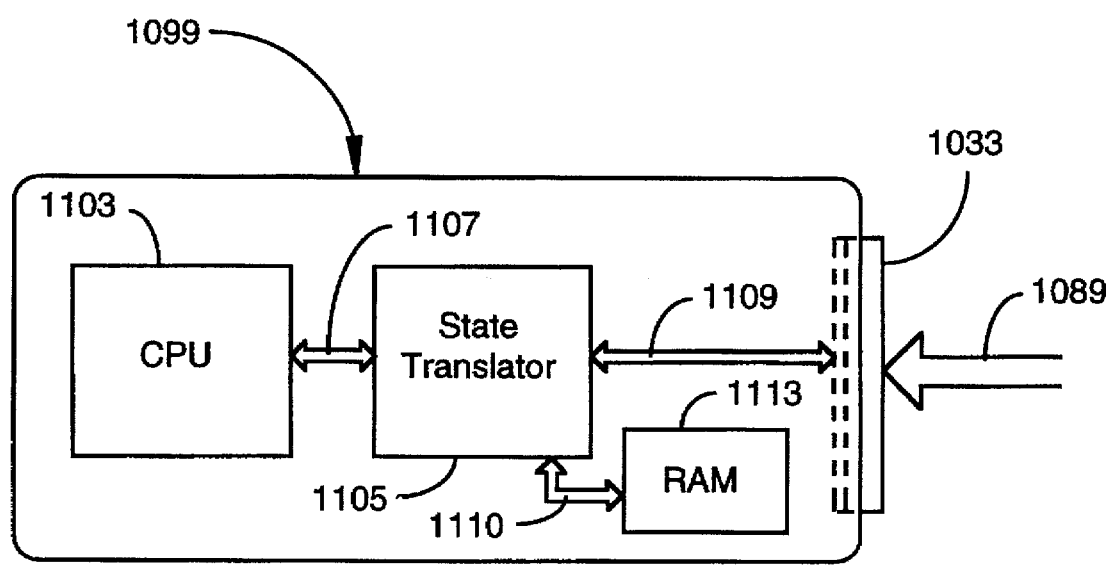
FIG. 26 is a block diagram of a CPU function module according to an embodiment of the present invention.

FIG. 26 is a diagram of a CPU module 1099 plugged into a bay in a notebook computer according to the present invention. In this case (referring to FIG. 22) the module is plugged into bay 1019 having connector 1033. This is exemplary, as the module could just as well be plugged into any open bay of framework 1011. By virtue of being plugged into connector 1033 or another module connector, internal elements of the CPU module are connected to Notebus 1089.

The internal elements for module 1099 comprise CPU 1103, a state translator 1105, and RAM memory 1113. CPU 1103 may be any of a wide variety of CPUs (also called in some cases MPUs) available in the art, for example Intel 80386 or 80486 models, MIPS, RISC implementations, and many others. CPU 1103 communicates with State Translator 1105 over paths 1107, and State Translator 1105 communicates with connector 1033, hence Notebus 1089, over bus 1109 internal to the module, which is an extension of bus 1089 when the module is plugged into bus 1089.

State translator 1105 is a chip or chip set designed to translate commands and requests of the CPU to commands and requests compatible with the Notebus. It was mentioned above that CPU 1103 may be one of a wide variety of CPUs, and that Notebus 1089 may be any one of a wide variety of compressed buses. It will be apparent to one with skill in the art that there may be an even wider variety of state translators 1105 for translating between the CPU and the Notebus. The state translator is theoretically a different device for each possible combination of CPU and Notebus.

RAM memory module 1113 comprises conventional RAM chips mounted on a PCB as is known in the art, and connectable to state translator 1105 by a plug or connector interface, such as an edge connector. The purpose of having a RAM module "on board" the CPU module is to provide for rapid memory access, which will be much slower if the RAM is made available in a separate module at one of the other module bays. Memory at another module bay is on the Notebus, and will be subject to bus contention and wait states. The plug-in nature of the RAM unit relative to the CPU module allows different amounts of memory to be provided with a CPU module in the notebook computer of the present invention.

As described above, Notebus 1089 comprises not only the shared data and address lines, but also power and ground connections for the modules plugged into the various bays. Paths 1109 and 1107 therefore comprise power and ground lines for CPU 1103 and Translator 1105.

If, for example, CPU 1103 is an INTEL 80486 microprocessor, State Translator 1105 will be a translator for accommodating the state machine of the 80486 to the state machine of the Notebus, which may be any one of the buses described above for bus 1089, or another compressed bus. There are many equivalent ways a translator may be implemented for the specific case. Given the manufacturers available design information for the CPU and the equivalent information for bus 1089, it is within the skill of workers in the art without undue experimentation to implement the translator and the required connections. This is conventional technology. The implementation of the translator on a module with a CPU to plug into a module bay in the notebook computer is unique to the present invention.

In the invention, state translators may be implemented in a single chip set or circuitry set to be capable of translating between a number of CPUs and a number of different bus possibilities. One might, for example, design and implement a translator with the necessary circuitry and intelligence to translate between three different CPUs and three different compressed buses. The state translator could be made hardware or software programmable to select one CPU and one bus from the available selections at some convenient time in the manufacturing cycle, or even at the time of selection of modules to make up a notebook computer.

As an example of a hardware programmable translator, a translator could be built to have certain traces cut as a near final step in manufacture as a way of selecting the CPU and bus pair. Translators could also be programmable by virtue of on-board EPROM or EEPROM devices. As an example of software programmability, translators could be implemented with microprocessor technology and software programmable. A CPU module could be plugged into a connector on a special programming unit, for example, before installation in a notebook computer according to the present invention, and be sent certain commands to set up on board software to translate between the desired CPU and bus. It will be apparent to one with skill in the art that there are many possible variations in the implementation of the translators.

Figure 27:
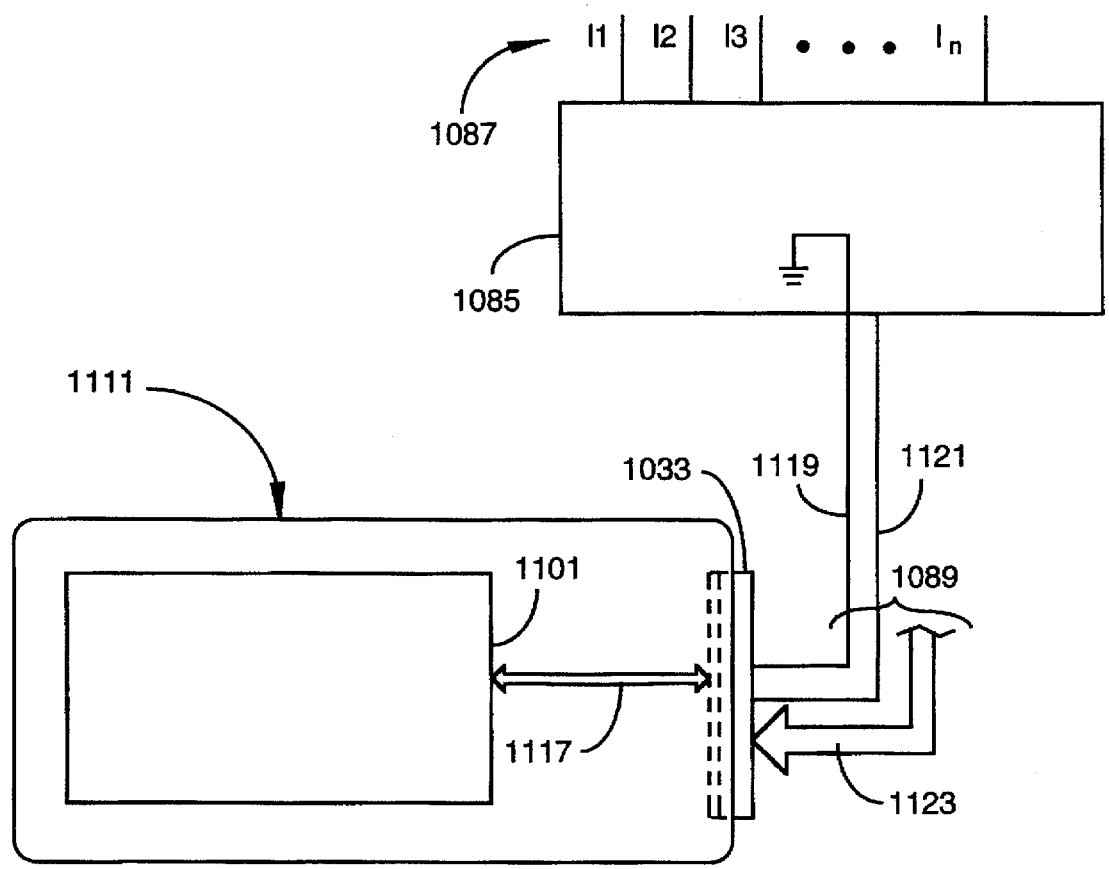
FIG. 27 is a block diagram of a power supply function module according to an embodiment of the present invention, with indication of connections to the internal bus structure and power conversion unit of the computer.

FIG. 27 shows a power module 1111 plugged into a bay in the notebook computer according to an embodiment of the present invention. The purpose of a power module is to provide a source of power for the computer, which includes any modules plugged into the module bays. As is common in notebook computers in the art, there may be a battery, typically rechargeable, in framework 1011, and the battery may also be replaceable and rechargeable through power input lines 1087. In the case of an on-board battery pack, there is the option of using all module bays for other than power packs.

Preferably framework 1011, sans function modules, has no power capability other than power plugged into one of input lines 1087, which may be converted to the power characteristics needed by the computer and distributed on the power lines of the Notebus. For portability, power is typically supplied by one (or more) power modules 1111 plugged into one or more of the module bays.

Module 1111 has a battery pack 1101 which is connected via lines 1117 to (in this case for example) connector 1033, and hence to Notebus 1089. Because there are several supply lines in the Notebus for supplying power to function modules at different voltage and with different current capability, the power lines in the Notebus for connecting a power module 1111 are not the same as the lines for supplying power to a module. There is instead a separate set of power lines to pins on the module bay connectors, such as connector 1033, which connect as input to power input and conversion unit 1085, much as do input ports 1087.

In FIG. 27, lines 1119 and 1121 connect power module 1011 to conversion unit 85, where the power input from the power module is sensed and treated as a power source, much as is done for power input lines 1087. This power is converted to the needed voltages and current capabilities, and put back out on the power supply output lines to the module bays. In FIG. 27 line 1119 is ground, and arrow 1123 represents all of the data/address, control, and power output lines to the module bays. Lines represented by arrow 1123, plus lines 1119 and 1121 are Notebus 1089. Although not shown in FIG. 27, there are connections for line 1119 and for line 1121 to each of the module bay connectors.

Power modules such as module 1111 may be plugged into a connector on a charging module separate from the notebook computer, using the same connector used for plugging into the Notebus via a module bay of framework 1011, and recharged for later use with a modular notebook computer according to the invention. This allows a user to keep spare power modules ready for use, and to recharge modules without connecting the computer itself to a charging unit. Moreover, the provision of power modules allows a user to provide more or less portable time to the notebook computer by using one or more than one power module.

Figure 28:
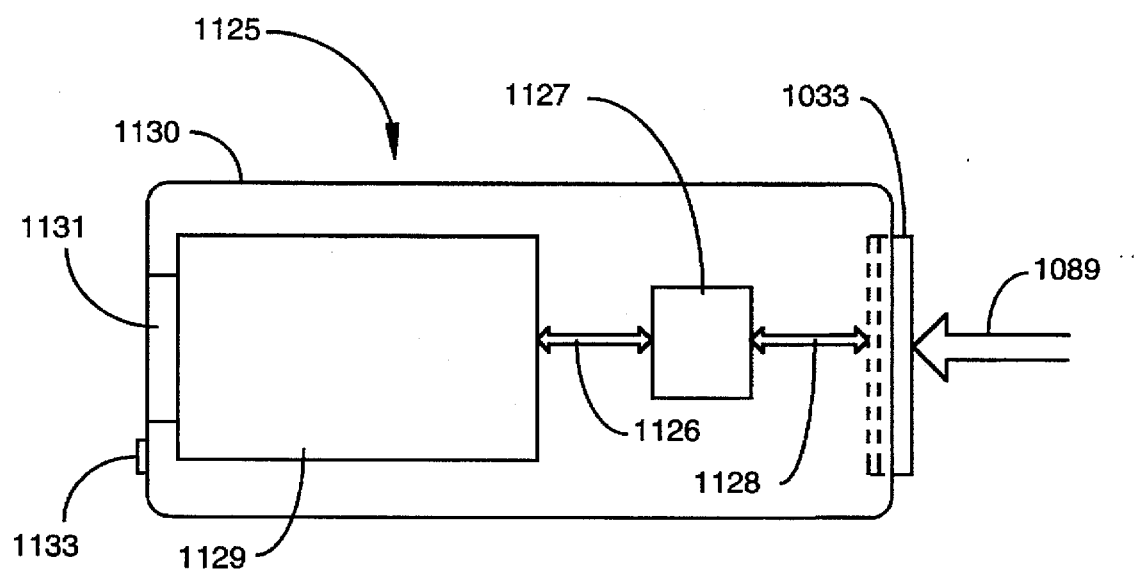
FIG. 28 is a block diagram of a floppy disk drive function module used in the invention.

FIG. 28 shows a floppy disk drive (FDD) module 1125 plugged into a module bay in a notebook computer according to an embodiment of the present invention. Module 1125 comprises a conventional FDD unit 1129 for nominal 3.5 inch disks with conventional circuitry mounted in a case 1130 to provide a module with guides, latches, and a connector matable with connector 1035 to be able to plug into a module bay in the notebook computer of the present invention. The case comprises an opening 1131 for inserting and withdrawing a floppy disk, and an eject button 1133 for ejecting a floppy disk.

A controller 1127 communicates with unit 1129 over lines 1126 and with connector 1033 (hence Notebus 1089) over lines 1128. The unit also derives power from the appropriate pins on connector 1033, but these pins and lines are not shown. Controller 1127 is an ASIC chip or chip set for translating between the notebus and the FDD unit. Given the data storage standards of the FDD unit and the characteristics of bus 1089, it is within the scope of workers with ordinary skill in the art to implement controller 1127 without undo experimentation.

Figure 29:
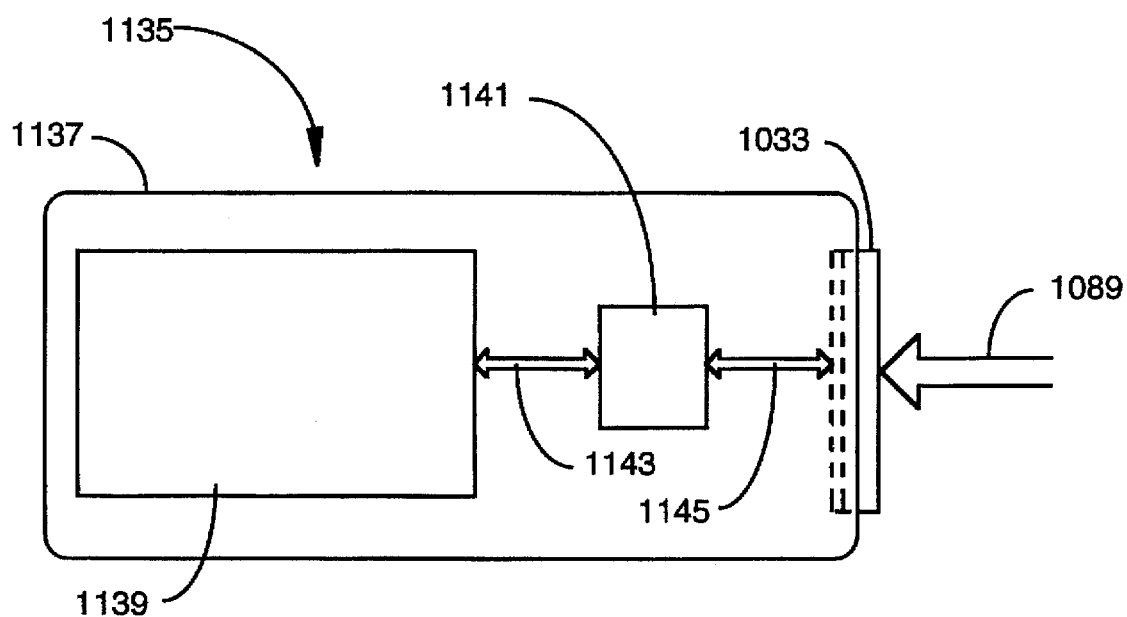
FIG. 29 is a block diagram of a hard disk drive module used in an embodiment of the invention.

FIG. 29 shows a hard disk drive (HDD) module 1135 according to an embodiment of the present invention plugged into bus 1089 in a module bay of framework 1011. HDD module 1135 comprises a conventional HDD unit 1139 mounted in a case 1137 to be compatible with plugging into a notebook computer according to the present invention. As in the case of the FDD module described above, a controller 1141 is provided to translate between Notebus 1089 and the HDD unit. Controller 1141 communicates with HDD unit 1139 over lines 1143, and with connector 1033 over lines 1145. Connector 1033 is exemplary of any one of the module connectors in the notebook computer.

Given the characteristics of HDD unit 1139 and of Notebus 1089, it is within the skill of workers in the art to implement controller 1141 without undue experimentation. Power line connections are not shown. In implementing controller 1141 there are several protocols that may be used. One is the ST506 standard known in the art. Another is the IDE standard known in the art. Yet another is an enhanced IDE, called EIDE, known to the inventors, and the subject of a separate patent application to be filed. In the EIDE protocol, there may be multiple IDE devices daisy-chained and addressed as secondary IDE devices with an additional select number.

Figure 30:
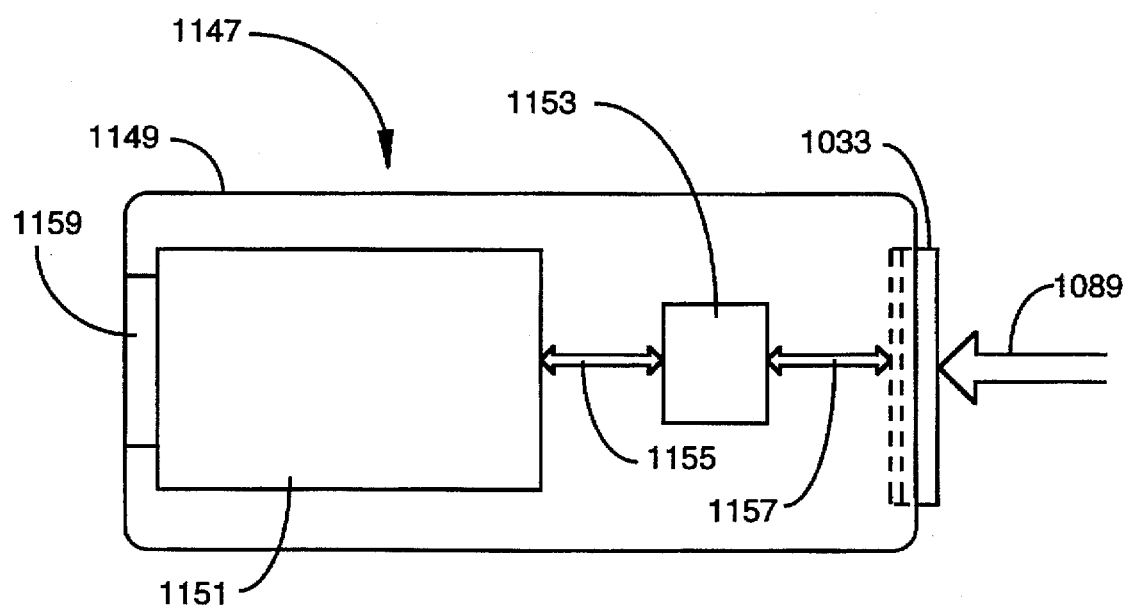
FIG. 30 is a block diagram of a "flash card" memory module according to an embodiment of the present invention.
Figure 31:
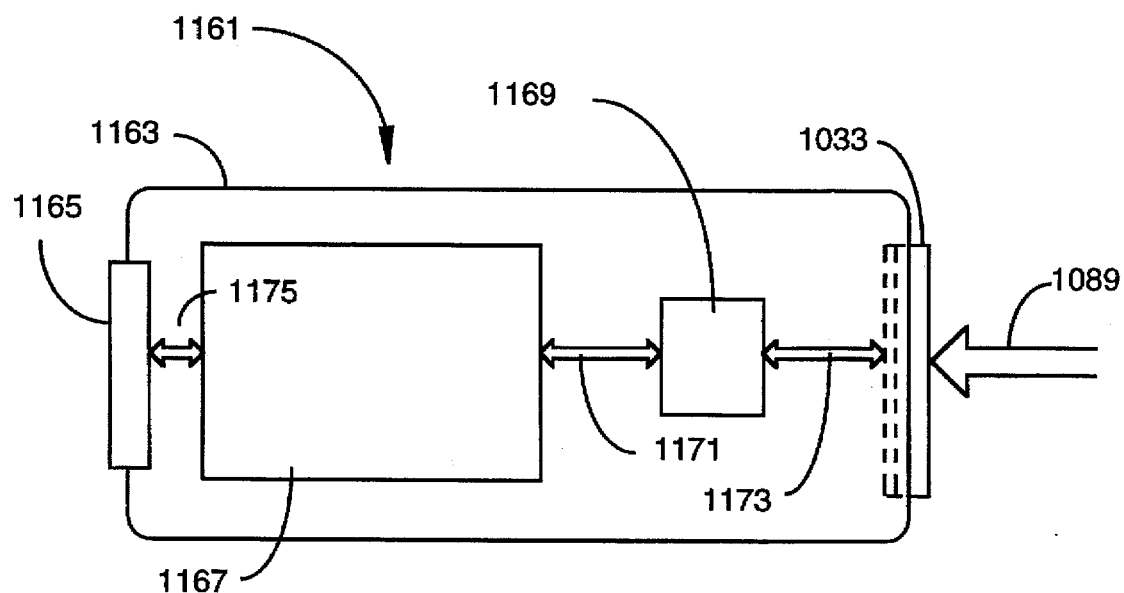
FIG. 31 is a block diagram of a LAN module according to an embodiment of the present invention.

FIG. 30 shows a "flash card" memory module 1147 plugged into connector 1033 of the notebook computer of the invention. "Flash cards" are RAM memory cards known in the art pluggable into typically parallel ports to make connection with internal bus structures of a computer. Module 1147 comprises a conventional "flash card" 1151 mounted in a case 1149 compatible with the module bay of a notebook computer according to the present invention.

As in cases described above, a controller 1153 is needed to accomplish communication between the memory structure of the "flash card" and bus 1089. Controller 1153 communicates with "flash card" unit 1151 over lines 1155 and with connector 1033 over lines 1157. There may optionally be an opening 1159 in case 1149 and a connector (not shown) within unit 1151 for inserting and withdrawing flash cards, so relatively large collections of data may be plugged in as desired. Alternatively the interface may be the modular interface afforded by the plug-in module 1147. Again, given the known characteristics of the flash card and of bus 1089, implementation of the controller is a matter within the skill of workers in the art.

FIG. 1011 shows a LAN module 1161 plugged into connector 1033 of a notebook computer according to an embodiment of the present invention. In the embodiment shown in FIG. 1011 a conventional LAN card, such as an Ethernet card, is mounted in a case 1163 to be compatible with plugging into a module bay of a notebook computer according to an embodiment of the present invention.

LAN card 1167 communicates with a conventional connector 1165 in the face of the case of module 1161 that is exposed when the module is plugged into a bay. This is a conventional connector of the sort known in the art for connecting computers on a network.

Within module 1161, in a first alternative, conventional LAN card 1167 interfaces to a controller 1169 communicating over lines 1171 and 1173, and the controller translates between bus 1089 and the conventional LAN card. In a second alternative, a LAN card is provided with the translation built in, so no separate controller is needed. The first alternative is preferable.

Figure 32:
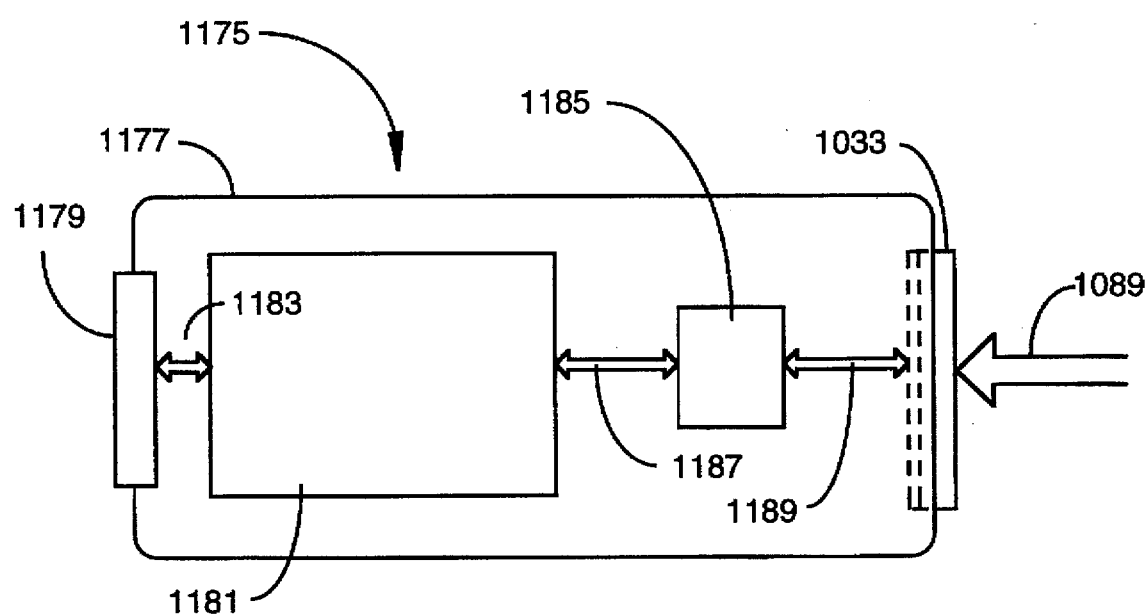
FIG. 32 is a block diagram of a modem module according to an embodiment of the present invention.

FIG. 32 shows a modem module 1175 plugged into connector 1033 in a bay of a notebook computer according to an embodiment of the present invention. Modem module 1175 comprises a conventional modem card 1181 mounted in a case 1177 to be compatible with plugging into a module bay. In this case, and other cases above, where the term "conventional" is used in conjunction with a card or unit, it is meant that the circuitry and function is conventional. The size may be adjusted to be compatible with a module case for plugging into a bay of a notebook computer according to the present invention.

Modem card 1181 connects over lines 1183 to a telephone interface 1179, which may comprise more than one "jack" so a hand set may also be connected. Card 1181 communicates to Notebus 1089 over lines 1187 and 1189 through controller 1185, which translates between the conventional card and the compressed bus. Alternatively, the translation components may he implemented on a single card along with the modem circuitry.

Figure 33:
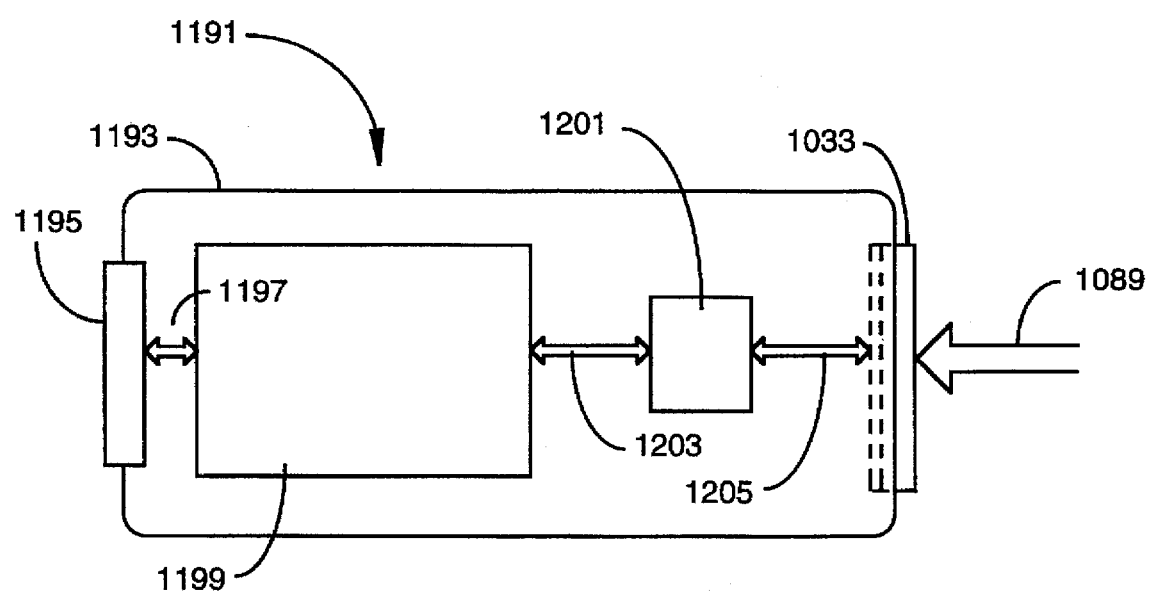
FIG. 33 is a block diagram of a FAX module according to an embodiment of the present invention.

FIG. 33 shows a FAX module 1191 plugged into connector 1033 of a module bay in an embodiment of the present invention. Module 1191 comprises a conventional FAX card 1199 mounted in a case 1193 to be compatible with plugging into a module bay in the present invention. Fax card 1199 communicates over lines 1197 with a telephone interface 1195, which may, as in the case of the modem module described above, have more than a single telephone "jack".

A controller 1201 provides an interface for the conventional FAX card between the card and Notebus 1089 over lines 1203 and 1205. Alternatively, the controller may be implemented on the same card as the FAX circuitry. In yet another alternative, the FAX capability and the modem capability described above may be implemented into a single module.

FIG. 34 shows a specialty data acquisition module 1207 plugged into connector 1033 in a module bay in a notebook computer according to an embodiment of the present invention. Module 1207 comprises a circuit card 1215 mounted in a case 1209 to be compatible with plugging into a module bay. Card 1215 communicates over lines 1213 to an interface 1211 which may comprise one or several acquisition leads for connecting to outside equipment. For example, a data module may be provided for following the output of the vertical and horizontal sweep of an oscilloscope, and would have at least two input leads; one for the vertical and one for the horizontal sweep.

Card 1215 communicates over lines 1217 to connector 1033, hence Notebus 1089. The circuitry on card 1215 is designed to digitize the input if the input is analog, and to be compatible with Notebus 1089. Given the characteristics of signals to be measured and the characteristics of Notebus 1089, implementation of such a card is within the ordinary skill in the art.

The embodiments of the present invention described above relate primarily to notebook type computers. However, the invention has broader applications. The principles of the invention are also applicable to portable computers known as palmtop computers, and further embodiments are described below.

Figure 35A:
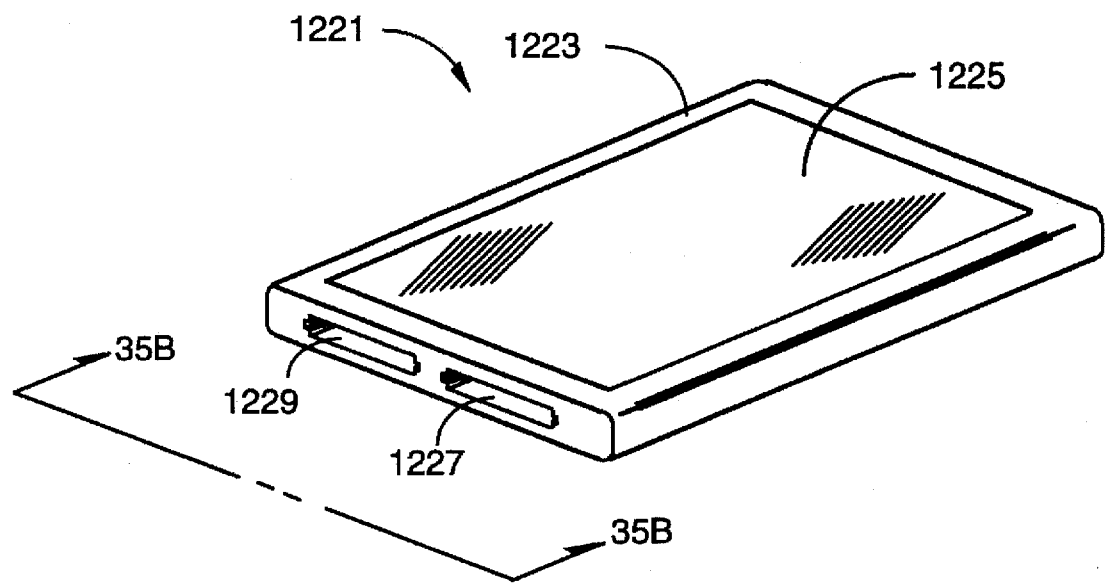
FIG. 35A is an isometric view of a modular palmtop computer framework according to an embodiment of the present invention.

FIG. 35A is an isometric view of a modular palmtop computer 1221 according to an embodiment of the invention. Computer 1221 is approximately the size of one-half a standard piece of paper (approximately 5.5 inches by 8.5 inches) and in a preferred embodiment comprises a planar array of four Personal Computer Memory Card International Association (PCMCIA) Type II module bays in a case 1223.

In this embodiment case 1223 has a combination I/O area 1225 implemented on one side of computer 1221, comprising a display overlaid with a touch sensitive planar structure. In other embodiments, the display may be a flat-panel display pivoted to the case, or a separate monitor in communication with case 1223. The touch screen provides a "softkey" operation in conjunction with interactive control logic. In a preferred embodiment of the invention, the control logic resides in static or dynamic memory within case 1223 but may also be part of an installed PCMCIA-type peripheral. A power unit (not shown) is enclosed within case 1223 for converting electrical input on a wide variety of standards to the form required by the computer. For example, there is a port (not shown) for connecting to a standard household outlet, rated at 120 V., 60 Hz, alternating current. The power unit converts the input to outputs as needed by the computer bus and function modules. There are also input ports for 6 V. DC, 12 V. DC, 9 V. DC, and others, and the power unit in one embodiment of the present invention is capable of recognizing the input characteristics by sampling, and switching to proper onboard circuitry to utilize the input.

In the embodiment of the invention shown by FIG. 35A, two module bays 1227 and 1229 are provided on one side of case 1223. There are two more module bays along the other side of the case opposite the module bays shown. In other embodiments bays may open to other edges of the case. The configuration provides a good balance between the need to stay small and simple, and to also have adequate versatility. In alternative embodiments other module configurations may be used, such as PCMCIA Type III, and others. In the alternative configurations the arrangement of the planar array of modules may vary as well.

Figure 35B:
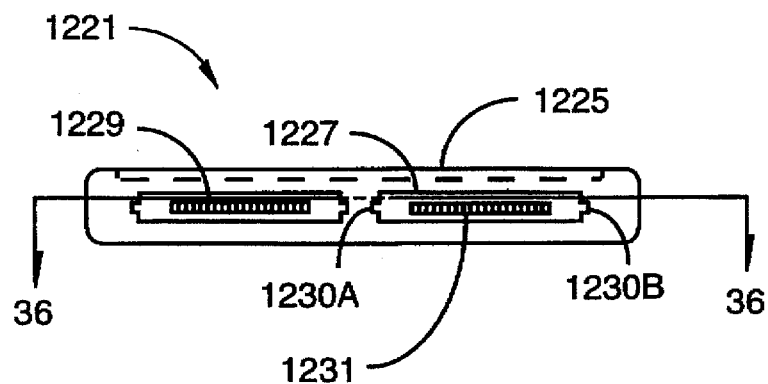
FIG. 35B is a view of the computer framework of FIG. 35A from one side from the vantage of line 35B—35B on FIG. 35A.

FIG. 35B is a view of computer 1221 in the direction of arrows 35B—35B of FIG. 35A. I/O area 1225 is located on top of case 1223. Module bay 1227 has a set of guide slots 1230A and 1230B. The guide slots are to position and guide a PCMCIA module card inserted into the module bay. Each module bay in this embodiment is configured to PCMCIA dimensional and connective standards and secures the fitted PCMCIA cards according to those standards. In this embodiment of the present invention, case 1223 has bays configured to PCMCIA type 2, revision B standard. In another embodiment of the invention, the case may have other types of PCMCIA module bays, or bays configured to one or another proprietary standard.

Each module bay has a bus connector, such as connector 1231. In this embodiment, connector 1231 is a standard PCMCIA connector that accepts PCMCIA cards and is electrically connected to the palmtop's internal bus. It will be apparent to those with skill in the art that there are a number of equivalent ways to connect a function module.

Figure 36:
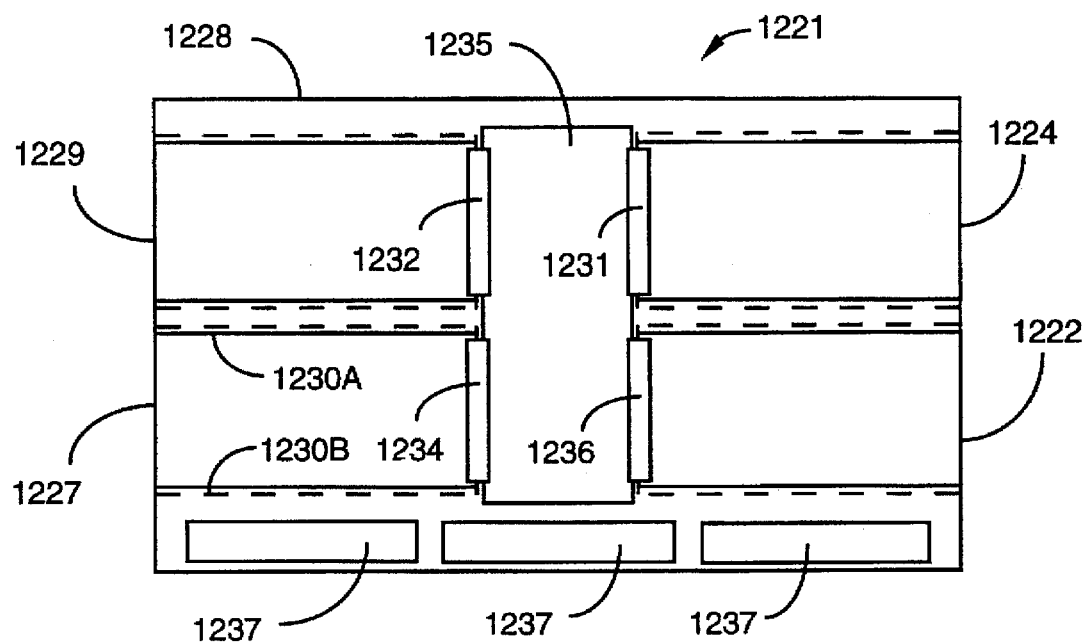
FIG. 36 is a sectioned plan view of the computer framework of FIG. 35A taken along section line 36—36 of FIG. 35B.

FIG. 36 is a simplified plan sectional view of computer 1221 taken according to section line 36—36 of FIG. 35B. Frame 1228 frames four PCMCIA module bays 1222, 1224, 1227 and 1229 arranged in a planar array. A printed circuit board structure 1235 is fastened and positioned down the center of frame 1228, and connectors 1231, 1232, 1234 and 1236 are connected to the printed circuit board structure and present their pin structure outward toward the respective bay areas. In the presently described embodiment, the internal connectors are male connectors, but this is not a requirement of the invention.

Slots 1230A and 1230B serve to guide a PCMCIA-type card into module bay 1227, and similar slots are located in each of the other module bays shown as dotted lines in the sectional view. A set of three AA batteries 1237 are located generally in the plane of the module bays and provide a portable power means in one embodiment. In another embodiment, outside power sources may power computer 1221 as described above.

Figure 37:
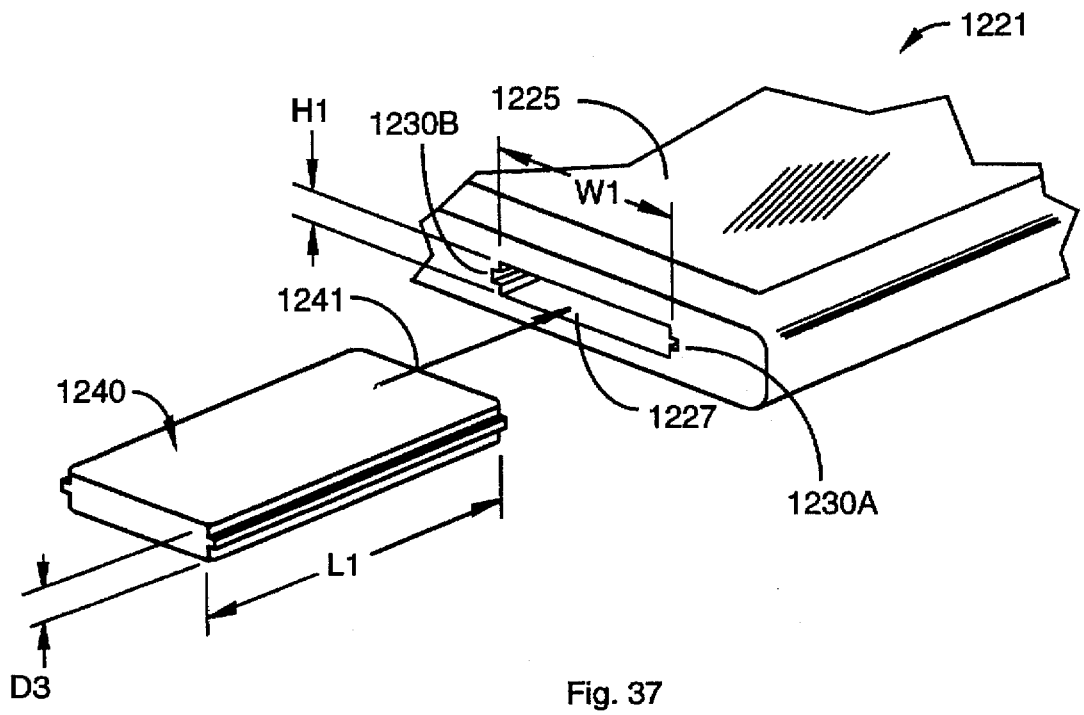
FIG. 37 is an isometric illustration showing a function module and a dedicated docking bay in an embodiment of the present invention.

FIG. 37 is a partial isometric view of a function module 1240 according to an embodiment the invention, aligned with module bay 1227 of computer 1221. Arrow 1241 shows the direction of insertion of the function module. I/O area 1225 is implemented on top of case 1223 in a plane parallel with the plane of the module bays. Module 1240 is a Type 2 PCMCIA card and has a thickness D3. The opening of module bay 1227 has width W1 and height H1. The length of function module 1240 is L1. In this embodiment of the present invention, these dimensions conform to PCMCIA industry standards. In an alternative embodiment of the present invention, module bay 1227 may change in dimension to accommodate other standard or proprietary modules.

Module bay 1227 engages function module 1240 in the full inserted position according to PCMCIA standards. In another embodiment of the invention, detents may be provided similar to those in FIG. 3 for the larger notebook computer embodiment. There are a number of ways known in the art to position and secure a small module. Securing a module may also be accomplished by other means, such as clamping or wedging and/or closing retaining mechanisms.

Figure 38:
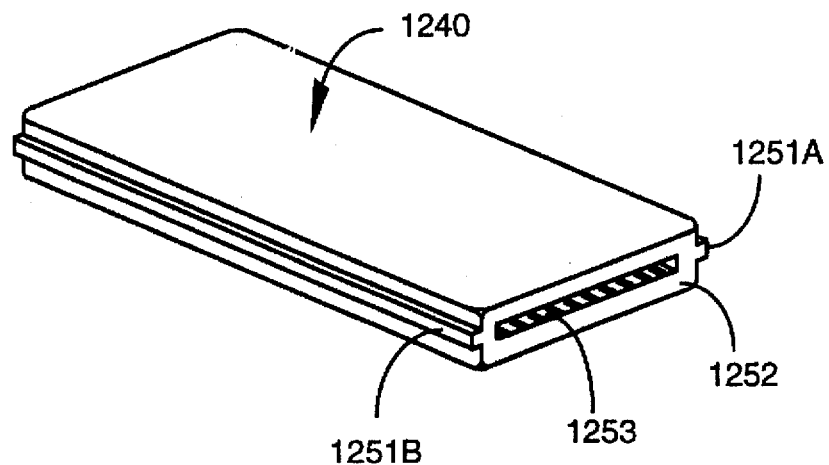
FIG. 38 is another view of a function module according to an embodiment of the present invention.

FIG. 38 is an enlarged isometric view of function module 1240 according to Type 2 PCMCIA standards. Back face 1252 includes a female connector 1253 for mating with a male connector positioned in each module bay, such as connector 1231 in FIG. 35B and FIG. 36. Connectors 1231 and 1253 are PCMCIA connectors and interface according to that industrial standard. Guide 1251A and 1251B are sized according to the PCMCIA standards.

Function modules are provided in many models capable of a wide range of functions. For example, computer 1221 in one embodiment has no onboard CPU or system memory. These functions are provided by function modules that may be inserted in any one of the available module bays. Other kinds of function modules that may be inserted include I/O system modules that provide speech-based, pen-based or keyboard based input. There are also floppy-disk drives, hard-disk drives, flashcard memory modules, LAN and modem adapters, Fax modules, specialty modules such as data acquisition modules adapted to specific equipment, specialty video modules, modules to adapt scanner periherals to the computer, telephone adapters, and more. In the case of I/O modules, necessary software, and in some cases firmware and hardware, may be connected to the internal bus structure by the insertion of a module. For example, a module is provided in one embodiment comprising an induction coil and a controller for decoding signals received via a varying magnetic field and providing code to the computer's internal bus. The varying magnetic field is produced by a stand-alone keyboard wherein the keystrokes are coded and transmitted as signals on the field.

In another embodiment, a similar module provides for communication from an auxiliary pen-based input pad. In yet another embodiment, a plug-in module provides a microphone, DSP circuitry, and necessary software to accept input from a user by voice, and to convert the voice input to machine-readable code. Provision of the necessary software and circuitry in these instances in module form provides for maximum flexibility an upgradability for modular systems according to the invention.

Figure 39:
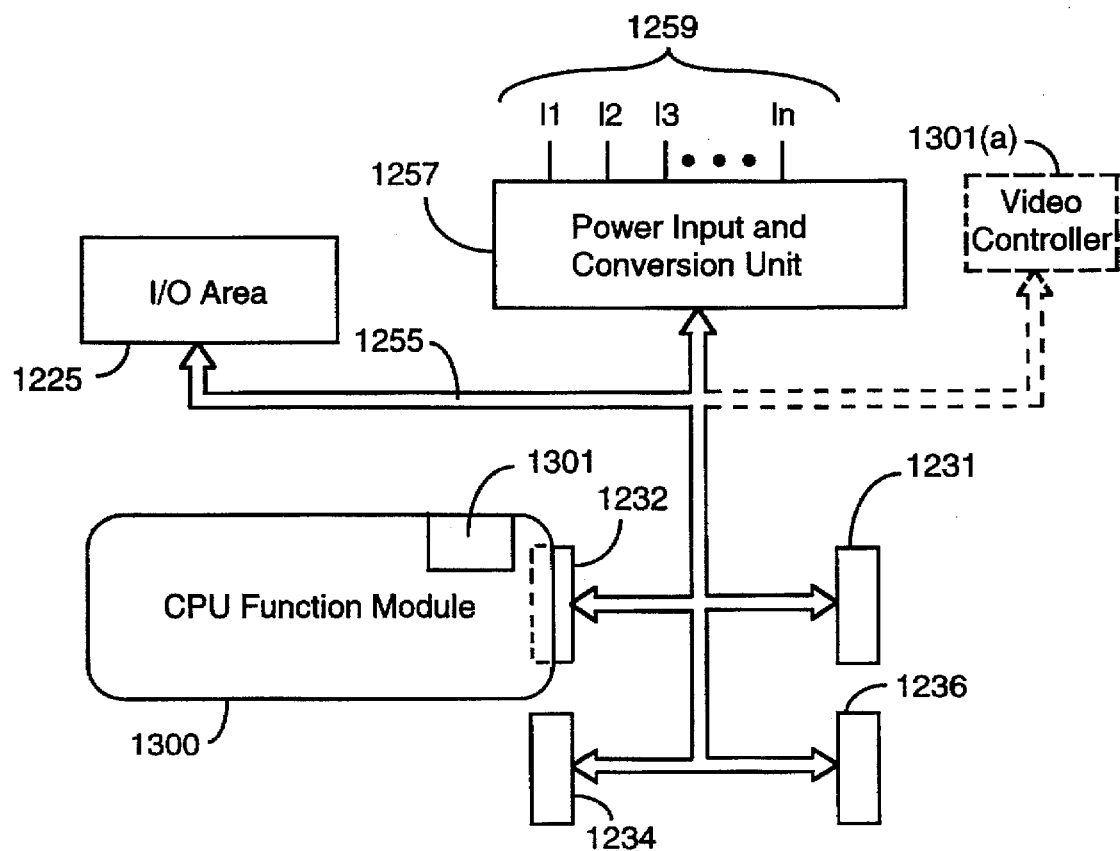
FIG. 39 is a block diagram of a compressed bus and connection to docking bays in a computer framework according to an embodiment of the present invention.

FIG. 39 is a block diagram showing internal elements of palmtop computer 1221, connected to show the electronic architecture of the modular computer according to an embodiment of the invention. A power input and/or conversion unit 1257 is housed in case 1223 (FIG. 35A) and has ports 1259 for power inputs. Power input may be from AA batteries 1237 (FIG. 36) or from an optional conversion unit via outside electrical sources. Conversion unit 1257 senses the input conditions and selects appropriate circuitry to convert the input to the voltages needed to power the elements of the system. Output from the conversion unit is to bus 1255, which comprises paths for power as well as for digital information such as data and addresses.

Because there are a wide variety of function modules, as indicated above and described in more detail below, there needs typically to be more than one power line in bus 1255. For example, computer 1221 may utilize hard disk drive modules, and these modules are preferably provided without onboard power sources. The motor drive for a hard disk requires a different power configuration (voltage and current) than does a CPU, for example, so there may be parallel power lines of differing size and voltage level in bus 1255. Bus 1255 may have a line for 24 V DC, another for 12 V DC, and yet another for 5 V DC, as well as perhaps multiple ground lines.

Bus 1255 connects I/O area 1225 and transmits video signals from a video controller. The video controller may be integral to a function module, which is shown as video controller 1301 in a CPU function module 1300, or implemented in the case, shown as optional video controller 1301(a). As described above in a preferred embodiment of the present invention, I/O area 1225 is a combination display with an overlaid touch sensitive screen. In another aspect, the I/O area may comprise an active-matrix display, in which case, dedicated analog driver lines from video controller 1301 connect to the display. I/O area 1225 may also comprise a conventional LCD display wherein I/O control logic is a function of an installed and dedicated I/O peripheral modules. In an alternative embodiment, video controller 1301 is built into case 1223 (FIG. 35A), and connected directly to bus 1255, similar to the modular notebook computer described above.

Bus 1255 connects to each of module bays 1222, 1224, 1226 and 1227 (FIG. 36) through connectors 1232, 1234, 1236 and 1231. When a function module, such as CPU module 300, is inserted into a module bay, female connector 1253 (FIG. 38) mates with the respective male connector 1232 located in that module bay, and circuitry inside the CPU module is then connected to bus 1255.

The onboard video controller 1301 built into CPU function module 1300 is a unique feature in one aspect of the present invention. A user is provided an ability to tailor the CPU power and type of video controller to the other modules and applications for palmtop computer 1221. This provides a simple means for upgrading by switching CPU function modules. Video signals are local to the CPU, which increases system performance.

Figure 40:
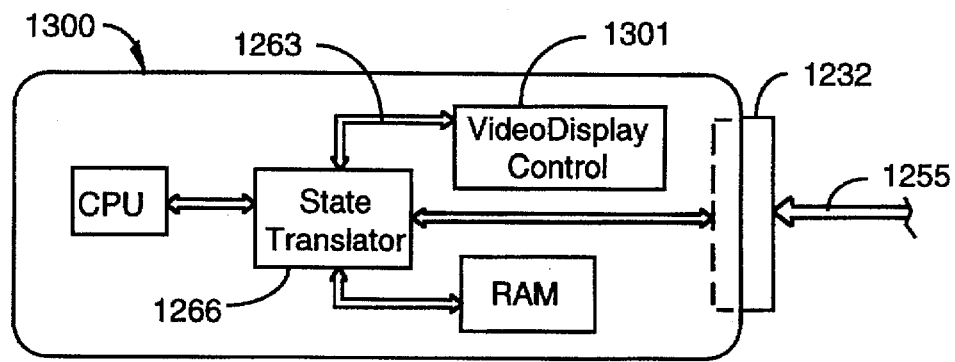
FIG. 40 is a block diagram of a CPU function module according to an embodiment of the present invention.

FIG. 40 is a more detailed diagram of CPU module 1300 for computer 1221. CPU module 1300 is similar in function to CPU module 1099 (FIG. 26), except for the addition of video controller 1301. Onboard video controller 1301 is bus connected by line 1263 to a state translator 1266. In this embodiment of the invention, the state translator is configured to transmit and receive video signals and commands over bus 1255 via connector 1231 as well as other functions as described above.

The embodiments of the present invention described above specifically address notebook-type and palmtop-type computers. The embodiment described below addresses yet another aspect of the palmtop type computers.

Figure 41:
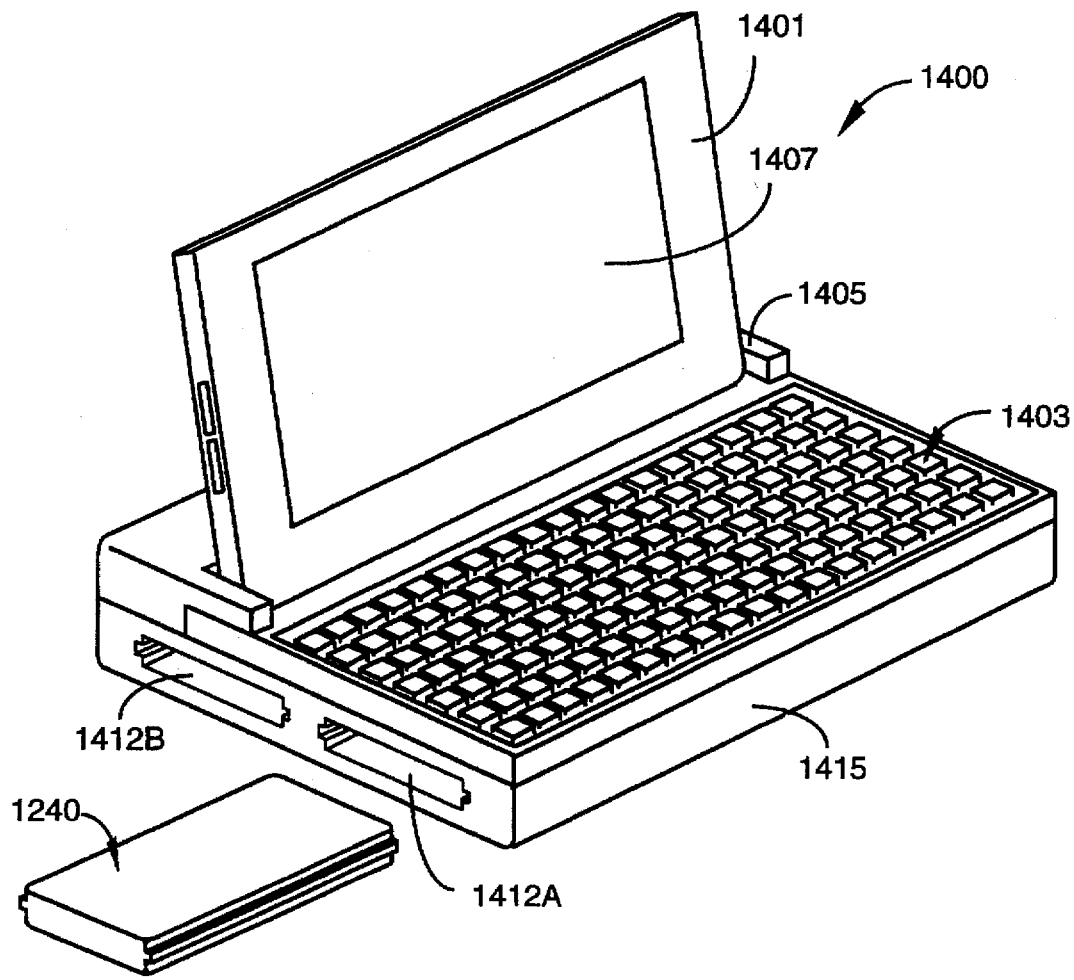
FIG. 41 is an isometric drawing of modular palmtop computer according to another embodiment of the present invention.

FIG. 41 is an isometric drawing of another embodiment of the present invention. Computer 1400 comprises an attached pivotable display case 1401 and a fixed keyboard 1403. The display case rotates about a hinge 1405 and closes in a fixed detented position above the keyboard. Display case 1401 comprises a flat-panel display 1407. There are two PCMCIA-type module bays 1412A and 1412B on one side of the case, and two more (not shown) on the side opposite. The four PCMCIA module bays are arranged in a planar array as described above. A frame 1415 contains a bus structure (not shown) that interconnects all aspects of the PCMCIA type module bays to computer 1400 as described above. In this embodiment of the present invention, a standard keyboard controller (not shown) enclosed in frame 1415 connects keyboard 1403 to the internal bus structure.

Cooling of Docked Modules

As was discussed in the background section, high-powered microprocessors generate considerable waste heat, and in a small package, such as a μPDA according to the present invention, especially if confined in a closed area, such as a docked unit in a docking bay, the waste heat can create a serious temperature problem. To combat the heat dissipation problem, disclosure below relates to heat sink devices for absorbing and dissipating waste heat from docked modules. The disclosure below also provides physical security capability to augment the security measures disclosed above relative to μPDAs.

FIG. 42 is an isometric view of a portable general-purpose computer framework 2011 according to an embodiment of the present invention. There are, along two sides of framework 2011, a series of docking bays such as bays 2012A and 2012B configured to receive function modules 2013. The modules are configured to provide functional characteristics for the computer system as described above. More particularly, modules are expected to be used comprising microprocessors and the like that generate considerable waste heat. A representative functional module 2013 is shown in position to be inserted in bay 2012a.

FIG. 43A is a cross-sectional view of docking bay 2012A in the direction of arrows 43—43 of FIG. 42, showing function module 2013 inserted into docking bay 2012A, engaging a connector 2015 which provides electrical connection to an internal bus structure. Cooling structures 2017 and 2019 shown above and below module 2013 are, in this embodiment, heat absorbent and conductive plates made of highly heat-conductive and heat absorbent material, such as copper. Cooling structures 2017 and 2019 are spaced apart from the inserted position of a module by a distance above and below the line of insertion and withdrawal, such that they do not interfere with inserting or withdrawing of a module.

The placement and size of cooling structures 2017 and 2019 may vary widely, depending on configuration of the system, including the dimensions of modules accommodated in the docking bays. Also, although two opposing cooling structures 2017 and 2019 are shown in this embodiment, in other embodiments there may be only one, either above or below the docking position of a module in the docking bay.

To actively cool a module in a docking bay, the cooling structures must be brought into intimate contact with the module. There are a number of equivalent ways this may be done.

FIG. 43B is a side elevation view of a portion of one cooling structure 2017 in an embodiment of the invention, wherein structure 2017 is guided on three or more vertical guide pins. Two guide pins 2016 and 2018 are shown, in this case fastened through and to structure 2017. Fastening may be by soldering, welding, screw threads, or by other conventional means.

Pins 2016 and 2018 in this embodiment pass through guide bores 2020 and 2022 in an upper wall structure 2024 of the particular docking bay, and extend into an enclosure above wall 2024. Extension springs 2032 and 2034 are placed in assembly to urge structure 2017 away from wall 2024 (toward the position of a functional module docked in the docking bay).

Each of pins 2016 and 2018, and others not shown, have a longitudinal slot, such as slots 2026 and 2028, for passage of a cam bar 2030. Cam bar 2030 is translatable at right angles to pins 2016 and 2018, and is shaped with risers and plateaus, as is known in the mechanical arts, to retract and extend pins 2016 and 2018, and therefore structure 2017.

Cam bar 2030 may be activated (translated) in a number of different ways. In the embodiment shown, cam bars in each module bay are connected to a slide lever (not shown) configured on an edge of the external case of the modular computer. Once functional modules are in place, a user may activate the external lever to engage the cooling structures. In the case of cooling structures both above and below the position of a functional module in a bay, there may be additional cam bars and guide pin structures for the lower structures as well as for the upper structures.

It will be apparent to those with skill in the art that there are many other mechanical systems useful to move cooling structures in the manner required to engage docked function modules. Rotary cams may be used, for example, instead of the cam bars described, and there are many ways external levers, slides, and the like may be implemented to actuate the cam devices and engage the cooling structures. The mechanisms described herein are exemplary.

In another embodiment, activation of the cooling structures may be accomplished by a mechanism moved in the last portion of the translation of a module into a module bay. Such mechanisms are well known in the art. In this case a user-operable linkage is made available to disengage cooling structures 2017 and 2019 so modules may be removed.

Cooling structures 2017 and 2019 are activated in some embodiments by electrically operable actuators, such as solenoids, motors, and the like, to close automatically on insertion of a function module. This activation configuration is particularly useful for maximum security. In these embodiments control routines operable on the modular computer cause the actuators to operate. The control routines in some embodiments require a user to enter a code at the keyboard or other input to operate the actuators to engage and disengage. In other embodiments actuation is accomplished by the system BIOS as a part of startup procedures.

Control routines may also include password protection as a means of security. In yet another embodiment, actuators are signalled by control routines available via a CPU function module after insertion. In this case, the CPU function module is first inserted and powered-up through established bus protocols. Machine control routines that control cooling structure engagement then initiate the modular computer's mechanized framework.

It will be apparent to those with skill in the art that there are a wide variety of ways that control routines may be implemented to provide actuation of mechanisms for moving cooling structures to engage function modules.

Figure 44:
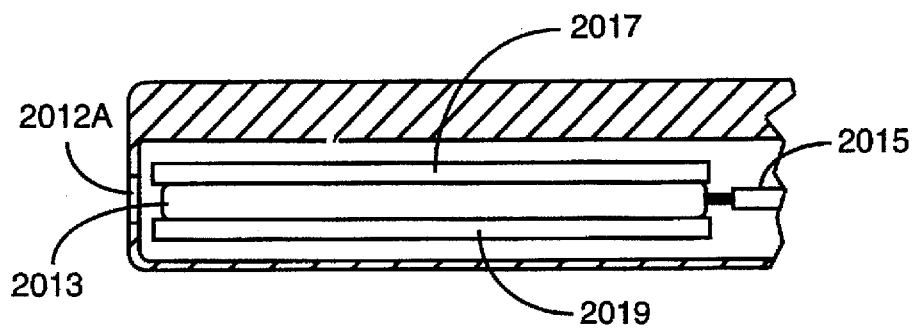
FIG. 44 is another cross-sectional view along line 43A—43A of FIG. 42 showing the cooling elements engaged.

FIG. 44 is an elevation view similar to FIG. 43A, showing cooling structures 2017 and 2019 engaged, urged against functional module 2013. The support and engagement mechanisms are not shown in FIG. 44. In this intimate engagement, waste heat generated by module 2013 may be readily absorbed by cooling structures 2017 and 2019.

It is preferred that the cooling structure or structures urged against a functional module be configured to aid in retaining the module in position in the docking bay. Besides providing a means of retaining modules against accidental displacement, structures configured for retention may also provide security for expensive modules.

Figure 45:
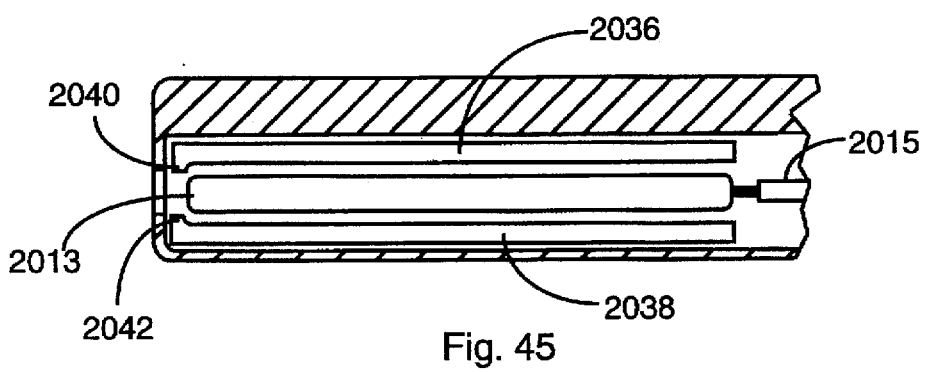
FIG. 45 is a cross-sectional view similar to FIG. 44 showing cooling elements with locking means incorporated into the elements.

FIG. 45 is a side view similar to FIG. 43A showing cooling structures 2036 and 2038 having extensions 2040 and 2042 respectively configured to retain a function module when the function modules are engaged. In the disengaged position shown in FIG. 45, cooling structures 2036 and 2038 are capable of being disengaged (retracted) a sufficient amount that extensions 2040 and 2042 do not interfere with docking procedures.

Figure 46:
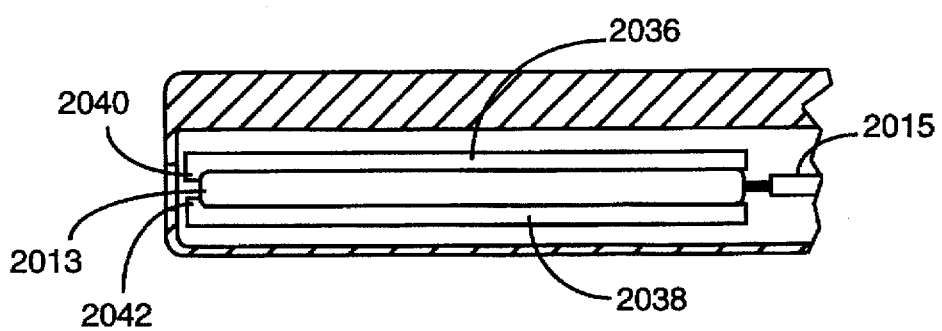
FIG. 46 is a cross-sectional similar to FIG. 45 showing the cooling elements engaged.

FIG. 46 is similar to FIG. 45, except cooling structures 2036 and 2038 are extended to engage function module 2013, such that extensions 2040 and 2042 prevent the function module from being withdrawn while the cooling structures are engaged.

Extensions 2040 and 2042 may be configured to move a function module to a final position fully engaging connector 2015.

In the embodiments described above the cooling structures are heat sinks fashioned as plates of heat absorbing and conducting material. In another embodiment the cooling structures are Peltier devices. They may take other forms as well. The size and design of heat sinks may differ in specific docking bays to accommodate particular modules, which will vary in waste heat production according to the function of the module. CPU modules, for example, are expected to be the worst offenders in generating waste heat. In many cases a modular computer will need no more than one cooled docking bay, that bay reserved for the CPU module.

Figure 47:
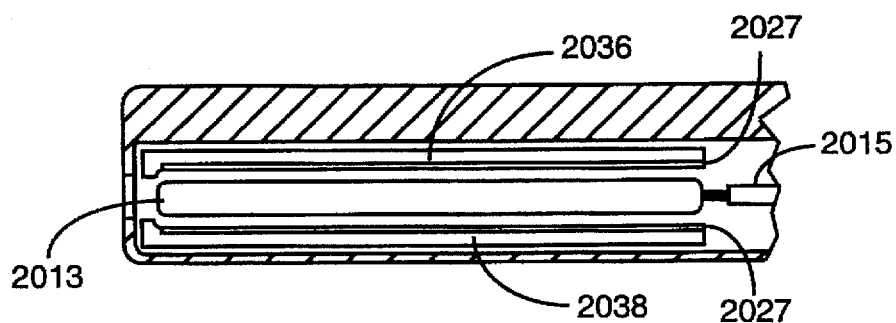
FIG. 47 is a cross-sectional view similar to FIG. 46 showing opposing cooling elements with locking means, each having a layer of compressible heat-conducting material facing the module.

FIG. 47 shows cooling structures 2036 and 2038 having a layer of compressible heat-conducting material 2027 such as Chomerics (™) aluminum oxide-filled rubber or flexible polymer. In this aspect of the invention a pad of such material is mounted by a heat-resisting adhesive to each cooling structure. In this aspect of the invention, the heat-conducting layered material compresses against the inserted function module. A more continuous thermal contact is made ensuring efficient heat conduction across the interface between the function module and the cooling structure. In an alternative embodiment, the compressive material may be affixed to the corresponding sides of the computer module.

Figure 48:
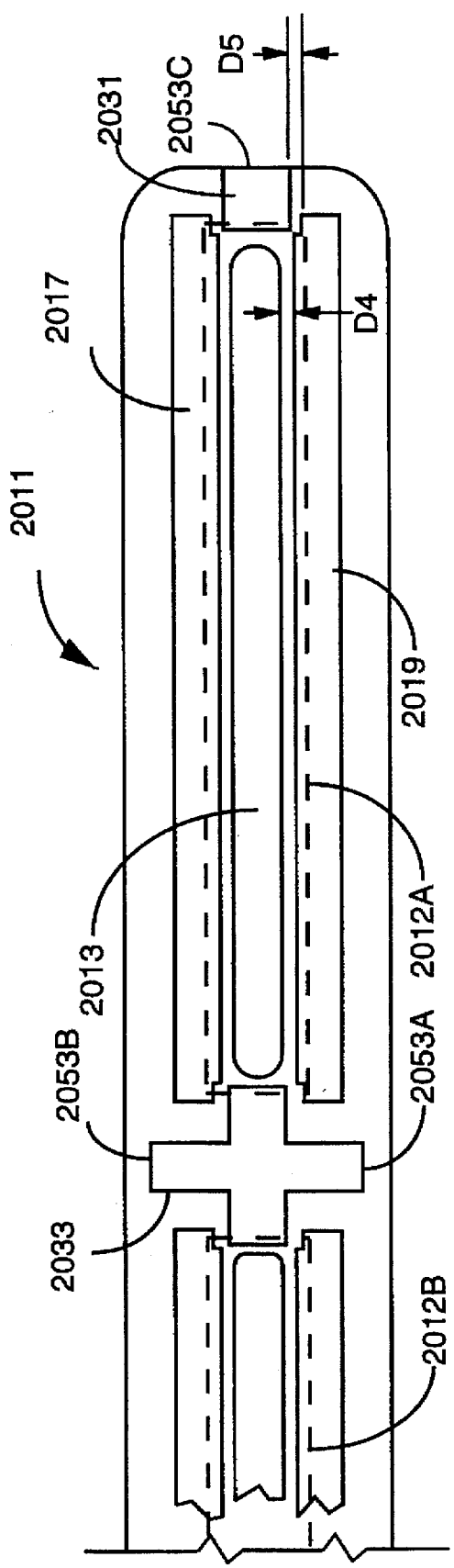
FIG. 48 is a cross-sectional view immediately inside two adjacent bays in a plane parallel to the openings of the bays in the embodiments described.

FIG. 48 is a cross-sectional view immediately inside two adjacent bays 2012A and 2012B in FIG. 42 in a plane parallel to the openings of the bays. Module bay opening 2012A is an end bay while 2012B is an interior bay. Module 2013 is shown in some intermediate stage of insertion. Cooling structures 2017 and 2019 are shown in the full open or some intermediate stage of closing. In this aspect of the embodiment, cooling structures 2017 and 2019 close to secure function module 2013 and to contact an interconnected bus system of additional thermal-conducting structures 2033 and 2031. The distances D4 and D5 are approximately equal, making a thermal loop between occupied docking bays and other internal conducting structures when opposing cooling structures close.

Within all regions of common contact between the moving and stationary heat sinks the mating surfaces are covered in this embodiment with a compressible heat-conducting material to ensure continuous thermal contact between adjacent surfaces. Conducting structure 2031 is exposed to the outside air and may be a structural part of the portable computer's case. Conducting structure 2031 may ring the entire outside perimeter of the case and may also interconnect to the interior heat-sink bus shown as conducting structure 2033. The interior heat-sink bus in this embodiment is an integral part of the supporting framework of the portable computer.

Surfaces 2053A, 2053B, and 2053C may be shaped to maximize heat transfer to the outside air via radiation and convection, such as by grooves or fins. In another embodiment, the heat-sink bus or any individual heat-conducting structure may be connected via a heat conduction interface to an outside heat transferring device, apparatus or structure. For example, at any point along surfaces 2053A, 2053B and 2053C a larger heat sink may be attached in a way to further conduct heat away from the interior of the computer.

It will be apparent to those with the skill in the art that there are many changes that might be made and many other combinations that might be made without departing from the spirit and scope of the invention. There are, for example, many ways to implement the support structure of the μPDA, and to interconnect the active components. One way has been illustrated by FIG. 2 and described in accompanying text. There are many alternatives to this preferred structure. There is also a broad range of sizes and form factors that might be assumed by devices according to the present invention. The use of well-known PCMCIA form factors has been disclosed, but other sizes and forms might also be provided in alternative embodiments. In larger embodiments, on-board peripherals may be implemented.

In addition to these alternatives, there are various ways the connectivity of a μPDA bus might be provided. The well-known PCMCIA standard has been disclosed as a preference, but other connectivity may also be used in alternative embodiments. Memory types and sizes may vary. Means of providing a security code may vary. The nature of the internal bus may vary.

Still further, there are a wide variety of hosts that may be configured for receiving, docking, and operating functional modules such as μPDAs according to the present invention. The limiting requirements are physical compatibility of the docking bay and the functional module, and host control routines for managing communication. There are also many changes that may be made in the details of cooling and physical security apparatus disclosed without departing from the spirit and scope of the invention.

What is claimed is:

1. A digital assistant system, comprising:

a digital assistant having a CPU, a memory connected to the CPU by a bus, a power supply, a display, input apparatus, and a host interface comprising a host interface bus coupled to the CPU and to an interface connector;

a host computer having a host CPU, a docking bay adapted for receiving and docking the digital assistant, a host bus coupled to the CPU and to a host interface connector in the docking bay compatible with the interface connector of the digital assistant, and control routines for managing communication with the docked digital assistant; and at least one heat sink structure in the docking bay with translation apparatus for moving the heat sink structure into contact with the docked digital assistant during a portion of time the digital assistant is docked.

2. A digital assistant system as in claim 1 wherein the docking bay is adapted as a Personal Computer Memory Card International Association (PCMCIA) slot.

3. A digital assistant system as in claim 1 wherein the host computer is one of a desktop computer, a laptop computer, or a hand-held computer.

4. A digital assistant system as in claim 1 wherein the digital assistant additionally comprises an expansion bus interface having an expansion bus connected to the CPU and to a first portion of an expansion bus connector, the first portion of the expansion bus connector being accessible to a user for connecting expansion devices with the digital assistant docked.

5. A digital assistant system as in claim 1 additionally comprising a nonvolatile storage device connected to the CPU and containing a code unique to the digital assistant, for uniquely identifying the digital assistant to connecting digital devices.

6. A digital assistant system as in claim 1 wherein the host interface bus comprises a full-service parallel bus connected to the CPU, and wherein, upon docking, the CPU of the digital assistant exchanges information with the host CPU.

7. A digital assistant system as in claim 1 wherein the translation apparatus comprises a user-operable lever for advancing and retracting the heat sink structure to contact and retract from the docked digital assistant.

8. A digital assistant system as in claim 1 wherein the translation apparatus comprises an electro-mechanical device responsive to a command from the host CPU for advancing a retracting the heat sink structure to contact and retract from the digital assistant.

9. A digital assistant system as in claim 8 wherein the heat sink structure comprises an extension for engaging the docked personal digital assistant, preventing removal of the docked personal digital assistant until the heat sink structure is retracted.

10. A digital assistant system as in claim 9 wherein the host computer is adapted to require entry of a password to enable retraction of the heat sink structure from a docked digital assistant.

11. A digital assistant system, comprising:

a digital assistant having a CPU, a memory connected to the CPU by a bus, a power supply, a display, input apparatus, and a host interface comprising a host interface bus coupled to the CPU and to an interface connector;

a host computer having a host CPU, a docking bay adapted for receiving and docking the digital assistant, a host bus coupled to the CPU and to a host interface connector in the docking bay compatible with the interface connector of the digital assistant, and control routines for managing communication with the docked digital assistant;

a movable structure in the docking bay adapted for engaging the docked digital assistant preventing removal of the docked digital assistant from the docking bay; and electro-mechanical translation apparatus responsive to commands from the host CPU connected to the moveable structure and adapted for advancing and retracting the moveable structure to engage the docked digital assistant during a portion of time the digital assistant is docked, and for releasing the docked digital assistant.

12. A digital assistant system as in claim 11 wherein the host computer is adapted to require entry of a password to enable retraction of the moveable structure from a docked digital assistant, releasing the docked digital assistant.

* * * * *